(12) United States Patent
Griggs et al.

(10) Patent No.: US 7,739,855 B2
(45) Date of Patent: Jun. 22, 2010

(54) AUTOMATED CLIPPERS

(75) Inventors: Samuel D. Griggs, Raleigh, NC (US);
Dennis J. May, Pittsboro, NC (US);
William M. Poteat, Fuquay-Varina, NC
(US); Derek L. Brown, Apex, NC (US);
David R. Gupton, Wake Forest, NC
(US)

(73) Assignee: Tipper Tie, Inc., Apex, NC (US)

( * ) Notice: Subject to any disclaimer, the term of this patent is extended or adjusted under 35 U.S.C. 154(b) by 3 days.

(21) Appl. No.: 12/342,556

(22) Filed: Dec. 23, 2008

(65) Prior Publication Data

US 2009/0100798 A1    Apr. 23, 2009

Related U.S. Application Data

(62) Division of application No. 11/944,838, filed on Nov. 26, 2007, now Pat. No. 7,478,515, and a division of application No. 11/945,310, filed on Nov. 27, 2007, now Pat. No. 7,526,905, each and a division of application No. 10/951,578, filed on Sep. 28, 2004, now Pat. No. 7,313,896.

(60) Provisional application No. 60/508,609, filed on Oct. 3, 2003.

(51) Int. Cl.
*B65B 51/04* (2006.01)
*B65B 9/12* (2006.01)

(52) U.S. Cl. .................. 53/138.4; 53/567; 53/576

(58) Field of Classification Search ...... 53/138.1–138.4, 53/567, 576, 417; 29/243.56, 243.57; 83/399, 83/400; 452/48
See application file for complete search history.

(56) References Cited

U.S. PATENT DOCUMENTS

| 1,069,253 | A | | 8/1913 | Henebergh | |
|---|---|---|---|---|---|
| 1,450,104 | A | | 3/1923 | Merli et al. | |
| 1,611,268 | A | | 12/1926 | Colby | |
| 2,946,166 | A | | 7/1960 | Baxter | |
| 3,499,259 | A | * | 3/1970 | Marietta, Jr et al. | 53/417 |
| 3,748,717 | A | * | 7/1973 | Leffler et al. | 53/138.4 |
| 4,001,926 | A | | 1/1977 | Velarde | |
| 4,157,003 | A | | 6/1979 | Kamphaus | |
| 4,175,690 | A | | 11/1979 | Bova et al. | |

(Continued)

FOREIGN PATENT DOCUMENTS

EP    1464581 A1 * 10/2004

(Continued)

*Primary Examiner*—Stephen F Gerrity
(74) *Attorney, Agent, or Firm*—Myers Bigel Sibley & Sajovec, P.A.

(57) ABSTRACT

Pivotable clipper assemblies for attaching at least one closure clip to a product held in netting include a pivotable clipper mechanism having a clipper body configured to deliver clips to a clip window and attach the clips to netting and a first cutting cartridge mounted to the pivotable clipper mechanism. The first cutting cartridge includes: (a) a knife; (b) an actuation cylinder with a rod in communication with the knife that advances and retracts the knife; and (c) an anti-rotation block attached to a rear of the knife intermediate the knife and rod to inhibit the knife and rod from rotating, wherein, in operation, the first cutting cartridge pivots with the clipper mechanism.

5 Claims, 49 Drawing Sheets

U.S. PATENT DOCUMENTS

| | | | |
|---|---|---|---|
| 4,203,269 A | | 5/1980 | Petersen |
| 4,211,051 A | * | 7/1980 | Tucker ........................ 53/138.4 |
| 4,218,861 A | * | 8/1980 | Marz .......................... 53/138.4 |
| 4,247,005 A | | 1/1981 | Buxton |
| 4,516,387 A | | 5/1985 | Kupcikevicius |
| 4,599,941 A | | 7/1986 | Johnson et al. |
| 4,703,611 A | | 11/1987 | Young |
| 4,809,484 A | | 3/1989 | Lovik |
| 5,161,347 A | * | 11/1992 | May et al. ................... 53/138.2 |
| 5,209,041 A | * | 5/1993 | Evans ......................... 53/138.4 |
| 5,269,054 A | * | 12/1993 | Poteat et al. ................ 53/138.4 |
| 5,435,114 A | | 7/1995 | Moehlenbrock et al. |
| 6,604,338 B1 | * | 8/2003 | May et al. ................... 53/138.2 |
| 6,932,688 B2 | | 8/2005 | Stanley et al. |
| 7,021,026 B2 | | 4/2006 | Griggs et al. |
| 7,222,469 B2 | | 5/2007 | Griggs et al. |
| 7,234,287 B2 | | 6/2007 | Griggs et al. |
| 7,237,369 B2 | | 7/2007 | Griggs et al. |
| 7,356,977 B2 | | 4/2008 | Griggs et al. |
| 7,386,966 B2 | | 6/2008 | Griggs et al. |
| 2004/0068964 A1 | * | 4/2004 | Kirk et al. ..................... 53/417 |
| 2008/0250755 A1 | | 10/2008 | Griggs et al. |
| 2009/0100800 A1 | | 4/2009 | Griggs et al. |

FOREIGN PATENT DOCUMENTS

WO    WO 2004/007298    1/2004

* cited by examiner

AUTOMATED CLIPPERS

RELATED APPLICATIONS

This application is a division of U.S. patent application Ser. No. 11/944,838, filed Nov. 26, 2007, now U.S. Pat. No. 7,478, 515, and a division of U.S. patent application Ser. No. 11/945, 310, filed Nov. 27, 2007, now U.S. Pat. No. 7,526,905, and the application Ser. No. 11/944,838 and the application Ser. No. 11/945,310 are each a division of U.S. patent application Ser. No. 10/951,578, filed Sep. 28, 2004, now U.S. Pat. No. 7,313, 896, which claims priority to U.S. Provisional Application Ser. No. 60/508,609, filed Oct. 3, 2003, the contents of which are hereby incorporated by reference as if recited in full herein.

FIELD OF THE INVENTION

The present invention relates to apparatus that can package and apply closure clips to materials that enclose products therein, and may be particularly suitable for clipping netting material.

BACKGROUND OF THE INVENTION

Certain types of commodity and/or industrial items can be packaged by placing the desired product(s) in a covering material and then applying a closure clip or clips to end portions of the covering material to secure the product(s) therein. For non-flowable piece goods, the piece goods can be held individually in a respective clipped package, or as a group of goods in a single package. The covering material can be any suitable material, typically a casing and/or netting material.

Generally described, when packaging a piece good product in netting, the product is manually pushed through a netting chute. The product can include, by way of example, a non-flowable semi-solid and/or solid object such as a meat product including whole or half hams, turkey, chicken, and the like. The netting chute holds a length of a netting sleeve over the exterior thereof. A first downstream end portion of the netting is typically closed using a first clip. As the product exits the netting chute, it is covered with the netting. An operator can then orient the product inside the netting between the discharge end of the chute and the clipped first end portion of the netting. The operator can then pull the netting so that the netting is held relatively tight (typically stretched or in tension) over the product. The operator then uses his/her hands to compress or gather the open end of the netting (upstream of the product) and then manually applies a clip to the netting, typically using a Tipper Tie® double clipper apparatus. A clip attachment apparatus or "clippers" are well known to those of skill in the art and include those available from Tipper Tie, Inc., of Apex, N.C., including product numbersZ3214, Z3202, and Z3200. Examples of clip attachment apparatus and/or packaging apparatus are descried in U.S. Pat. Nos. 3,389,533; 3,499,259; 4,683,700; and 5,161,347, the contents of which are hereby incorporated by reference as if recited in full herein.

The double clipper concurrently applies two clips to the netting proximate the open (upstream) end of the package. One clip defines the first end portion of the next package and the other defines the trailing or second end portion of the package then being closed. A cutting mechanism incorporated in the clipper apparatus can sever the two packages before the enclosed package is removed from the clipper apparatus. U.S. Pat. No. 4,766,713 describes a double clipper apparatus used to apply two clips to a casing covering. U.S. Pat. No. 5,495,701 proposes a clipper with a clip attachment mechanism configured to selectively fasten a single clip or two clips simultaneously. The mechanism has two punches, one of which is driven directly by a pneumatic cylinder and the other of which is connected to the first punch using a pin and key assembly. The pin and key assembly allows the punches to be coupled or decoupled to the pneumatic cylinder drive to apply one single clip or two clips simultaneously. U.S. Pat. No. 5,586,424 proposes an apparatus for movement of U-shaped clips along a rail. The apparatus includes a clip feed for advancing clips on a guide rail and the arm is reciprocally driven by a piston and cylinder arrangement. The contents of each of these patents are hereby incorporated by reference as if recited in full herein.

SUMMARY OF EMBODIMENTS OF THE INVENTION

Embodiments of the present invention provide apparatus, subassemblies and/or other devices, systems, methods and computer program products for automatically packaging a product in a covering material and/or applying clips thereto.

In certain embodiments, the product can be manipulated and packaged so that at least one clip is automatically applied to enclose the product in the covering material. Particular embodiments automatically package a discrete object or objects in netting.

Certain embodiments are directed toward systems for automatically enclosing a semi-solid or solid product in a covering material. The systems include: (a) an elongate product chute having an outer surface and opposing receiving and discharge end portions with an interior cavity extending therethrough; (b) a product pusher mechanism having a pusher head that is configured to controllably automatically advance into and retract from the product chute to thereby advance a product from a position upstream of the product chute and through the product chute so as to exit out of the discharge end portion of the product chute; and (c) a clipper mechanism disposed downstream of the product chute, the clipper mechanism configured to automatically apply at least one clip to a covering material that encloses the product from the product chute.

Other embodiments are directed toward methods of automatically packaging an object in a covering material such as casing and/or netting. The methods include: (a) automatically pushing at least one object through a product chute; (b) pulling a covering material upstream of the product chute off an exterior surface of the product chute to automatically enclose the object in the covering material as the object exits the product chute; and then (c) applying a clip to the covering material to secure the object in the packing material.

The pushing can include automatically extending a pusher head into the product chute to contact the object and force the object through the product chute and then retracting the pusher head from the product chute. The applying a clip may include automatically gathering the covering material together and applying at least one clip to the gathered covering material. In particular embodiments, the applying step can include applying two proximately positioned but spaced apart clips substantially concurrently to the gathered covering material.

Other embodiments area directed to pivotable dual clipper assemblies for attaching closure clips to a product held in netting. The clipper assemblies include: (a) a retractable clipper mechanism having a clipper body configured to deliver clips to a clip window and attach the clips to netting; and (b)

a pair of clipper gathering plates attached to the clipper body so that the clipper gathering plates retract with the clipper mechanism. In operation, the clipper gathering plates gather netting upstream of a product held therein prior to attachment of clips to the gathered netting by the clipper mechanism.

Still other embodiments are directed to automatic pivotable clipper mechanisms for attaching closure clips to product held in a covering material. The mechanisms include: (a) a clipper body; (b) a curvilinear clip rail attached to the clipper body having opposing top and bottom end portions and defining a generally downwardly extending clip feed direction; (c) a clip entry window in communication with the bottom end portion of the clip rail and a clip closure delivery path in communication with a punch mechanism that is adapted to wrap a clip from the clip rail about a covering material; (d) a first clip pusher configured to selectively engage with clips held on the clip rail to force the clips in the feed direction; (e) a first clipper gathering plate attached to the clipper body on a first side of the clip entry window, the first clipper gathering plate configured to extend a distance below the clip rail and generally outwardly therefrom toward the covering material; and (f) a second clipper gathering plate attached to the clipper body on an opposing side of the clip entry window from that of the first clipper gathering plate so as to be spaced apart from the first clipper gathering plate. The second clipper gathering plate can be configured to extend a distance below the clip rail and generally outwardly therefrom toward the covering material. In operation, the clipper mechanism pivots from a rest position to an active clipping position and the first and second clipper gathering plates pivot in concert with the clipper mechanism.

Additional embodiments are directed toward brake assemblies for applying pressure to a covering material that is automatically fed over a product. The devices include a pair of spaced apart arms, each having respective gripping members. The arms are configured to move toward each other a distance sufficient to cause the gripping members to contact an outer surface of an intermediately positioned product chute with an interior cavity and to move away from each other a distance sufficient to cause the gripping members to avoid contact with the outer surface of the product chute. The braking assemblies thereby controllably selectively apply a braking force onto covering material held between the outer surface of the product chute and the gripping members.

In particular embodiments, the gripping members have a curvilinear profile when viewed from the side. The arms can be each pivotably attached to a common center frame member. The brake assembly can also include an actuation cylinder that is attached to each arm and extends between the arms so that the arms are configured to automatically controllably pivot in concert toward and away from each other. The brake assembly may be configured for braking netting. The device may, hence, further include a netting support roller positioned upstream of the arms so as to contact the underside of the product chute to tension the netting as the netting exits the product chute.

In particular embodiments, the brake assembly is used in combination with a product chute with netting held on the outer surface of the product chute. The product chute can have sidewalls that are substantially curved and the gripping members can have a side profile with a curved contour that substantially corresponds to that of the product chute sidewalls.

Yet other embodiments are directed toward methods of braking netting traveling over the outer surface of a product chute. The methods include: (a) selectively moving first and second arms with gripping members thereon toward and away from a product chute; and (b) applying a braking force to netting traveling over an exterior surface of the product chute when the arms move a sufficient distance toward the product chute to press the netting against the product chute.

Still other embodiments are directed toward automated netting gathering assemblies that include a pair of spaced apart laterally extendable and retractable netting gathering plates disposed downstream of a netting product chute, wherein in operation the netting gathering plates travel toward an axial line of netting to gather the netting material.

In particular embodiments, the assemblies can also include a pair of pivoting netting gathering plates positioned on an opposing side of the axial line of the netting. The pivoting netting gathering plates can be configured to cooperate with the laterally retractable and extendable gathering plates to converge the netting material and gather the netting material after a product held in the netting material passes by the netting gathering plates.

Still other embodiments are directed toward netting/product chutes having an interior cavity and an exterior surface adapted to hold netting thereon. The chute has a non-circular cross-sectional profile.

In particular embodiments, the chute includes an entry portion that has a larger cross-sectional area than an intermediate portion thereof. For example, the chute can have an elongate funnel-like configuration. The chute can include a mounting bracket attached thereto. The mounting bracket may have a planar substantially horizontal mounting platform and a vertical segment with a support channel configured to snugly receive and hold a bottom portion of the product chute. The mounting bracket may be configured as a quick disconnect to allow changeover to a different product chute held on a similarly configured mounting bracket.

Yet other embodiments are directed toward a packaging apparatus for packaging at least one discrete object in a netting material. The apparatus includes a product table positioned downstream of a clipper mechanism and a vertically extendable and retractable product holding member disposed downstream of the clipper mechanism proximate an upstream portion of the product table. In operation, the product holding member can be configured to controllably travel down while the netting material is being clipped and then controllably rise to allow the enclosed netted product to travel downstream thereof onto the product table.

Additional embodiments are directed toward pivotable clipper assemblies for attaching at least one closure clip to a product held in netting. The clipper assemblies include: (a) a pivotable clipper mechanism having a clipper body configured to deliver clips to a clip window and attach the clips to netting; and (b) a first cutting cartridge mounted to the pivotable clipper mechanism. The first cutting cartridge includes an actuation cylinder with a rod that advances and retracts a knife and an anti-rotation block attached to the rear of the knife intermediate the knife and rod to inhibit the knife and cylinder rod from rotating. In operation, the first cutting cartridge pivots with the clipper mechanism.

In particular embodiments, the clipper assemblies may also include a proximity sensor mounted to the cartridge to provide data to control the timing of the actuation of the cylinder to automatically controllably advance the knife to sever the netting.

In still other embodiments, the clipper mechanism may include a groove formed therein. The first cartridge can include a cartridge platform configured to slide into the groove in the clipper mechanism to thereby releasably mount to the clipper mechanism. In addition, the clipper assembly can include a second cutting cartridge assembly releasably mountable to the clipper mechanism. The second cartridge can have a cartridge platform configured and sized to slide into the groove in the clipper mechanism. The second cutting cartridge can include a hot knife element and a heat source in communication therewith. The second hot knife element can be connected to a corresponding actuation cylinder to controllably advance and retract. The second cutting cartridge can also pivot with the clipper mechanism.

Yet additional embodiments are directed toward automated product pusher assemblies for pushing product through a product chute that dispenses covering material from an outer surface thereof so that the covering material receives a product discharged from the product chute. The assemblies include: (a) a pusher head having a forward portion and axially extending guidewalls disposed on opposing sides of the forward portion, the pusher head configured and sized to enter into the product chute and push an object undergoing packaging through the product chute; and (b) a pusher actuation cylinder attached to the pusher head assembly to direct the pusher head assembly to automatically and controllably linearly travel between a downstream position and an upstream position.

Other embodiments are directed toward computer program products for operating an automated clipped netting packaging apparatus. The automated packaging apparatus includes an automated product pusher mechanism that advances and retracts from a product chute and an automated clipping apparatus that applies at least one closure clip to netting thereat. The computer program product includes a computer readable storage medium having computer readable program code embodied in the medium. The computer-readable program code includes: (a) computer readable program code that automatically controllably actuates a pusher actuation cylinder to push a product pusher in a downstream direction; and (b) computer readable program code that automatically controllably actuates a clipper mechanism to position a clipping apparatus in a clipping position in response to product pushed by the product pusher out of the product chute covered in netting.

In particular embodiments, the computer program product can also include code that: (a) automatically controllably actuates netting gathering plate actuation cylinders to laterally translate the plates toward the clipper mechanism; and/or (b) automatically controllably actuates a package holding member to raise the holding member above a product support floor to maintain a product held in netting in alignment with the clipper mechanism.

These and other objects and/or aspects of the present invention are explained in detail in the specification set forth below.

BRIEF DESCRIPTION OF THE DRAWINGS

FIG. 39 also illustrates a cartridge mounted modular cutting tool (knife blade) held on the clipping mechanism in a retractable position ready to sever the covering material after the clip is attached according to embodiments of the present invention.

DESCRIPTION OF EMBODIMENTS OF THE INVENTION

Figure 1:
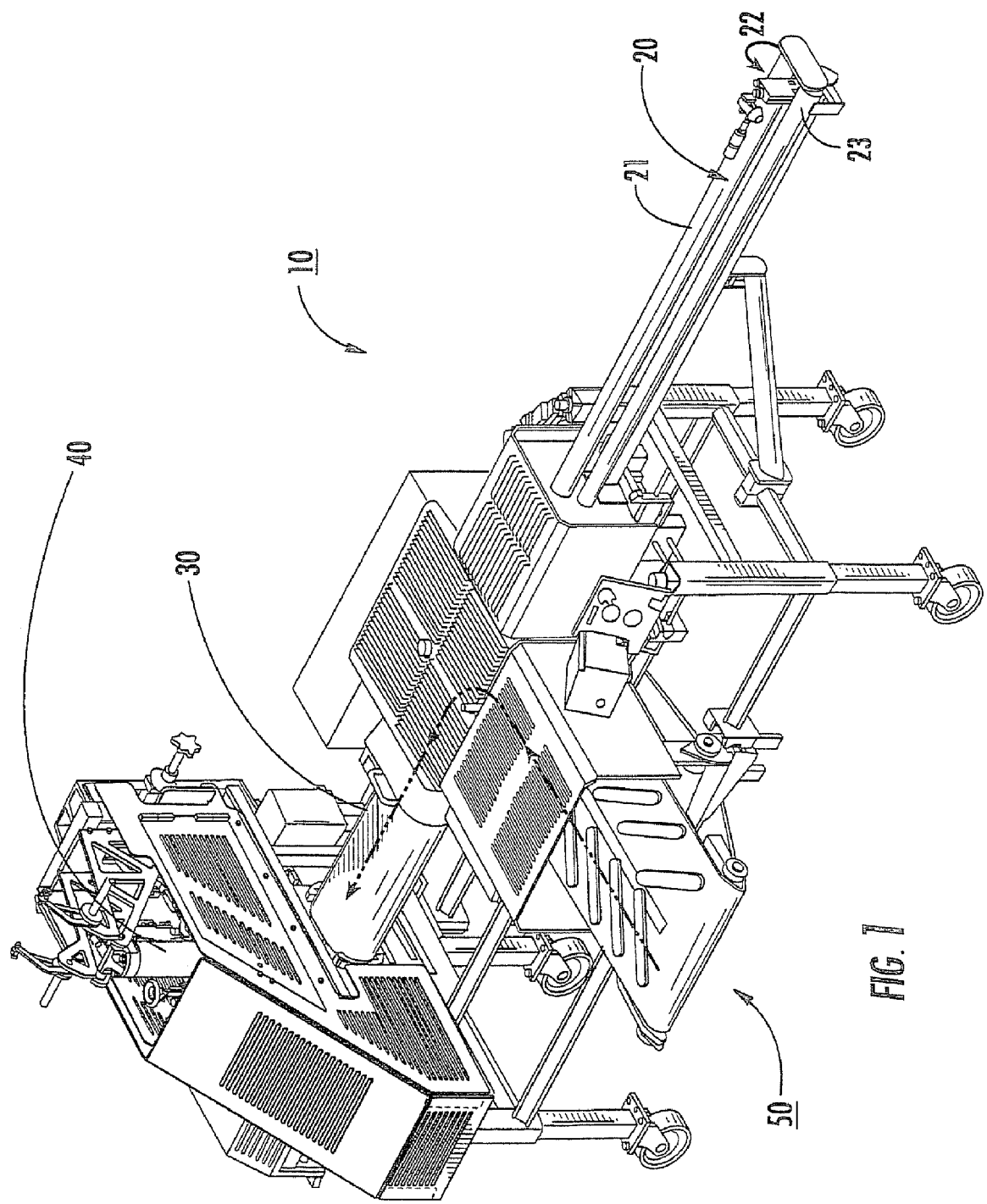
FIG. 1 is a front perspective view of an apparatus/system used to automatically advance objects through a product chute and then automatically apply a clip(s) via a clipper mechanism according to embodiments of the present invention.

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. In the figures, certain layers, components or features may be exaggerated for clarity, and broken lines illustrate optional features or operations, unless specified otherwise. In addition, the sequence of operations (or steps) is not limited to the order presented in the claims unless specifically indicated otherwise. Where used, the terms "attached", "connected", "contacting", "coupling" and the like, can mean either directly or indirectly, unless stated otherwise. The term "concurrently" means that the operations are carried out substantially simultaneously.

In the description of the present invention that follows, certain terms are employed to refer to the positional relationship of certain structures relative to other structures. As used herein, the term "front" or "forward" and derivatives thereof refer to the general or primary direction that the clips travel toward a target product for closure and/or the direction that the target filled or stuffed product in casing material travel; this term is intended to be synonymous with the term "downstream," which is often used in manufacturing or material flow environments to indicate that certain material traveling or being acted upon is farther along in that process than other material. Conversely, the terms "rearward" and "upstream" and derivatives thereof refer to the directions opposite, respectively, the forward and downstream directions.

The present invention is particularly suitable for applying closure clips to discrete objects held in a covering material. The covering material may be natural or synthetic and may be a casing material that can be sealed about a product or may be netting. The casing can be any suitable casing (edible or inedible, natural or synthetic) such as, but not limited to, collagen, cellulose, plastic, elastomeric or polymeric casing. The term "netting" refers to any open mesh material formed by any means including, for example, knotted, braided, extruded, stamped, knitted, woven or otherwise. Typically, the netting is configured so as to be stretchable in both axial and lateral directions.

Netting or other covering material may be used to package discrete meat products such as loafs of meat, boned ham, spiral sliced ham, deboned ham, turkey, turkey loafs held in molds, or other meat or items directly or with the items held in subcontainers and/or wraps such as molds, trays, boxes, bags, absorbent or protective sheets, sealant, cans and the like. Other embodiments of the present invention may be directed to package other types of food such as cheese, bread, fruit, vegetables, and the like. Examples of non-food items that may be packaged using embodiments of the present invention include living items such as flora, fauna, trees, and the like, as well as inanimate objects. Additional examples of products include discrete, semi-solid or solid non-flowable objects such as firewood, pet food (typically held in a container if the wet type), recreational objects (such as balls), or other solid or semi-solid objects. The product may be a packaged for any suitable industry including horticulture, aquaculture, agriculture, or other food industry, environmental, chemical, explosive, or other application. Netting may be particularly useful to package ham or turkeys, manufactured hardware such as automotive parts, firewood, explosives, molded products, and other industrial, consumable, and/or commodity item(s).

Generally stated, embodiments of the present invention are directed at automating packaging of piece goods or discrete items by forcing them through a product chute and wrapping or enveloping the objects at the other end of the chute in a covering material, such as netting, and then automatically clipping the covering material with a closure clip or other attachment means to close the covering and hold the object or objects inside of the covering material. As noted above, clippers are available from Tipper Tie, Inc., of Apex, N.C. Examples of suitable clips include metallic generally "U"-shaped clips available from Tipper Tie, Inc., in Apex, N.C. Other clips, clip materials and clip configurations or closure means may also be used.

FIG. 1 illustrates an exemplary automatic clipping packaging apparatus 10 according to embodiments of the present invention. In the embodiment shown, the apparatus 10 can be described as a horizontal automatic clipping packaging apparatus as the product is primarily moved, processed, clipped and packaged in a horizontal plane. However, certain components, features or operations may be oriented and/or carried out in other planes or directions and the present invention is not limited thereto. As shown, the apparatus 10 includes a product pusher assembly or mechanism 20, a product chute 30, and a clipper 40. It is noted that the clipper 40 may be referred to herein as a clipper apparatus, clipper mechanism, and/or clipper assembly, but each term may be used interchangeably with the others. As shown, the apparatus 10 may optionally include an infeed conveyor 50.

Figure 2:
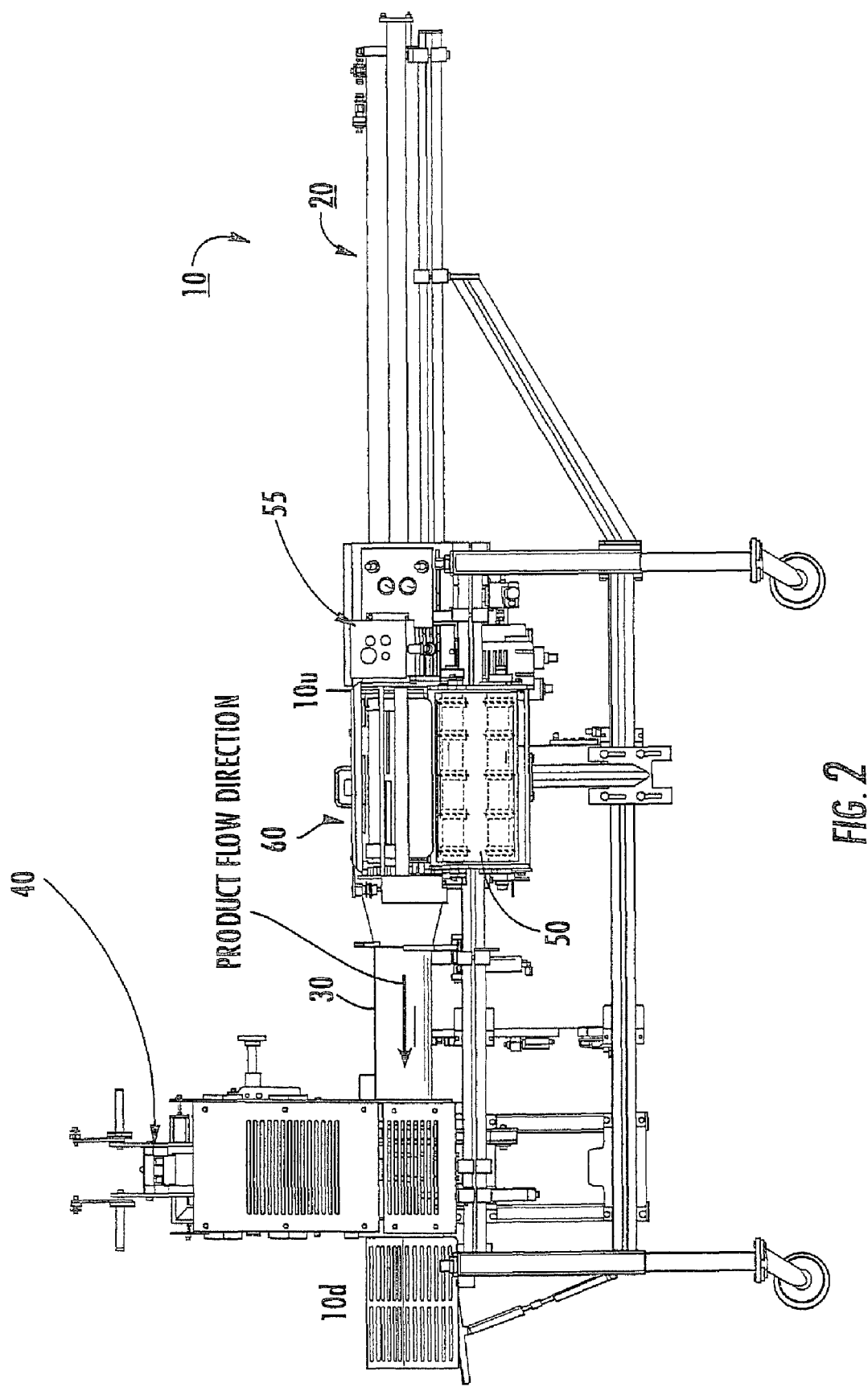
FIG. 2 is a front view of the device shown in FIG. 1 according to embodiments of the present invention.

FIG. 2 illustrates the front view of the apparatus 10 shown in FIG. 1. The arrow indicates the direction of product flow as toward the product chute 30 and clipper 40. Thus, although the downstream direction 10d is shown as moving from right to left (with the upstream direction 10u) in the opposing direction, the apparatus can be oriented to run left to right or in a direction that is in or out of the paper. FIG. 2 also illustrates a human machine interface ("HMI") station 55 that houses operational switches or components that an operator can access to operate the apparatus or system 10. The apparatus 10 includes a product transfer zone 60, which is the location where a product (or products) is positioned, intermediate the product pusher assembly 20 (in the retracted position) and the product chute 30, and substantially aligned with the internal cavity 30c (FIG. 14) of the product chute 30. This positioning of the product in the flow path and/or alignment with the product chute cavity 30c can be carried out substantially automatically as will be discussed further below. However, a target product undergoing packaging can also be manually introduced or placed into the flow path and subsequently processed as in an automatic in-feed operation.

In operation, the product pusher assembly 20 linearly retracts and advances to push a product through the product chute 30 so that the product is positioned proximate the clipper 40 and then retracts to a resting state upstream of the product transfer zone 60. As described above, a sleeve of covering material can be positioned about the external surface of the product chute 30 and configured to be drawn downstream thereof so as to automatically encase the product as the product emerges from the discharge end 30d of the product chute 30. A supplemental sleeve material holder may also be used if desired instead of placing the sleeve of casing material on the product chute. The supplemental sleeve holder can be configured to surround a downstream portion of the product chute (not shown). The sleeve of covering material may be sized to stretch to substantially conform to the external wall or surface of the product chute 30 or may be more loosely held thereon. The cavity of the product chute 30c may be sized to snugly contact or squeeze opposing portions of the product (side to side and/or top to bottom) as the product is pushed therethrough or may be oversized with respect to the product so that the product loosely travels therethrough.

In operation, the sleeve of covering material may be clipped, welded, fused, knotted or otherwise closed at a leading edge portion thereof. When the product exits the product chute 30, it is held in the covering material as the covering material is drawn downstream. The covering material is typically loaded onto the product chute 30 and the leading edge portion closed before the product chute 30 is mounted to the apparatus 10.

Figure 3:
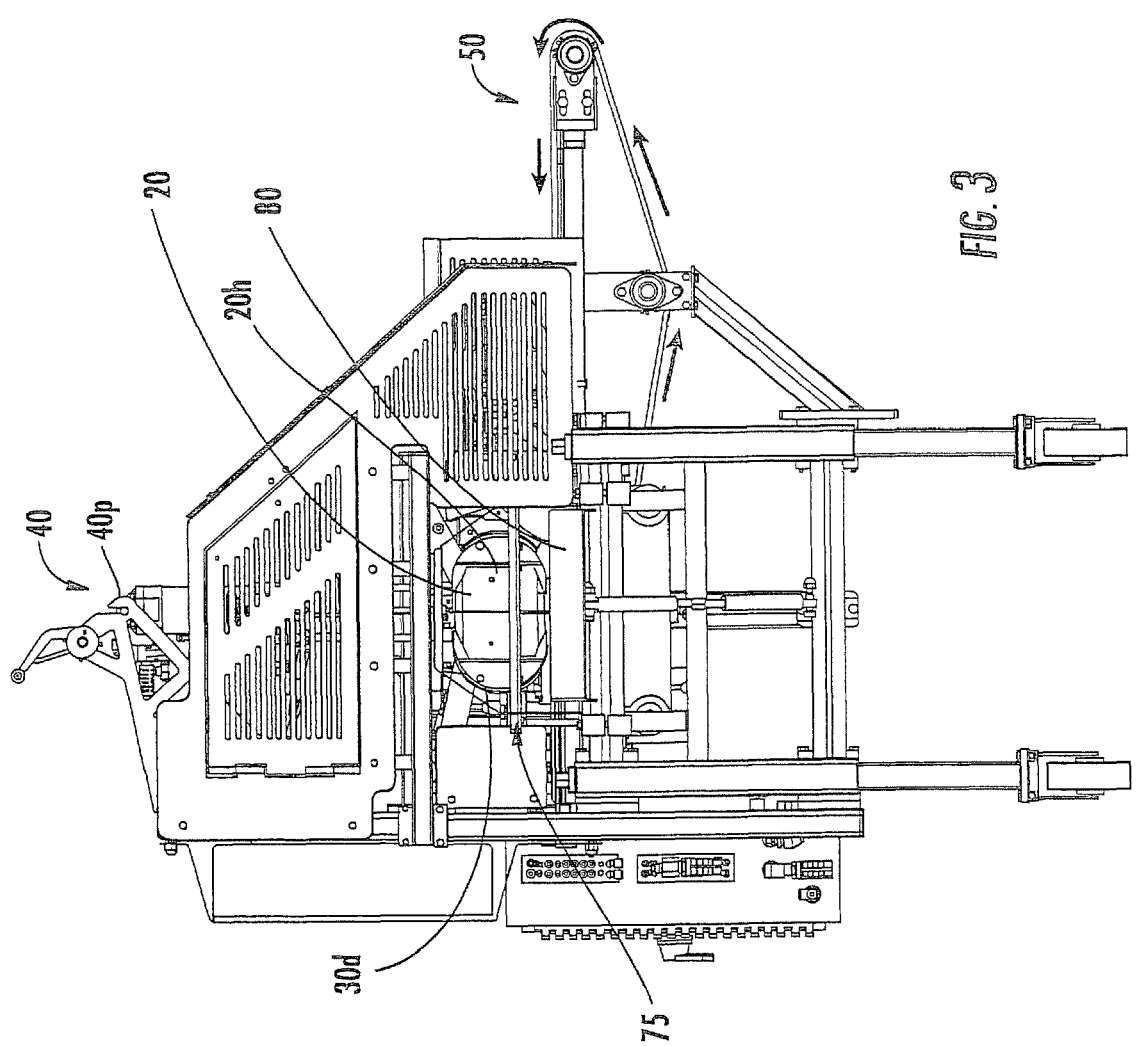
FIG. 3 is a left side view of the device shown in FIG. 1 according to embodiments of the present invention.

The product pusher assembly 20 has a pusher head 20h that contacts the product and pushes the product downstream through the product chute 30. After the product exits the product chute 30, the downstream portion or leading edge of the product in the covering material can be held in position proximate the clipper 40. As shown in FIG. 3, in certain embodiments, the product can be held by positioning a vertically retractable product holding member and/or clamp bar 75 to inhibit the product from migrating downstream thereby holding the product in the covering material between the product holding member 75 and the discharge end of the product chute 30 during the clipping operation.

FIG. 3 illustrates the discharge end portion of the product chute 30 that is positioned proximate and upstream of the clipper 40. The product pusher assembly 20 has a pusher head 20h that is adapted to contact the product. As shown, the pusher head 20h may be configured to substantially fill the entire cross-sectional width of the product chute cavity 30c as the pusher head 20h approaches and/or exits the discharge portion of the product chute 30d. The clipper 40 is configured to reside in a retracted position out of the product flow region to allow the enclosed product to pass unimpeded until the product rests against the product-holding member 75.

Figure 4:
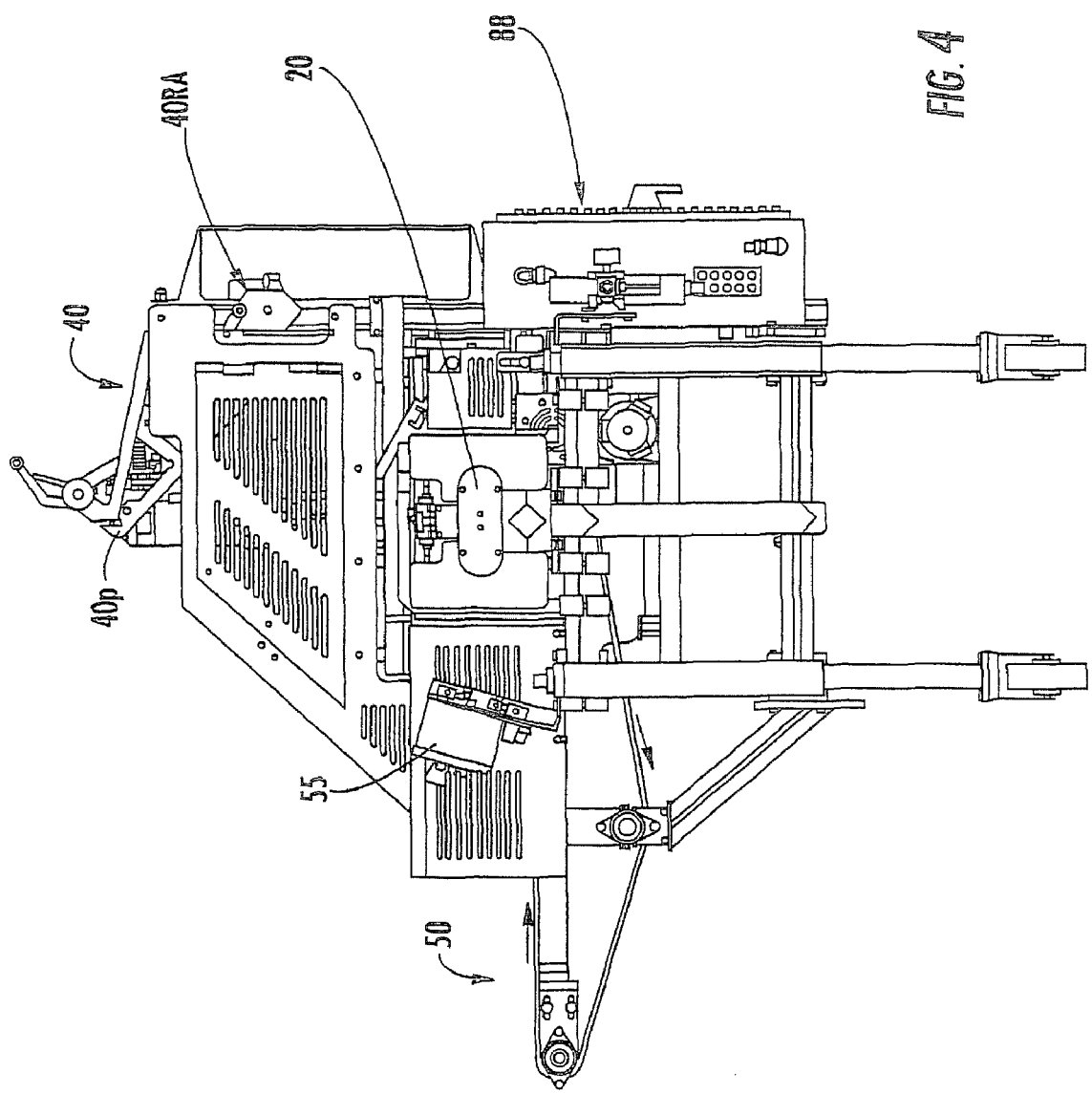
FIG. 4 is a right side view of the device shown in FIG. 1 according to embodiments of the present invention.

As shown, in FIGS. 3 and 4, the clipper 40 can be pivotably mounted 40p to a frame and sized and configured to automatically controllably actuate to advance into a clipping position after the product is in position downstream thereof and then clip the covering material and retract to await to clip the next covering material for the next enclosed product. The clipper 40 may operate in response to data from a proximity sensor that is positioned to detect when a product is ready for clipping and provide the data to a controller or processor. The proximity sensor may be positioned at any suitable place to indicate when the product is in position. The proximity sensor can be an optical (infrared, photosensor, or the like), a hall-effect sensor, a magnetic sensor, an inductive sensor, and/or any other suitable sensor. FIG. 4 also illustrates that the clipper 40 can be attached to a clipper rotation rotary actuator $40_{RA}$ that can control the movement of the clipper 40 during use. FIG. 4 also shows the control housing 88.

Figure 5:
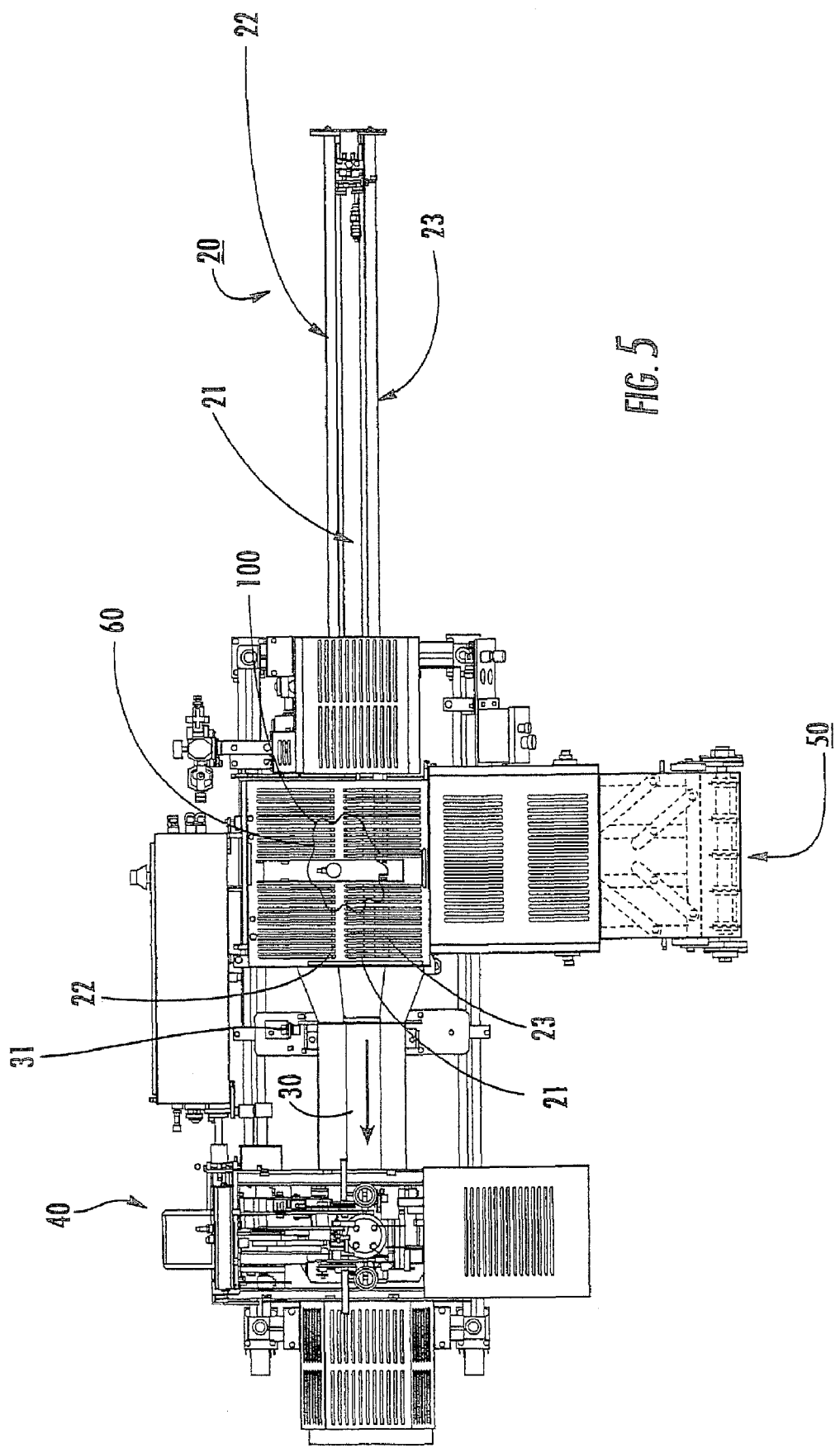
FIG. 5 is a top view of the device shown in FIG. 1 according to embodiments of the present invention.

FIG. 5 illustrates that the product pusher assembly 20 can include a product pusher cylinder 21 and two product pusher guide rods 22, 23, respectively. The product pusher guide rods 22, 23 can be positioned on opposing sides of the pusher cylinder 21 and help to stabilize (provide an anti-rotation structure) for the pusher head 20h as the pusher head 20h travels outside the product chute 30.

Figure 6:
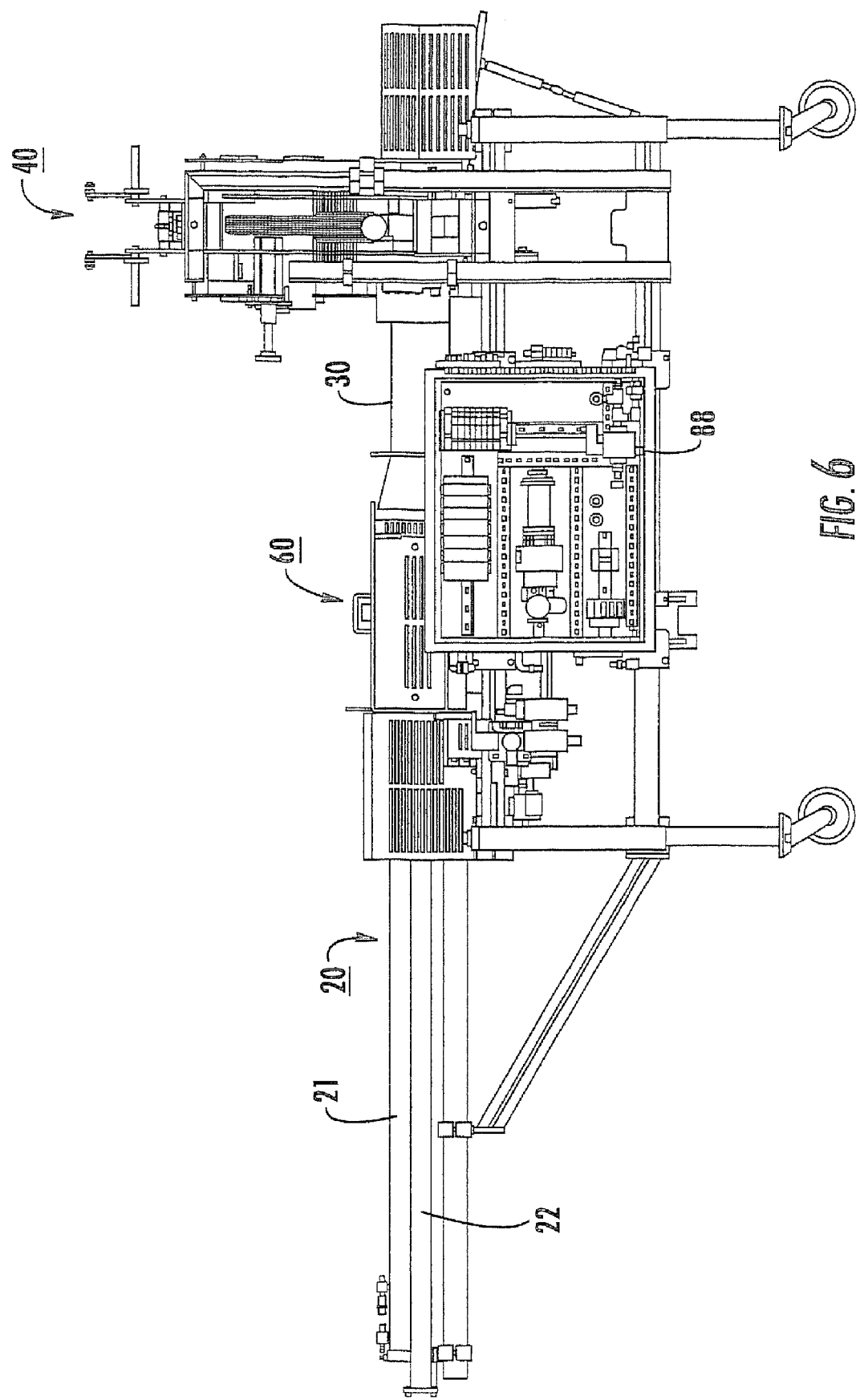
FIG. 6 is rear view of the device shown in FIG. 1 illustrated with the control enclosure door removed according to embodiments of the present invention.

FIG. 6 illustrates the apparatus 10 with the control housing 88 door or panel removed. As shown, the control housing 88 can hold system valves, pressure transducers, actuator controls, a processor that directs the automated operations of the apparatus 10 (which may also be held in total or partially in the Human Machine Interface or "HMI" 55, FIG. 2) and other electronic, software and/or mechanical equipment as will be understood by one of skill in the art.

Figure 7:
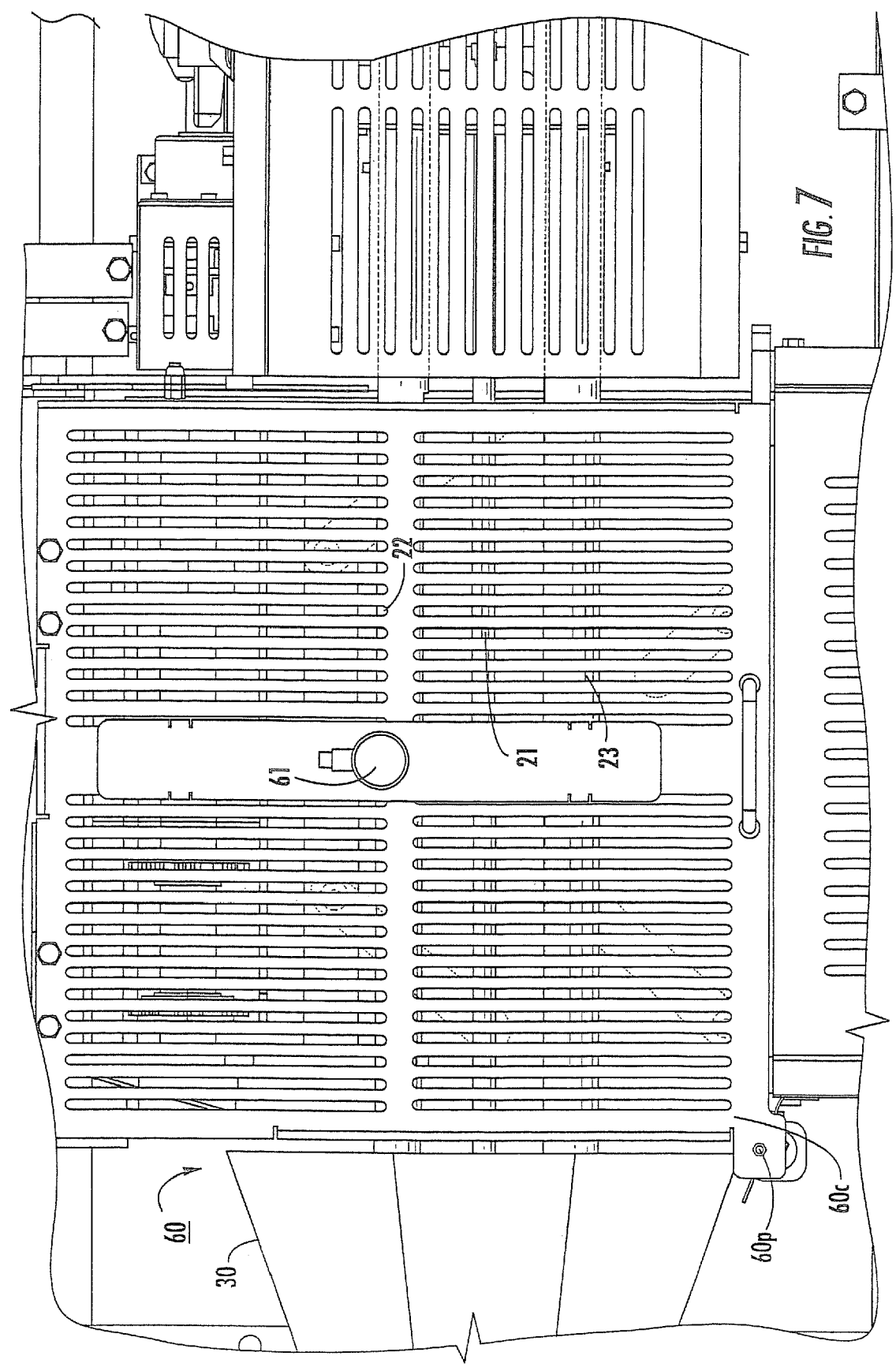
FIG. 7 is an enlarged top view of a product transfer zone that can form a portion of the device shown in FIG. 1 according to embodiments of the present invention.

FIG. 7 illustrates the product transfer zone 60 with a ceiling or lid 60c that overlies the floor 60f and a sensor 61 held in the ceiling 60c. The underlying product pusher assembly 20 is shown deployed with the pusher head 20h extended into the product chute 30. The ceiling 60c may be pivotably mounted 60p to the frame of the apparatus 10 to allow an operator easier access to the transport zone 60 for clearing misfeeds and the like. The sensor 61 can be an ultrasonic sensor configured to identify when a product is in a suitable deployable position in the underlying space of the product transfer zone 60. This data can be fed to a controller that can then timely activate the actuation cylinder to advance the product pusher assembly 20. In operation, if an expected product is not delivered to the product transfer zone 60 within a predetermined time, a timing circuit (typically included in the machine control logic program code) can automatically stop the infeed conveyor 50. An operator can restart the apparatus 10 by depressing the start pushbutton.

Figure 14:
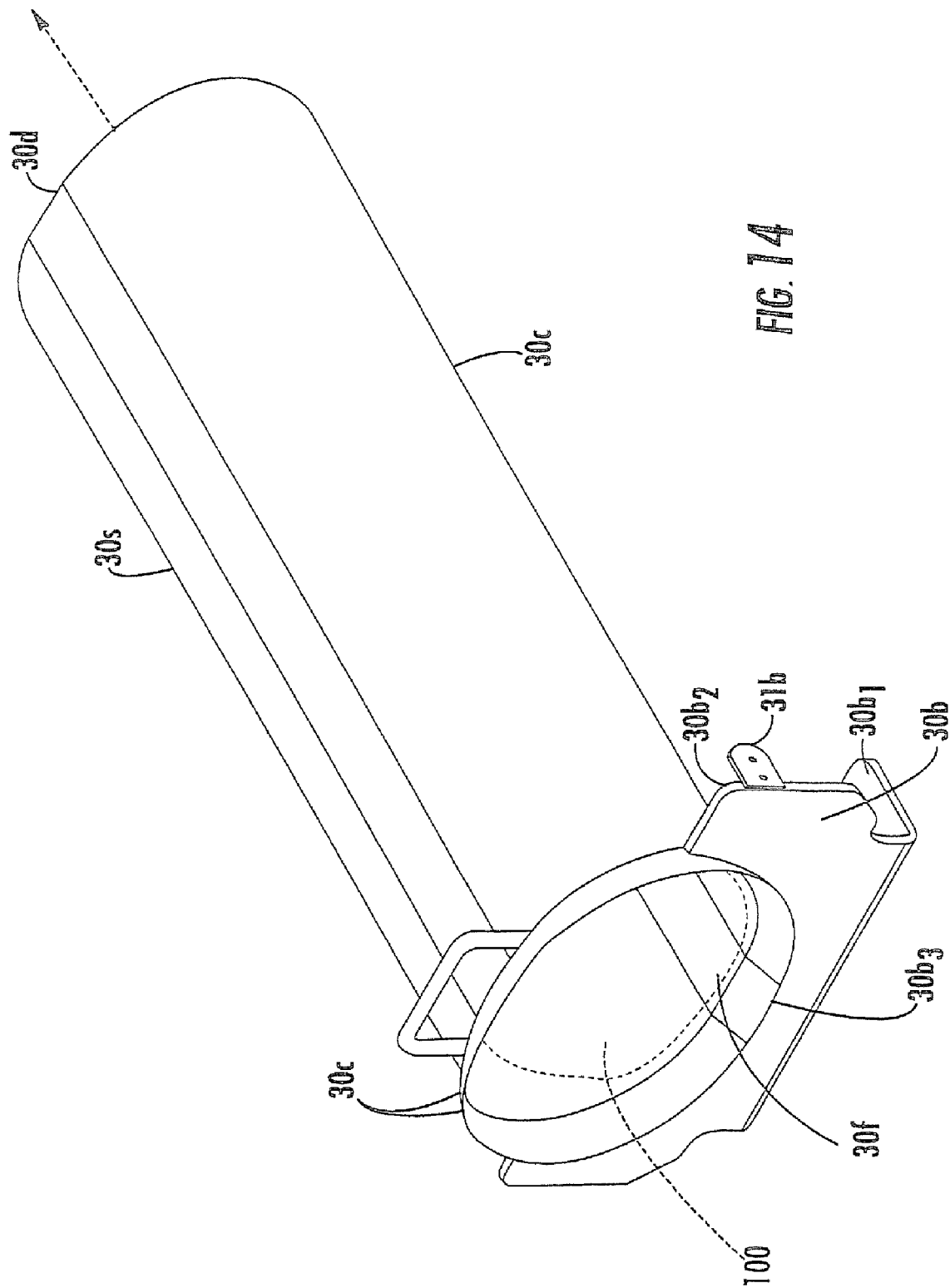
FIG. 14 is a side perspective view of the chute shown in FIG. 13 according to embodiments of the present invention.

As shown in FIG. 5, the apparatus 10 may include another sensor 31 positioned proximate the receiving end of the product chute 30. The sensor 31 is configured to confirm that the product chute 30 is in operative position. When a product 100 is detected in the transfer zone 60, the activation of the product pusher assembly 20 may also be based on whether the product chute 30 is determined to be in proper position using data from the sensor 31, typically positioned on the frame thereat. An exemplary sensor is a two-part magnetic switch, one part can be positioned on a mounting bracket 31b attached to a chute bracket 30b as shown in FIG. 14 and the other part held on the mounting frame 10f. When the two matable parts of the switch 31 engage, the chute 30 is determined to be in proper position. Other types and/or additional sensors may also be used as suitable as is known to those of skill in the art.

A controller/processor (such as a Programmable Logic Controller) may be configured to monitor a signal from this sensor 31 and deactivate the product pusher assembly (release cylinder pressure) automatically whenever a product chute 30 position-error is noted at any time during the process. The signal can be automatically monitored through a Safety Circuit Module. If the product chute 30 is missing or out of position, the apparatus 10 can be held in a low energy state that removes power to air supplies and controls to inhibit machine operation. To reinitiate the procedure, an operator may press a restart or reset button. In certain embodiments, the clipper 40 may be operated on override even when the chute 30 is absent. Once the product chute 30 is in location and the stop is reset, power air can be applied to the machine control valves and electric power can be applied to the control (PLC) outputs. After the PLC determines the positions of the moveable components, such as the product pusher assembly 20, the clipper 40, the product holding member 75, and the like, an automatic reset can be performed and those components automatically moved to a respective home position as needed.

Figure 8:
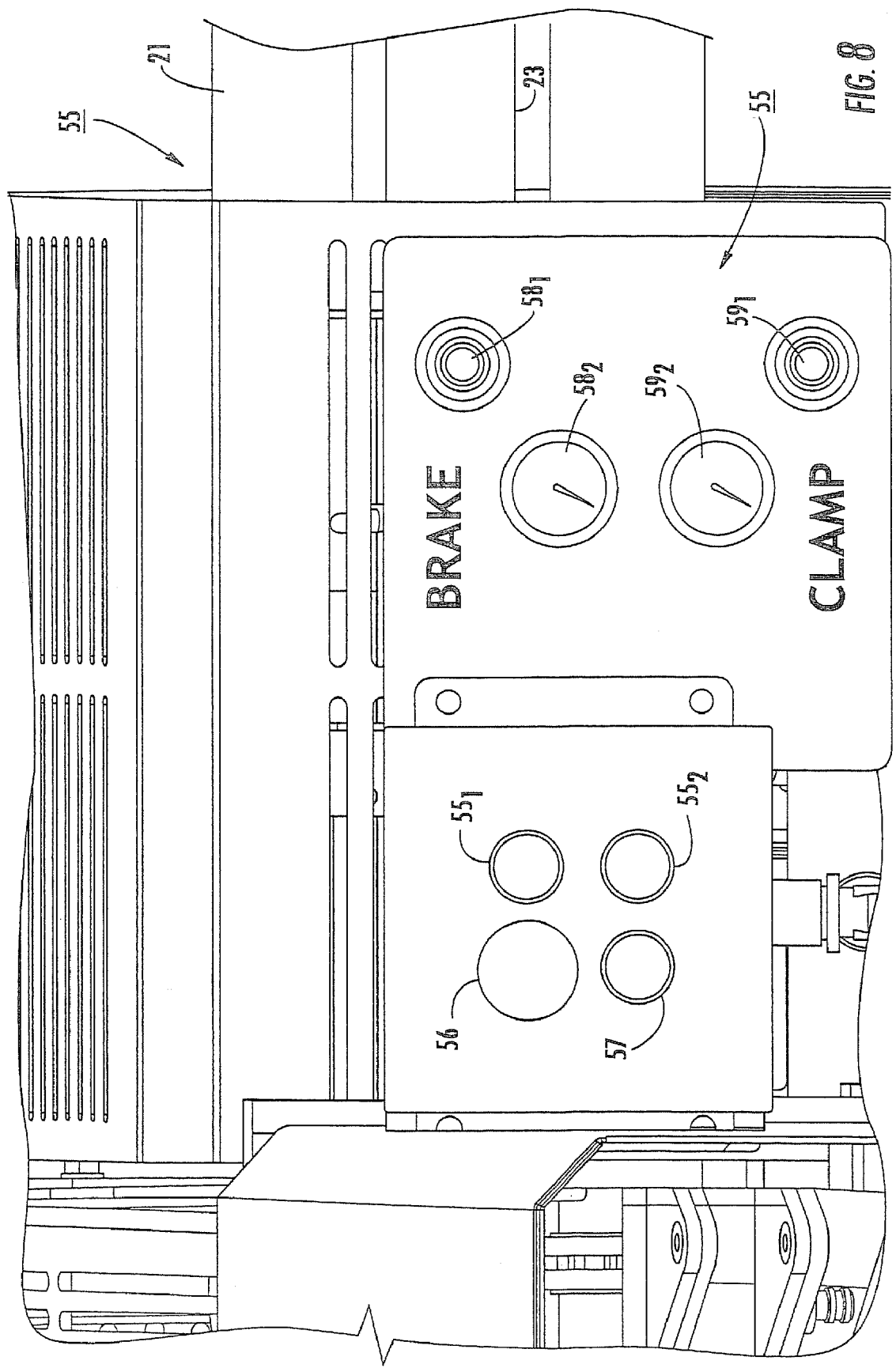
FIG. 8 is a front view of a human interface station suitable for use with the device shown in FIG. 1 according to embodiments of the present invention.

FIG. 8 illustrates the HMI can include a start button 57, an emergency stop button 56, a reset button $55_1$ and a clipper only activation button $55_2$. The HMI can also include two pressure regulator $58_1$, $59_1$ and corresponding gages $58_2$, $59_2$, the pressure monitors can be for the retractable product holding member 75 (FIG. 3), (which may be described as a product clamp bar) and one for a retractable brake system 90 (FIG. 24), typically used to selectively apply brake pressure to the covering material proximate the discharge end portion of the product chute 30.

As shown, the apparatus 10 may be configured to allow the clipper 40 to operate irrespective of the upstream devices using the clipper pushbutton $55_2$ instead of the apparatus start pushbutton 57. The HMI can also include an emergency stop 56 and reset $55_1$ pushbutton or other type of switch as shown.

Figure 9:
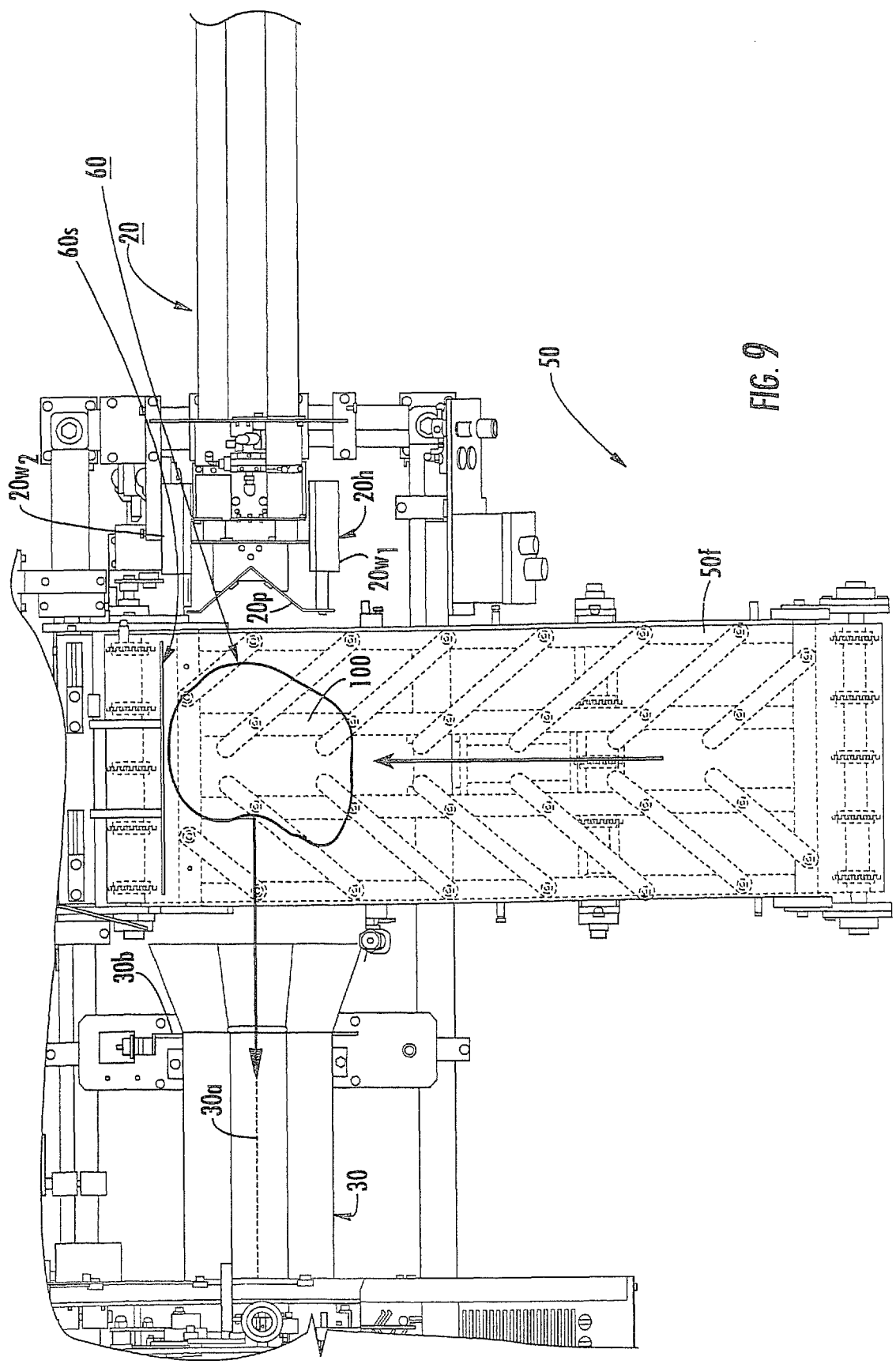
FIG. 9 is an enlarged top view of a portion of the device shown in FIG. 1, similar to that shown in FIG. 5, but shown with certain screens or housing components removed for clarity according to embodiments of the present invention.

FIG. 9 illustrates a product 100 on the floor 50f of the conveyor 50 and positioned in the product transfer zone 60. The product 100 is stopped by a product stop plate 60s from progressing out of the outer perimeter of the chute 30 so that the product is in communication with the inlet portion of the chute 30 and so that the product pusher assembly 20 will be able to push the product 100 axially downstream through the product chute 30 substantially about the chute axis 30a.

It is noted that in lieu of and/or with the conveyor 50, other moving floors or product advancement systems may be used. For example, rollers, rolling bars, belts or drives that progress trays or other support members and the like. In addition, the moving floor may be angularly oriented to travel up, down, or otherwise to advance the product to the product transfer zone 60. In addition, the apparatus 10 can include an automated continuous advancement system with discrete product(s) separated at desired intervals on the moving floor to serially introduce product for packaging to the chute 30. In certain embodiments, the moving floor can include partitions, channels, or other spacer configurations to hold the product(s) in desired alignment on the moving floor so that, when the proximity sensor indicates the product is present, the partition or channel provides the desired product stop.

For groups of objects, manual or automated bins or feeders can accumulate the desired amount of grouped objects upstream and place them together on the moving floor (not shown). In other embodiments, an automated counter can be used to count the number of products that pass a target location or enter the transfer zone 60 so that a desired number of products are accumulated in the transfer zone 60 and then activate the product pusher assembly 20 (not shown).

FIG. 9 also illustrates that the pusher head 20h can be configured with a product pusher plate 20p that is adapted to contact the product 100 (such as food) as the pusher assembly 20 extends forward. The pusher head 20h can also include axially extending guidewalls $20w_1$, $20w_2$. The pusher head 20h can be sized and configured to substantially fill the chute cavity 30c to thereby inhibit objects from attempting to migrate downstream during the pushing operation. The pusher plate 20p is shown in FIG. 9 as a forward portion adapted to contact the product which, when viewed from the top, comprises side portions that angularly converge to a peak and/or a substantially "V" shape, other configurations and shapes may also be used as will be discussed further below. FIG. 9 also illustrates the assembly 20 and/or the product pusher head 20h in a home or resting position.

Figure 10:
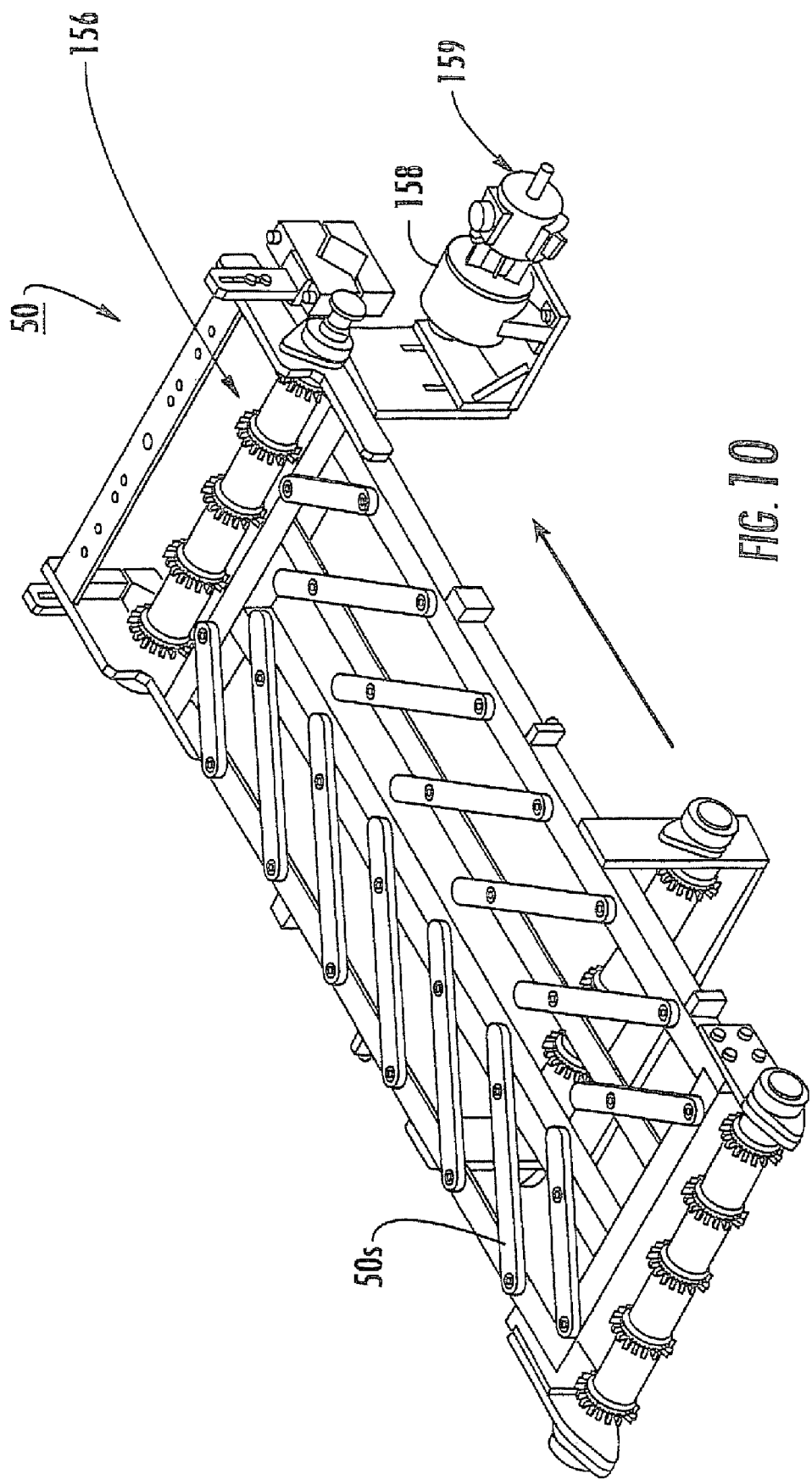
FIG. 10 is a side perspective view of a product infeed conveyor (with the conveyor belt removed) that may be suitable for use in the device of FIG. 1 according to embodiments of the present invention.
Figure 11:
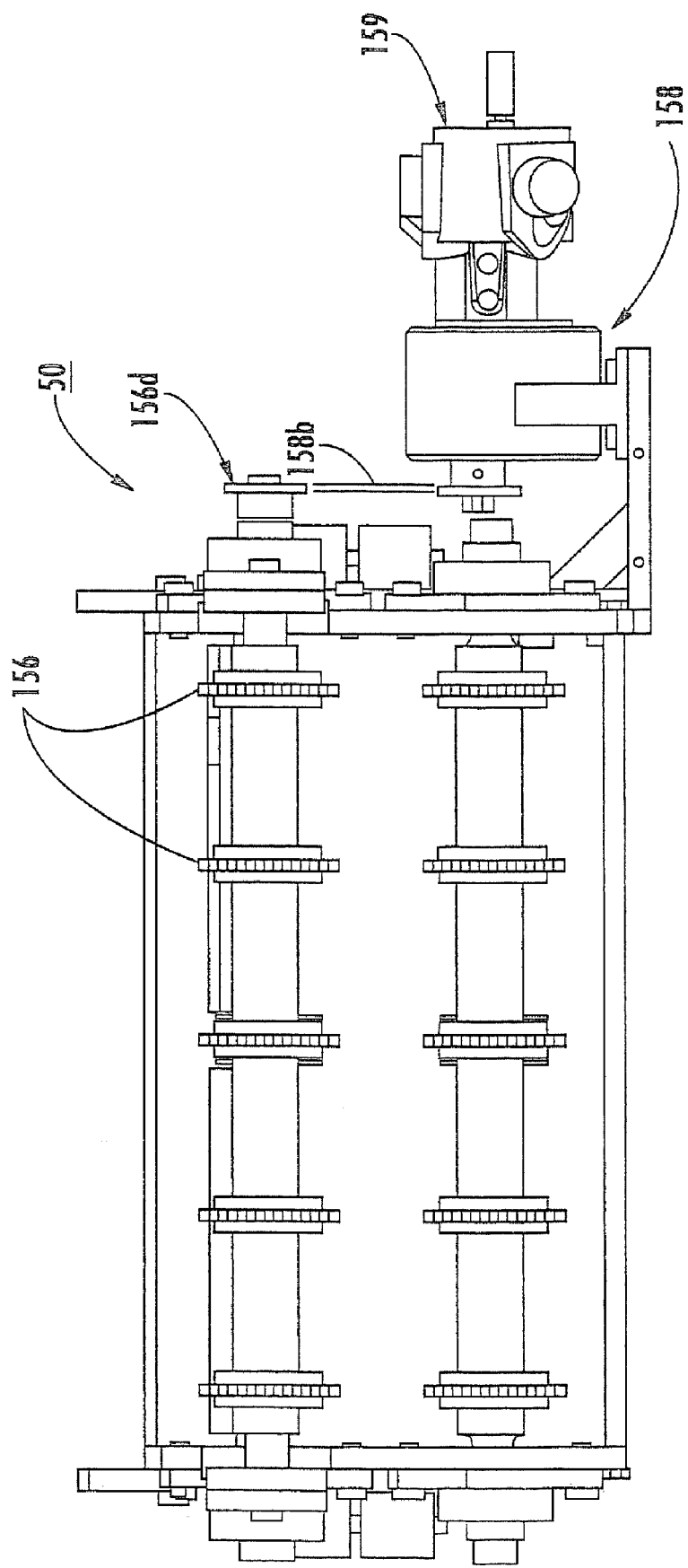
FIG. 11 is a front view of the conveyor shown in FIG. 10.
Figure 12A:
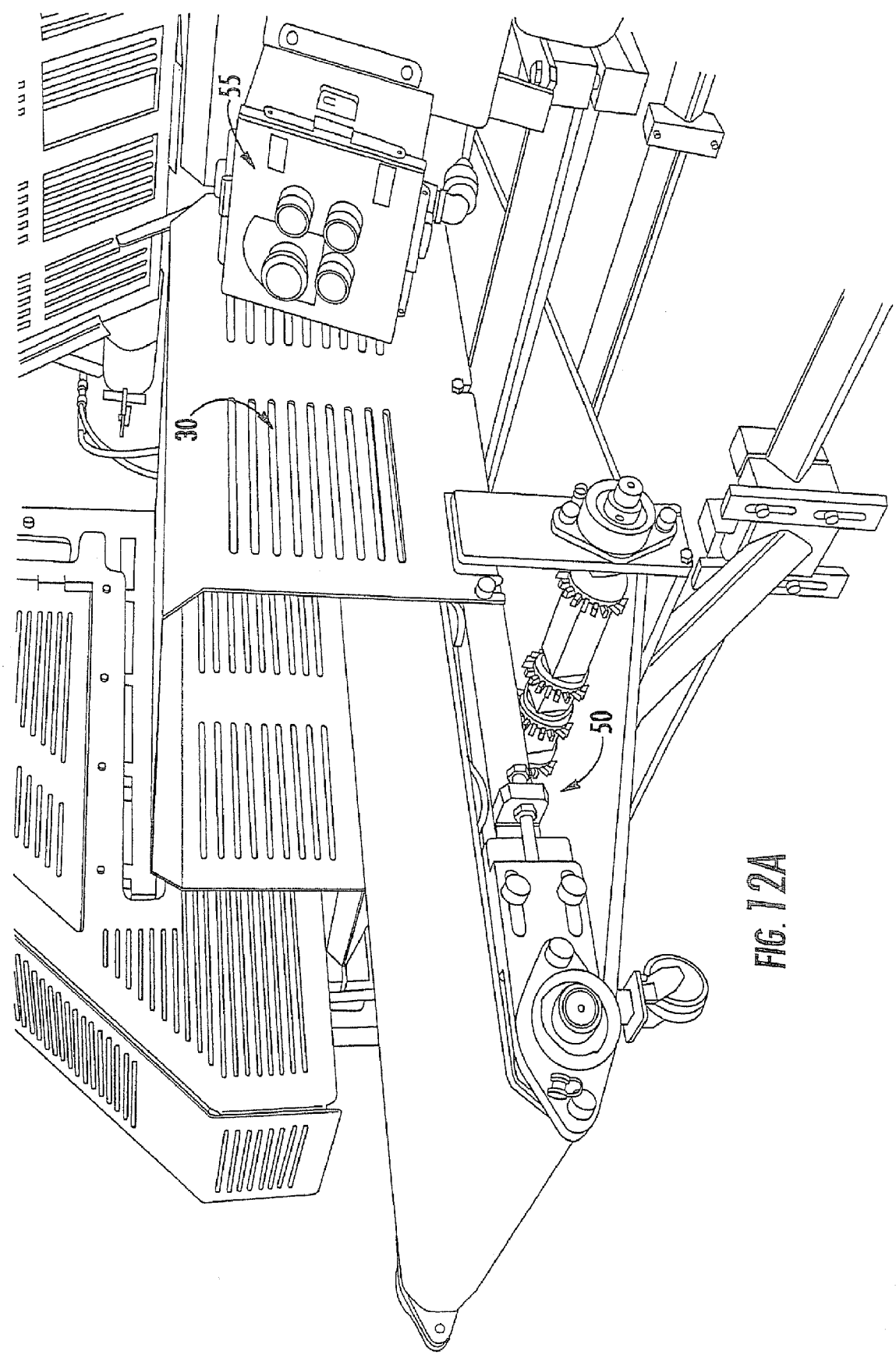
FIG. 12A is a partial front perspective view of the device shown in FIG. 1 illustrating the conveyor shown in FIG. 10 with an exemplary conveyor belt in place according to embodiments of the present invention.
Figure 12B:
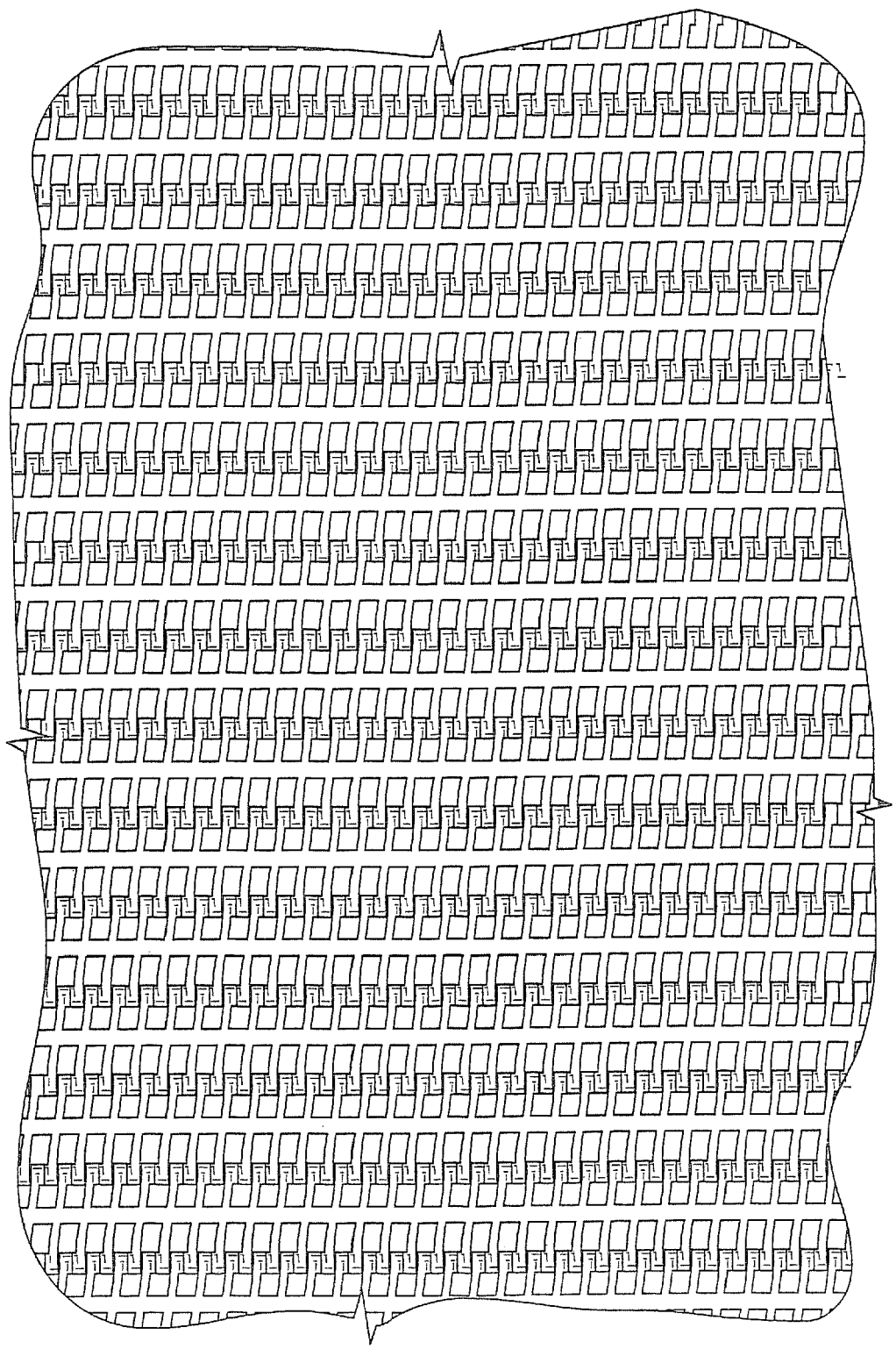
FIG. 12B is a top view of an exemplary flooring surface according to embodiments of the present invention.

FIGS. 10 and 11 illustrate an example of a conveyor system 50 (with the floor and/or belt removed). The system 50 includes a DELRIN conveyor floor support 50s, belt drive sprockets 56, air motor 57 and gear box 58 that automatically advance the conveyor floor 50f. A drive sprocket chain or belt 58b is shown in position in FIG. 11 attached to a drive member 56d connecting the sprockets 56 and the gearbox 58. The arrows in FIG. 10 represent the direction of movement. The conveyor floor 50f material may be an open mesh, interlocking material. FIG. 12B illustrates an example of a commercially available conveyor belt material comprising an interlaced composite material and FIG. 12A illustrates the conveyor floor/belt 50f in position on the conveyor system 50. Generally stated, in the embodiment shown, the conveyor floor 50f is driven by a series of sprockets 56 that engage the weave and/or underside of the conveyor floor 50f. A radial piston air motor 57 drives the conveyor floor 50f through a speed reduction gearbox 58. Power is transmitted to the conveyor drive roller via a chain and sprocket configuration.

Figure 13:
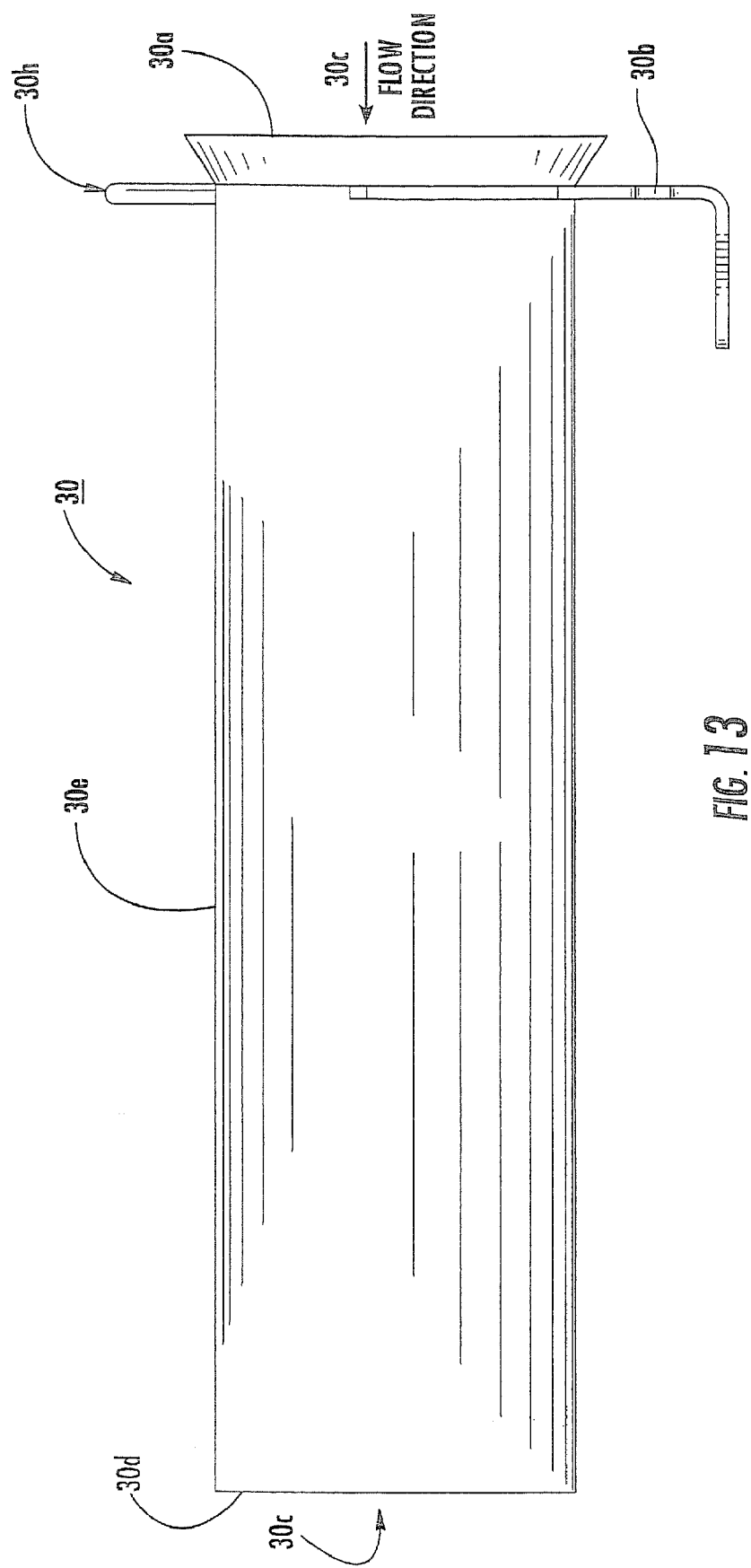
FIG. 13 is a side view of a product chute according to embodiments of the present invention.
Figure 46:
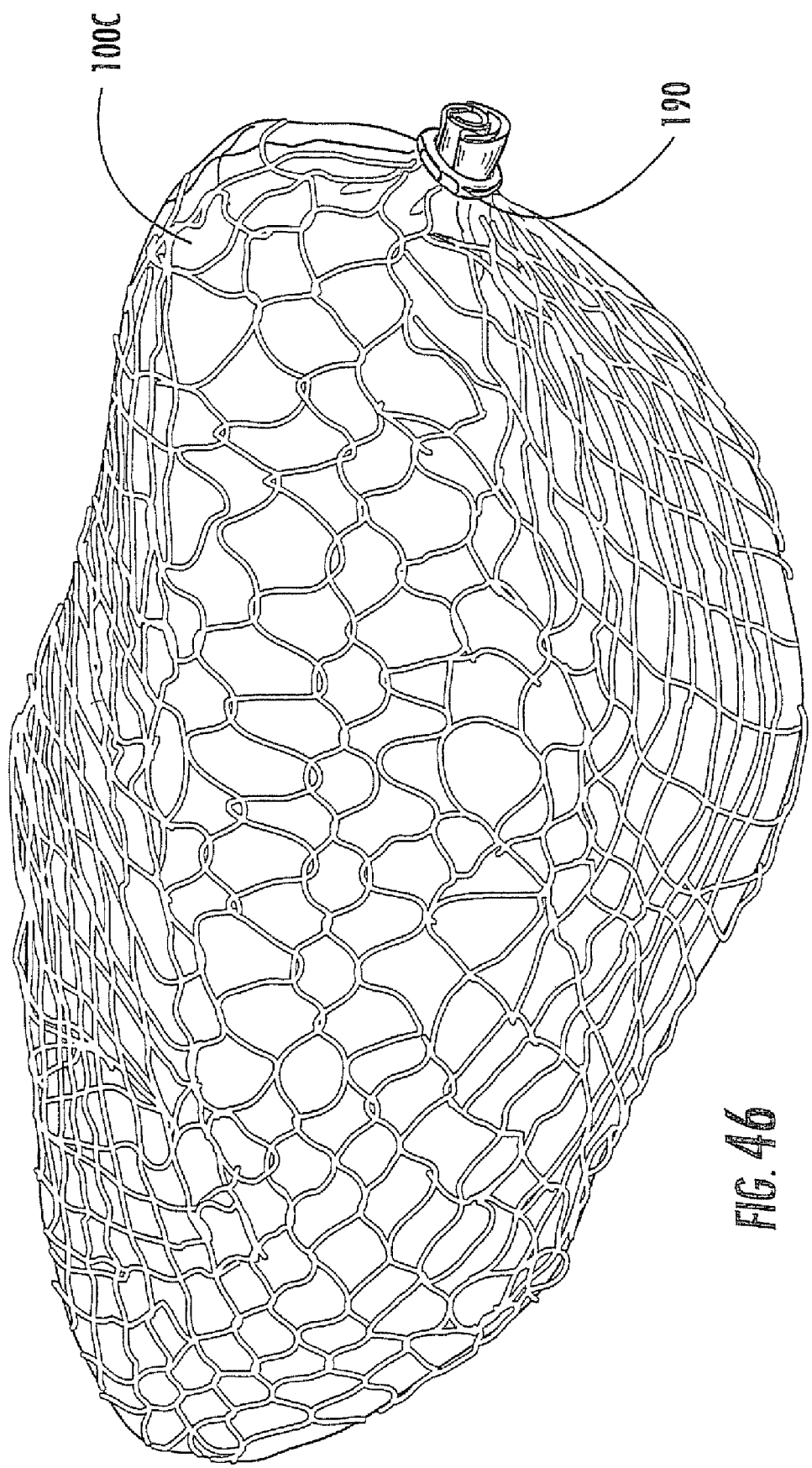
FIG. 46 is a photograph of an exemplary object automatically packaged in clipped netting employing apparatus and devices described above according to embodiments of the present invention.

FIG. 13 illustrates a side view of the product chute 30 held on a mounting bracket 30b. As shown, the product chute 30 can be an elongate product chute. The product chute 30 can include a larger front-end cavity area 30a (shown as a funnel-like shape) relative to the intermediate and/or discharging portion 30d, i.e., the chute cavity 30c narrows in the pushing/product travel direction. Thus, the product chute 30 can include a primary body and a larger upstream guide portion that narrows into the shape of the primary body. The chute 30 may be formed as a unitary member or a series of attached members (not shown). The chute 30 can include a lifting handle 30h to facilitate removal and installation. In operation, a supply of covering material (see, e.g., FIG. 46) can be placed on or about the chute 30, arranged to surround the exterior surface of at least a portion of the product chute 30 and extend in tension in the downstream direction to cover the product (tenting in the axial direction) as the product exits the discharge end portion of the product chute 30d. In certain embodiments, the covering material is configured and sized to stretch in at least the lateral direction and typically in both the lateral and axial directions as it is held on and dispensed from the product chute 30.

The product chute floor 30f may be a stationary floor as shown in FIG. 14. It is also noted that the product chute 30 may include a moving floor such as those types described above with respect to the infeed floor configurations. The chute 30 may be sized relative to the product 100 so that the product 100 extends across a major portion of the width of the cavity, and in certain embodiments, extends across at least about 75% of the width of the cavity. In certain embodiments, the product 100 and chute cavity 30c are sized so that the sides and/or top and bottom of the product 100 are pressed against the sidewalls of the cavity as the product is pushed therethrough. The product chute 30 may comprise stainless steel and be coated with a friction reducing material such as TEFLON. Lubricants may also be disposed on the inner surface(s) of the product chute 30.

In certain embodiments, the product chute 30 has a cross-sectional profile that is non-circular. As shown in FIG. 3, the product chute 30 may be configured with a planar top and/or bottom portion and semi-circular side portions. Other cross-sectional profile configurations may also be used including, but not limited to, circular, oval, triangular, rectangular, square and the like.

As shown in FIGS. 13 and 14, the product chute 30 can be configured to mount on a mounting bracket 30b that fits into a frame on the apparatus 10. The mounting bracket 30b may also hold the safety proximity or interlock sensor using bracket 31b as discussed above. The bracket 30b can include a planar platform 30b, (typically mounted substantially horizontal) that is connected to an upwardly extending segment $30b_2$ (typically substantially vertical). The upwardly extending segment $30b_2$ can include a center receiving channel portion $30b_3$ that is sized and configured to receive the contour of the bottom portion of the chute 30 (i.e., may be sized and configured to substantially correspond with the profile of a lower portion of the product chute).

The mounting bracket 30b can be configured to relatively easily attach to and be removed from the frame of the apparatus 10 so as to be releasably mountable thereto. The mounting bracket 30b can hold the product chute 30 in alignment with the clipper mechanism 40 downstream and the product pusher mechanism 20 upstream. In certain embodiments, the system 10 can include a first product chute and a respective first mounting bracket 30b and a second product chute 30 releasably mountable to the apparatus frame 10 at the same position (interchangeable chutes) using a respective second mounting bracket 30b that can be configured substantially the same as the first mounting bracket 30b. In other embodiments, the product chute 30 can be lifted off of the mounting bracket 30b (leaving the mounting bracket in place) and another chute 30 placed thereon. The second product chute may be sized and configured the same as the first product chute 30 and loaded with a second supply of covering material. The covering material may be the same as that of the first product chute or different. Thus, the respective first and second mounting brackets 30b can be configured as quick disconnect components (merely loosening and/or releasing attachment hardware) to allow the first and second product chutes 30 to be interchanged on the system 10 in under 5 minutes, and more typically in under about 2 minutes, to allow an operator to employ at least one of a different size product chute, a different configuration product chute, different packaging material dispensed by the product chute.

In other embodiments, a plurality of chutes 30 can be mounted on a sliding or movable track that can serially move a selected chute out of and/or into the operative position (not shown). The plurality of chutes 30 may be positioned side to side or above and below (vertically stacked) each other, mounted on a carousel, and the like so as to automatically move into and out of position. In operation, an operator or an autoloader can place a sleeve of covering material on one or more chutes 30, select the order of presentation (based on the type of product being dispensed and/or the type of covering material desired), and proceed to move the chutes serially into operative position so as to be aligned with the product pusher assembly 20 and the clipper 40. In this manner, the apparatus 10 can be preloaded or reloaded with covering material limiting any downtime associated therewith.

Figure 15:
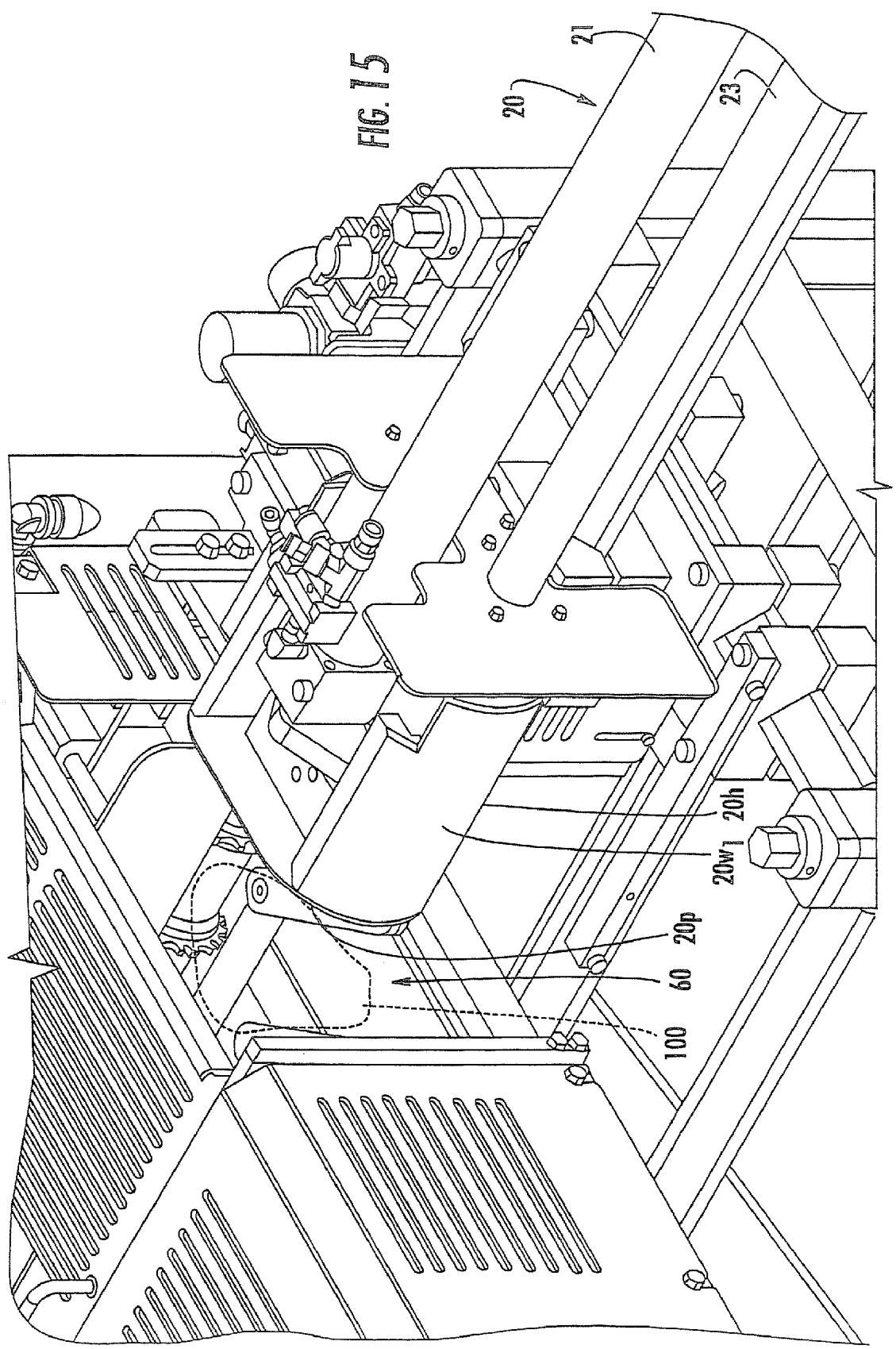
FIG. 15 is an enlarged perspective view of the device of FIG. 1 illustrating a product pusher mechanism in a retracted position upstream of the product transfer zone and illustrates a pusher head having a flat product pusher plate according to embodiments of the present invention.
Figure 16:
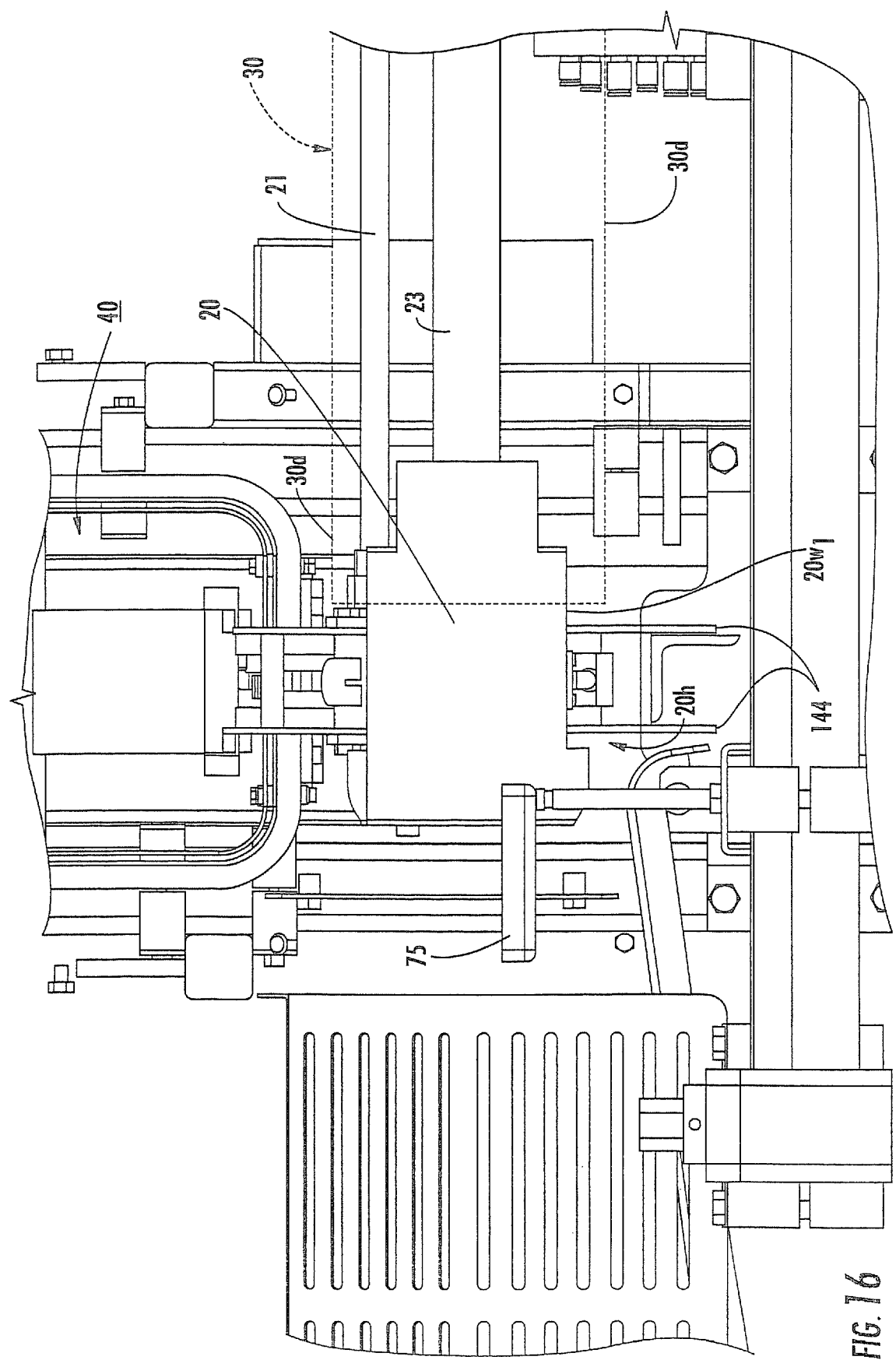
FIG. 16 is a front view of the product pusher mechanism of FIG. 15 in an extended position downstream of the product transfer zone and illustrates a pusher head having a "V" shaped product pusher plate according to embodiments of the present invention.
Figure 17:
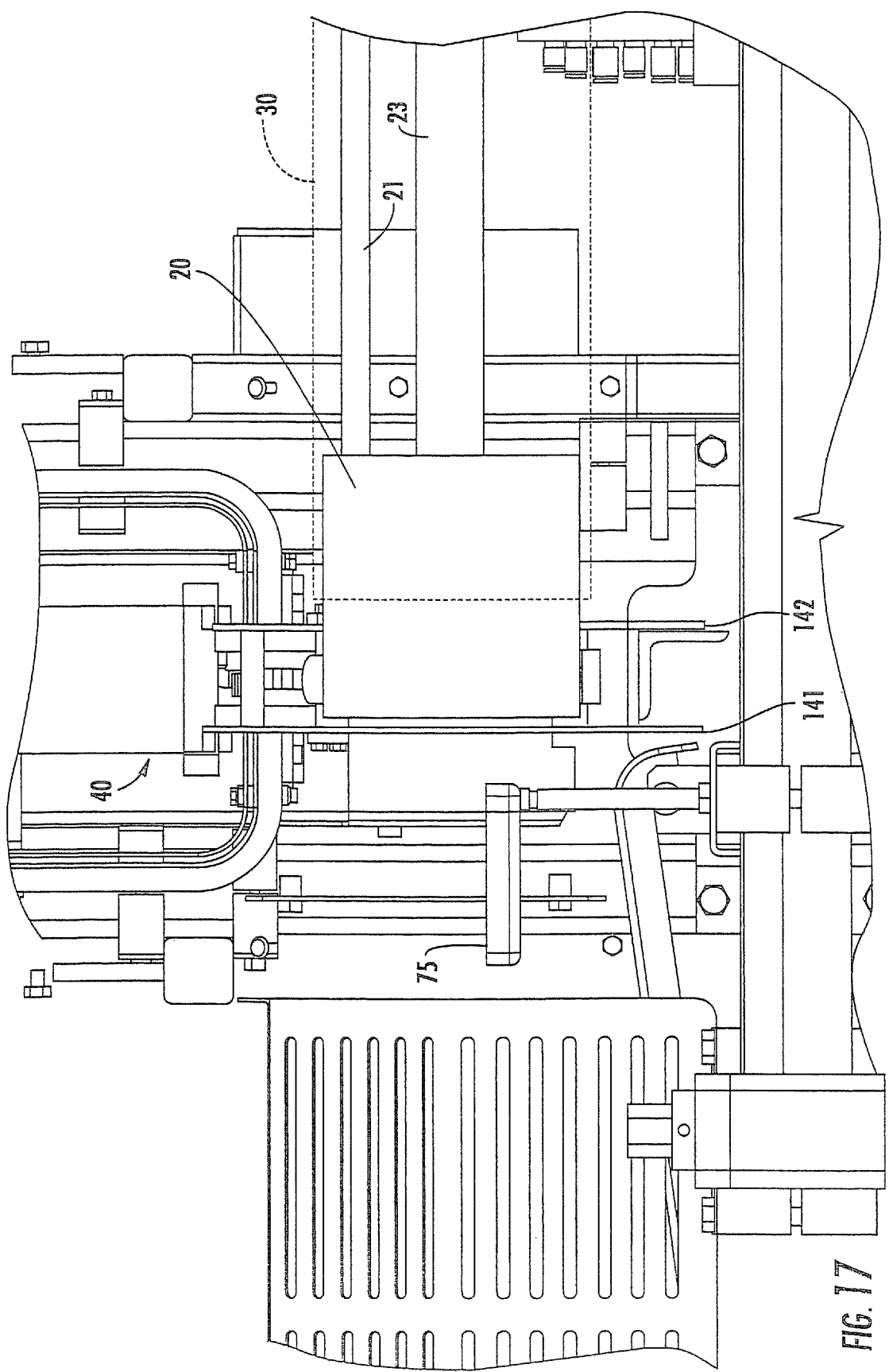
FIG. 17 is a front view of the product pusher mechanism of FIG. 15 in an extended position downstream of the product transfer zone according to embodiments of the present invention.

FIG. 15 illustrates the product pusher assembly 20 in a retracted position while FIGS. 16 and 17 illustrate the product pusher assembly 20 in extended positions. The chutes 30 are shown translucent for viewing of the spatial relationship with components of the pusher assembly 20. As shown in FIG. 16, the product pusher mechanism 20 is configured to limit the travel of the pusher head 20h so that at least a portion of the pusher head 20h remains inside the product chute 30 at a furthermost operative extension position (extended position) of the product pusher mechanism 20. The pusher head 20h exits the chute a greater length in the embodiment shown in FIG. 16 relative to that shown in FIG. 17. In FIG. 16, the forward portion of the pusher head 20h passes the downstream of the gathering plates while in FIG. 17, the pusher head stops short of the most downstream gathering plate (the gathering plates will be discussed further below). In operation, the pusher head 20h is configured to push the product from the discharge end of the chute 20d so that the covering material extends a sufficient distance therefrom to allow an automated clipping operation to be carried out.

As described above, the product pusher mechanism 20 comprises a pair of spaced apart elongate guidewalls $20w_1$, $20w_2$ positioned on opposing sides of the forward portion of the pusher head 20h to help guide the pusher head in the product chute 30. The guidewalls $20w_1$, $20w_2$ may have a length that is less than the length of the product chute 30. The guidewalls $20w_1$, $20w_2$ may each connect to a guide rod 23, 22, respectively. The guiderods 22, 23 may be symmetrically arranged with respect to the intermediately located pusher cylinder 21. As shown in FIGS. 1 and 5, the product pusher assembly 20 can operate using a fluid-actuated cylinder 21 (typically a pneumatic cylinder) that is longitudinally mounted on the apparatus 10 in the axial direction. The centerline of the cylinder 21 may be aligned with the product chute centerline 30. The two guide rods 22, 23 can be stainless steel guide rods mounted in a linear ball bearing block assembly. As noted above, the guide rods 22, 23 can act as an anti-rotation stabilizer for the product pusher assembly 20 and/or help guide the assembly 20 to travel in a substantially straight line through the product chute 30 as the assembly 20 travels repetitively through extended and retracted configurations.

Figure 18:
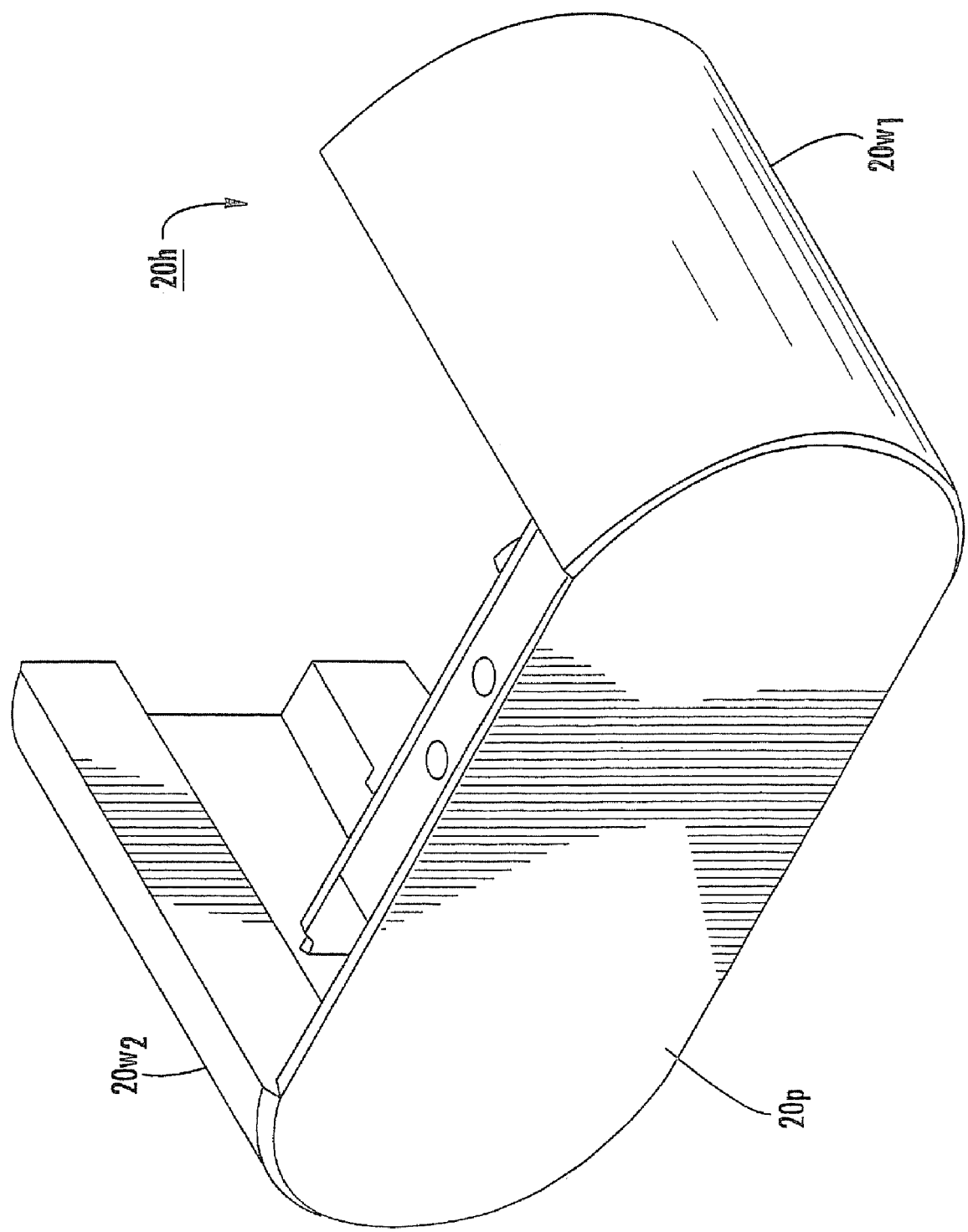
FIG. 18 is a side perspective view of a pusher head according to embodiments of the present invention.
Figure 20:
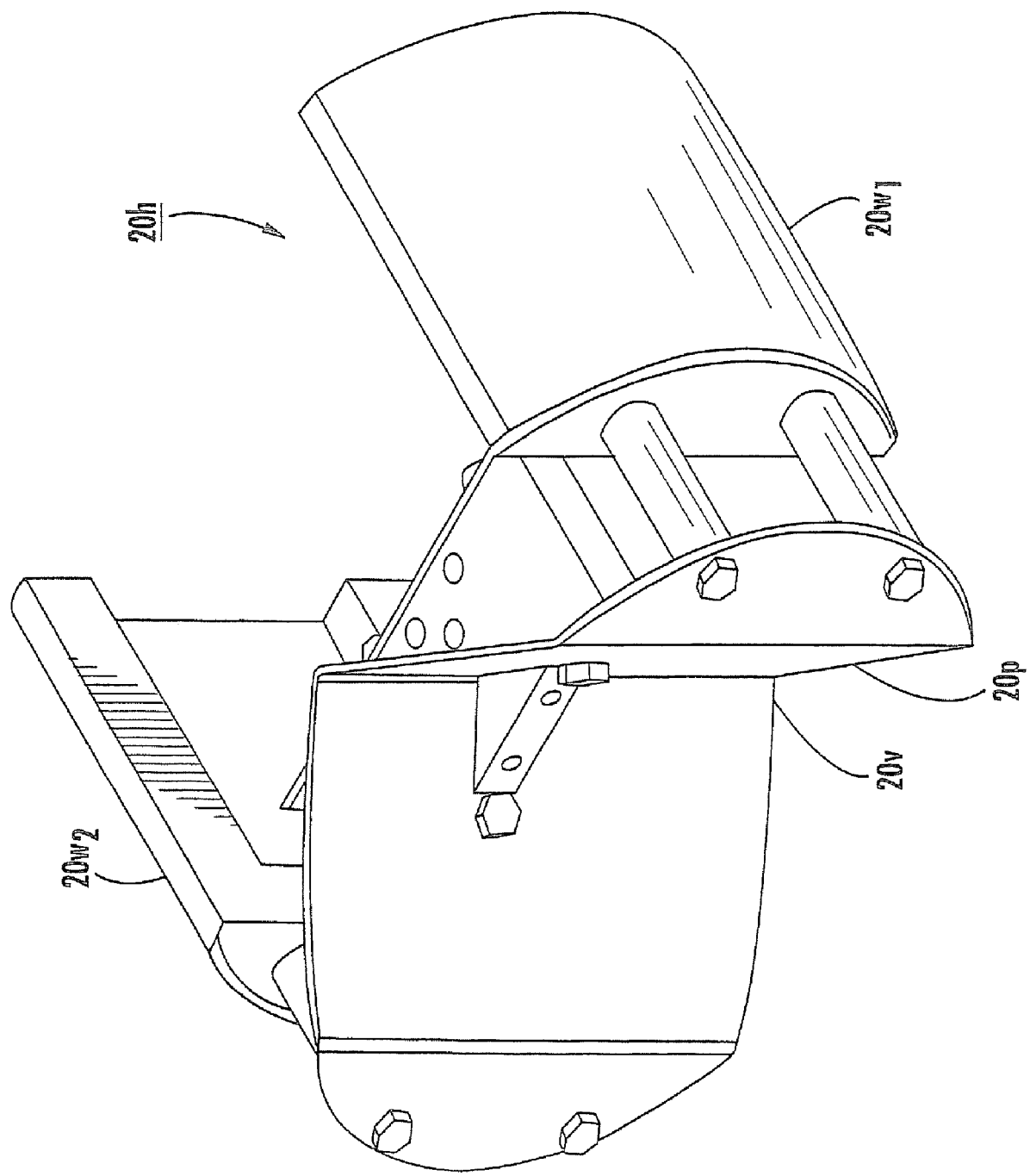
FIG. 20 is a side perspective view of yet another alternative pusher head according to embodiments of the present invention.

FIG. 16 and FIG. 18 illustrate the pusher head 20h with a substantially planar forward portion 20p (which may be formed by a plate) while FIG. 17 and FIG. 20 illustrate the pusher head 20h with an inverted "V" configuration and/or when viewed from the top, the forward portion comprises side portions that angularly converge to a valley 20v. FIG. 20 illustrates the pusher head 20h with a "V" configuration and/or with side portions that converge to a peak 20pk. The peak or valley may be symmetrically or asymmetrically positioned on the contacting portion of the pusher head 20h. The shape of the product-contacting portion 20p of the pusher head 20h may influence the orientation of (typically attitude) of the product inside the netting as it exits the chute 30.

Figure 19:
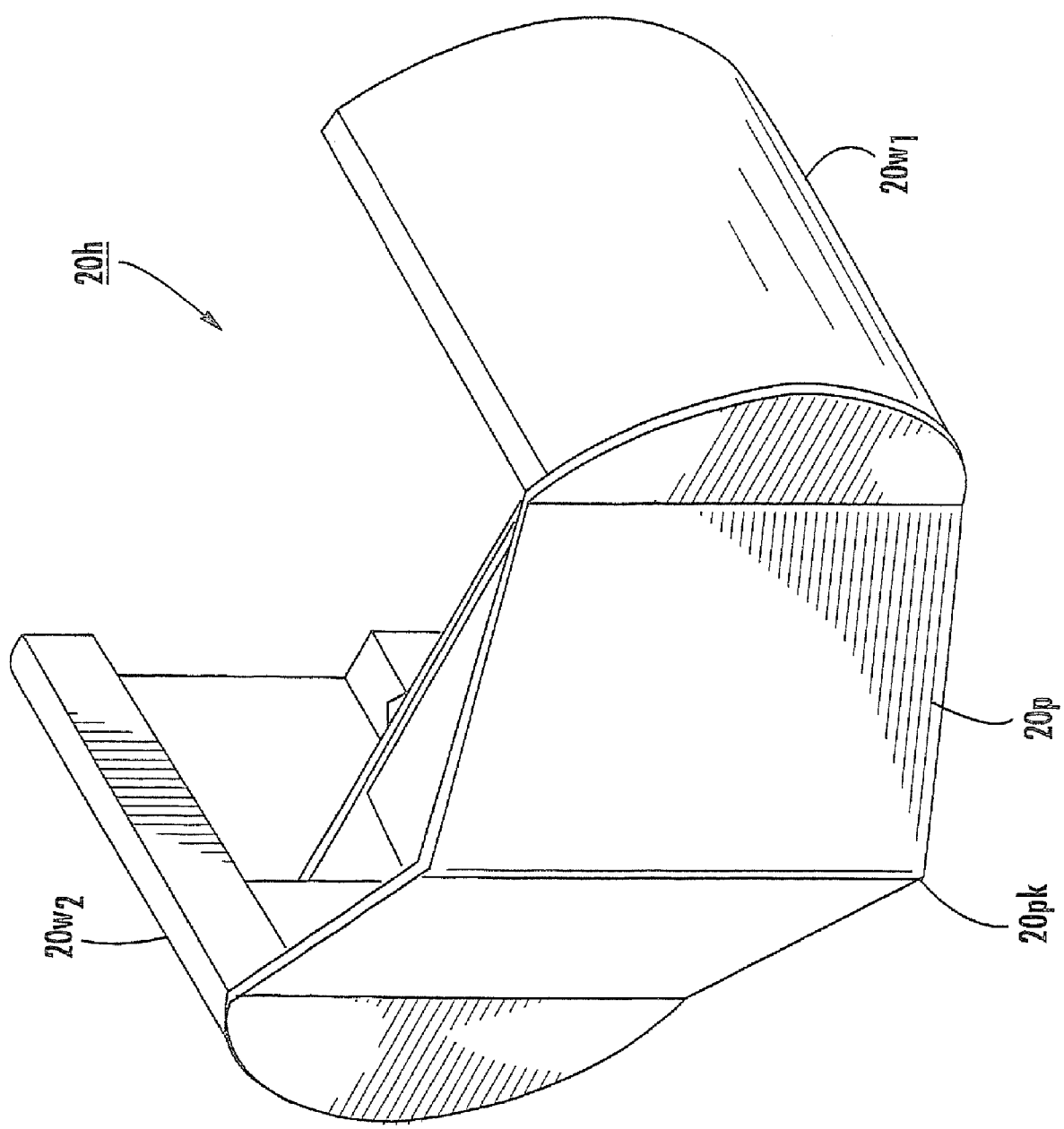
FIG. 19 is a side perspective view of an alternative pusher head according to embodiments of the present invention.

Referring to FIGS. 18-20, the guidewalls 20$w_1$, 20$w_2$ and/or the forward portion 20p of the pusher head 20h may be formed of and/or coated with a non-stick material (and/or lubricant) such as TEFLON. In particular embodiments, such as for packaging of meat, the guidewalls 20$w_1$, 20$w_2$ may be formed of ACETYL while the forward portion 20p is formed of stainless steel. FIGS. 18 and 19 illustrate the guidewalls 20$w_1$, 20$w_2$ abutting the rear surface of the forward portion 20p of the pusher head 20h while FIG. 20 illustrates that the guidewalls 20$w_1$, 20$w_2$ may be separated a distance from the forward portion 20p.

Figure 21:
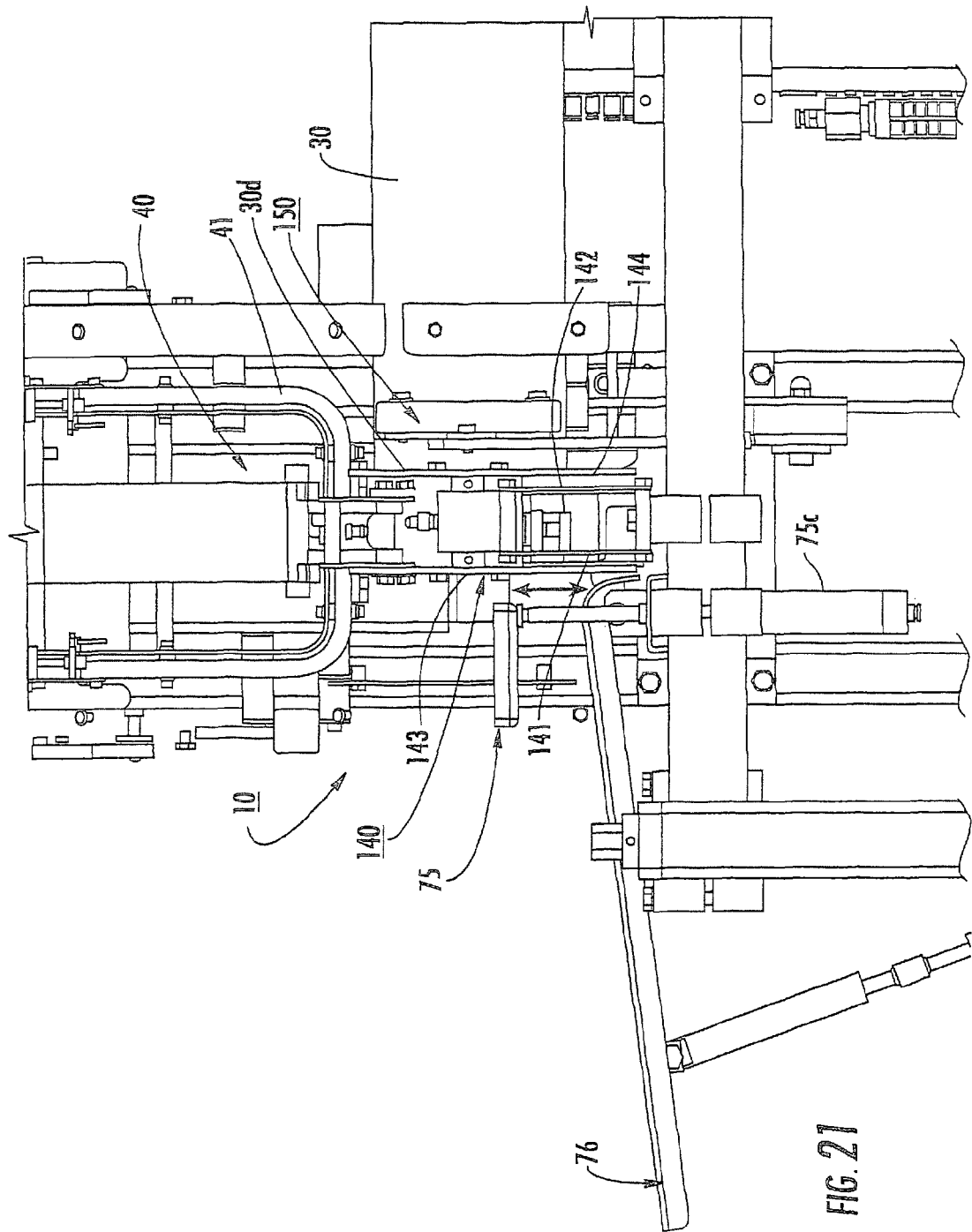
FIG. 21 is an enlarged partial front view of the downstream portion of the device of FIG. 1 illustrating, inter alia, a clipper mechanism, a retractable package holding member and product table according to embodiments of the present invention.
Figure 22:
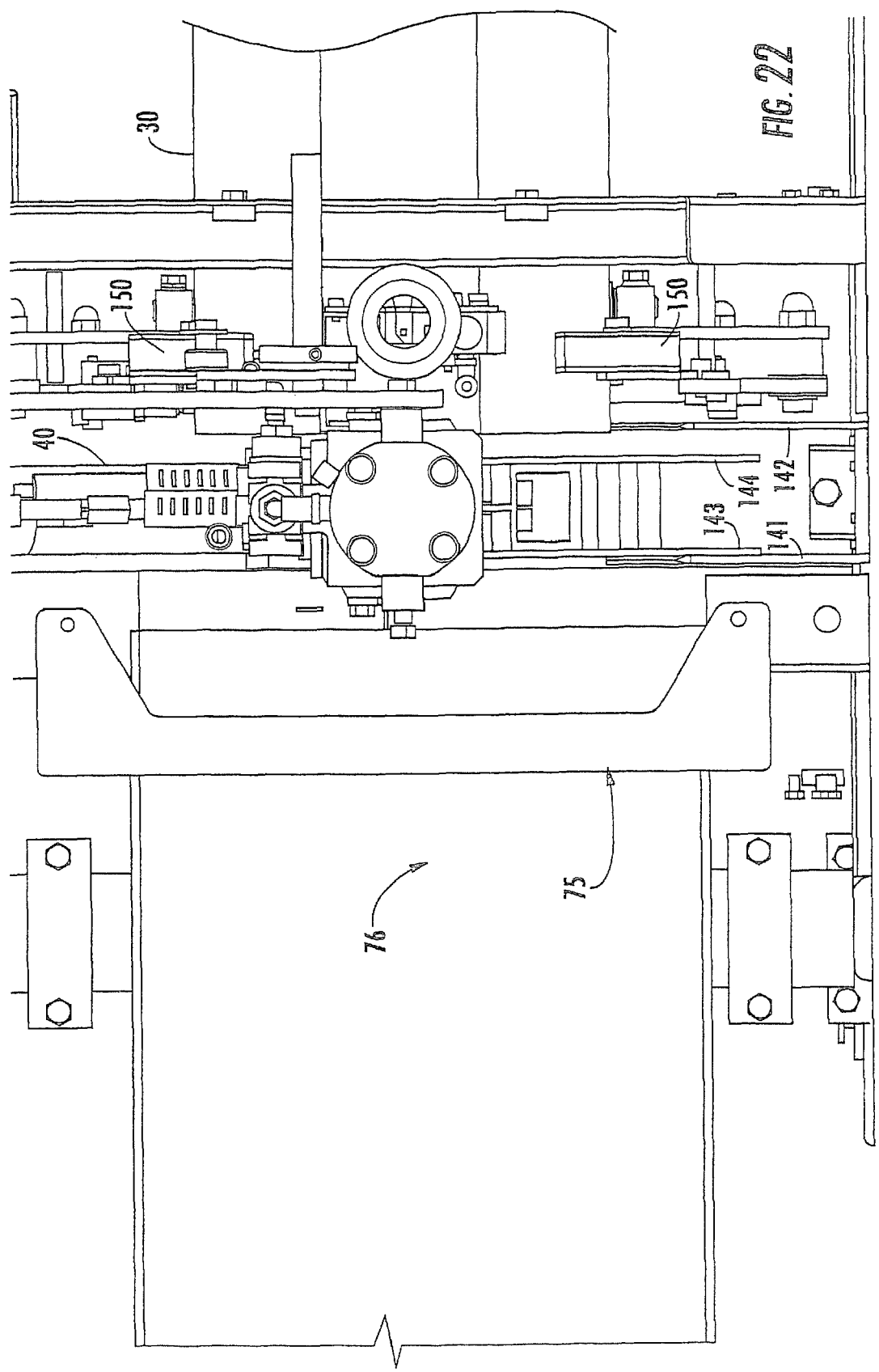
FIG. 22 is a top view of the portion of the device shown in FIG. 21 according to embodiments of the present invention.

FIG. 21 illustrates a downstream portion of the apparatus 10 according to certain embodiments of the present invention. The discharge end portion of the product chute 30d terminates proximate the clipper 40. The product-holding member 75 (i.e., product clamp bar) can automatically be moved into position (shown as retractable in the vertical direction in FIG. 21) by actuating a clamp drive cylinder 75c and thereby block the product from moving further downstream. The holding member 75 may be configured to actuate to its operative holding position prior to retraction of the product pusher assembly 20 and to clamp onto the encased product to inhibit the product from migrating back into the chute as the product pusher head 20h is retracted. The holding member 75 can also hold the encased product so that the upstream covering material is relatively firmly or tightly held proximate the clipper 40 and/or facilitate centering the covering material during the gathering and clipping operations.

In certain embodiments, the normal position of the member 75 is above the horizontal product plane. This position allows the product to pass under the member 75 prior to actuation. Alternatively, the member 75 can reside laterally offset from the travel path and pivot, translate or swing into position. In yet other embodiments, the member 75 can normally reside retracted under the floor of the travel path. In any event, after a clipping operation, the holding member 75 can be automatically moved to allow the encased product to move downstream to the product table 76. The clipped encased product may be manually moved downstream or automatically moved downstream using the next product to push it onto the adjacent table or by configuring the adjacent travel floor as a moving floor.

The actuation of the cylinder 75c can be controlled by the PLC using proximity sensors and operation feedback as will be understood by one of skill in the art. The product holding member 75 can position the product so that the trailing edge portion of the covering proximate the encased product is held proximate a clip window (40w, FIG. 31) associated with the clipper 40. The product table 76 may be stationary. In other embodiments, the product table 76 may include a traveling floor that advances the packaged product to another processing or subsequent workstation (not shown).

Figure 23:
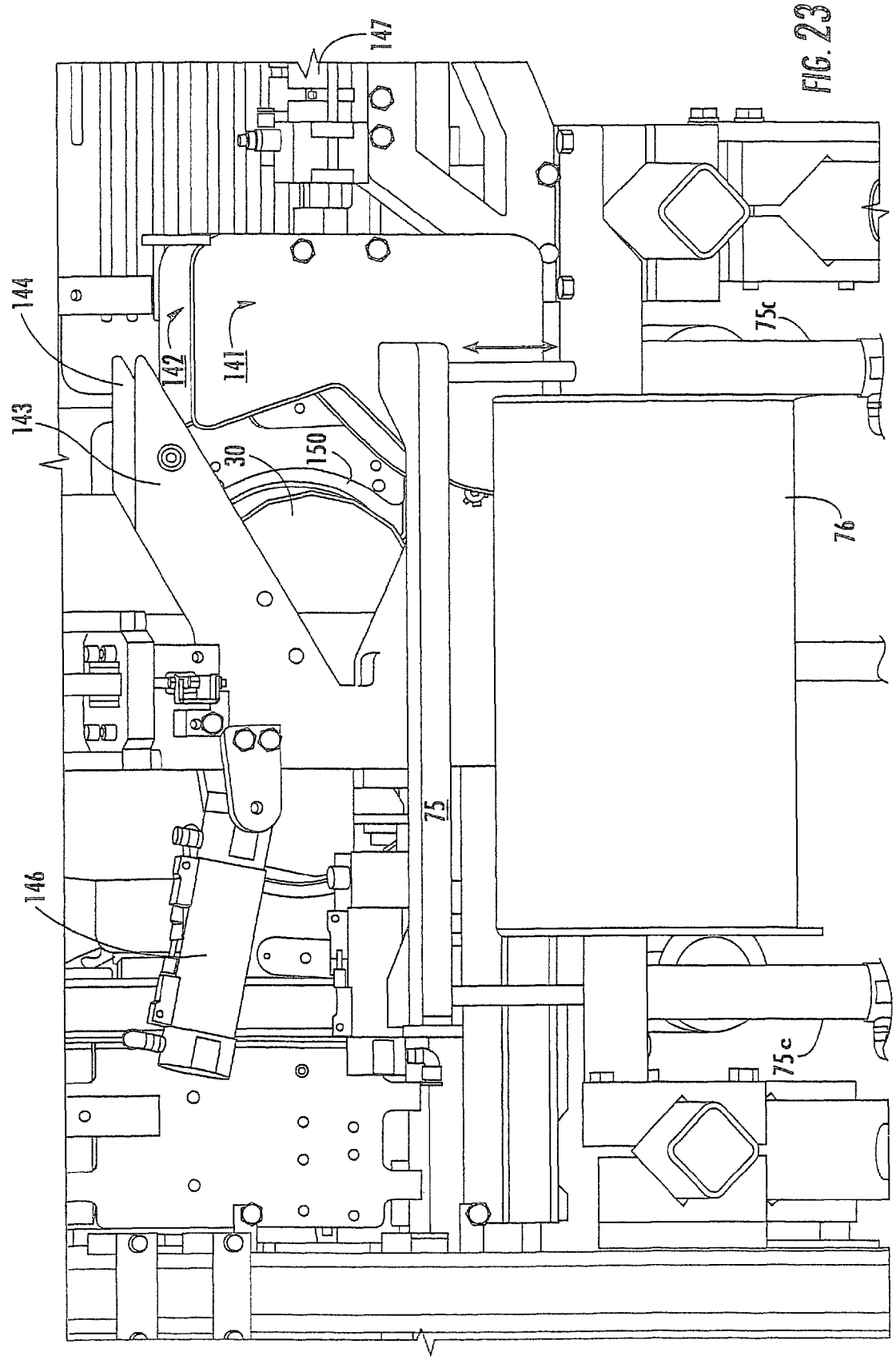
FIG. 23 is a left side view of the downstream portion of the device shown in FIG. 22 according to embodiments of the present invention.

The clipper 40 can include a curvilinear clip rail or channel 41 that is in communication with the clip window 40w to automatically supply clips to the underlying covering material. As shown in FIGS. 21 and 23, the clipper 40 can be positioned proximate a covering material gathering subassembly 140 comprising a plurality of gathering plates 141, 142, 143, 144 (FIG. 23) that are configured to automatically gather a portion of the tubular or sleeve of covering material to form the material into a rope-like and/or compressed configuration in preparation for receiving the clip(s) thereabout. The gathering plates 141-144 are configured to gather or compress the covering material that extends between the clipper 40 and the product chute discharge end portion 30d. Pairs of cooperating plates (i.e., 143, 141 and 142, 144) can be positioned across the product travel path to retractably travel toward each other, substantially orthogonal to the direction of product travel, to gather the covering material therebetween. In certain embodiments, gathering plates on the first side of the travel path may be mounted to the clipper 40 as will be discussed below and, hence be described as clipper gathering plates 143, 144. In particular embodiments, the gathering plates 141, 142 disposed on the opposite side of the travel path may be described as netting gathering plates for clarity of description. A brake assembly 150 may be configured to automatically deploy to selectively apply a force against the chute 30 to hold the covering material during the clipping operation as will be discussed further below.

Once the covering material is gathered, a clip or clips can be applied to secure the encased product in the covering material. The covering material can then be severed to release the encased product in the clipped package. Typically, two clips are applied substantially concurrently proximate to each other using a dual clipper 40 so that one clip closes the trailing edge of the covering material forming a first encased package and the other closes a leading edge of the covering material forming the next encased package. The clipped configuration of the covering material encasing the product may be configured to substantially conform to the shape of the enclosed product(s) or may be more loosely configured (see, e.g., FIG. 46 which illustrates a ham encased in clipped netting).

FIG. 23 illustrates the retractable product-holding member 75 and corresponding actuation cylinders 75c. FIG. 23 also illustrates the covering material gathering subassembly 140 with the plurality of gathering plates 141, 142, 143, 144. In operation, the first set of gathering plates 143, 144 (shown as two, but more or less can be used) can be positioned on a first side of the product travel path while a second set 141, 142 (again shown as two, but more or less can be used) on the opposing side of the travel path. After the product moves by (and is stopped by the product-holding member 75), the clipper 40 moves into position with its actuation cylinder (41, FIG. 31) which also moves the first set of gathering plates 143, 144 toward the centerline of the travel path and a second actuation cylinder 147 can move the second set 141, 142 toward the centerline of the travel path. The actuation cylinder 147 can be configured as a vaned rotary actuator and the term "actuation cylinder" is used generically to indicate any type of automatically moveable actuation member. The first set 143, 144 may be configured to reach the centerline first and force the covering material together through fingers $144f_1$, $144f_2$, $143f_1$, $143f_2$ with inclined surfaces that angle together toward the center gap space 145. The opposing gathering plates 141, 142 can then extend to trap the covering material therebetween. The first and second set of gathering plates may be timed, configured with different extension strokes and/or actuation speed to allow the first set 143, 144 to arrive at the centerline first.

Figure 27:
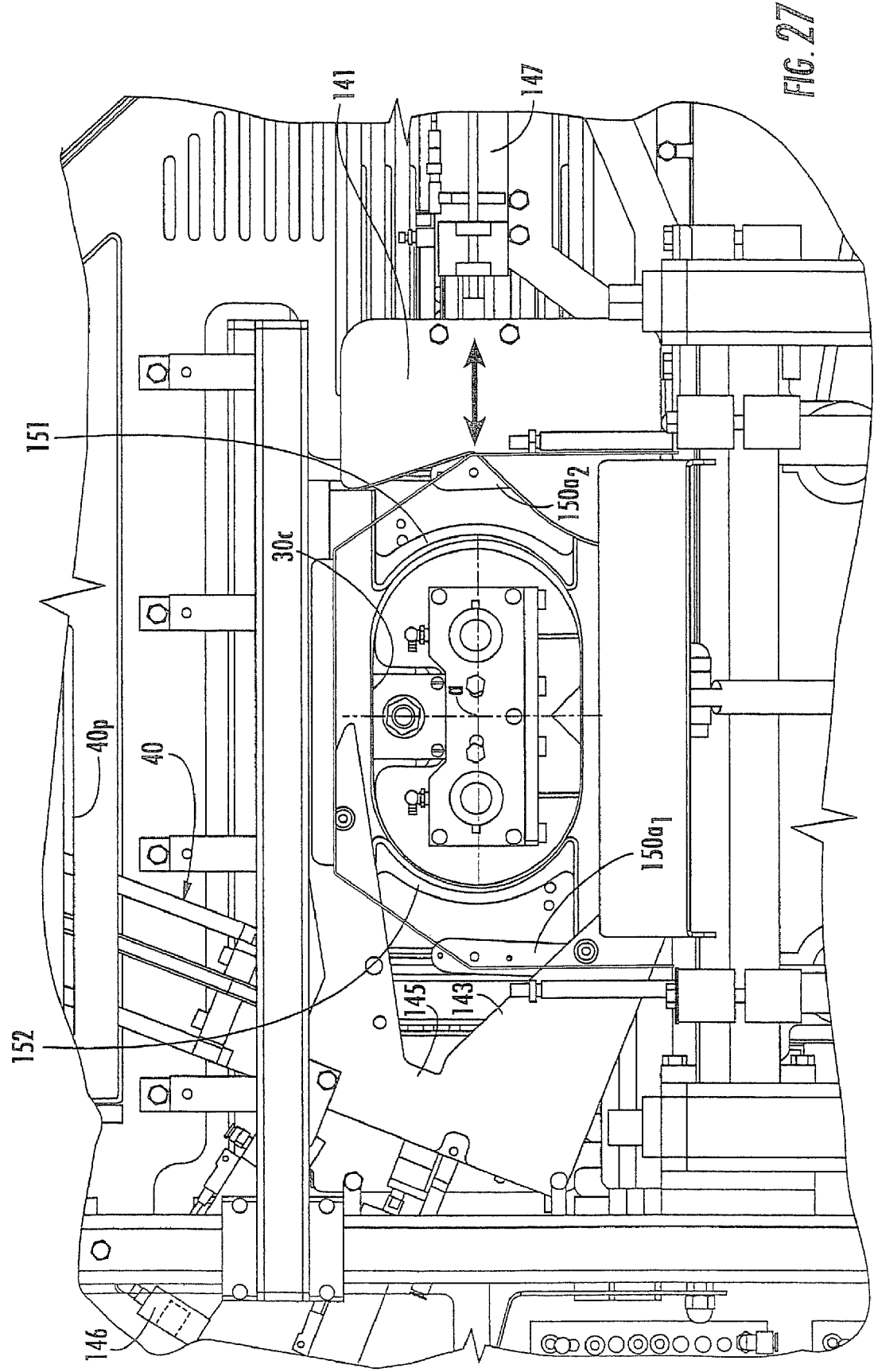
FIG. 27 is an enlarged left side view of the downstream portion of the device shown in FIG. 1 illustrating the brake assembly in an exemplary position and showing the clipper mechanism retracted according to embodiments of the present invention.
Figure 28:
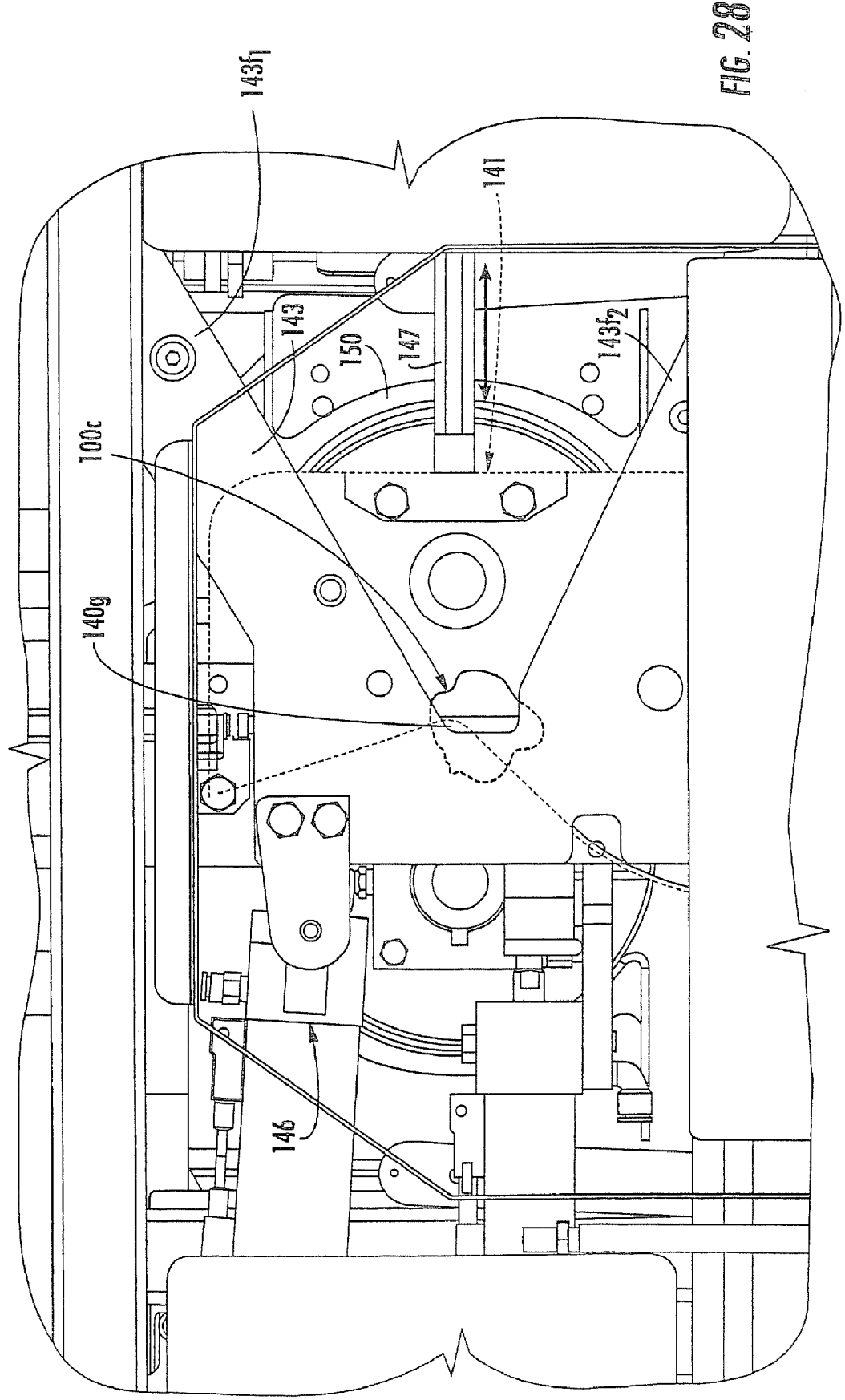
FIG. 28 is an enlarged left side view of the downstream portion of the device shown in FIG. 1 similar to the view shown in FIG. 27, but illustrated with the clipper mechanism in clipping position and with gathering plates cooperating to gather the covering material according to embodiments of the present invention.
Figure 32:
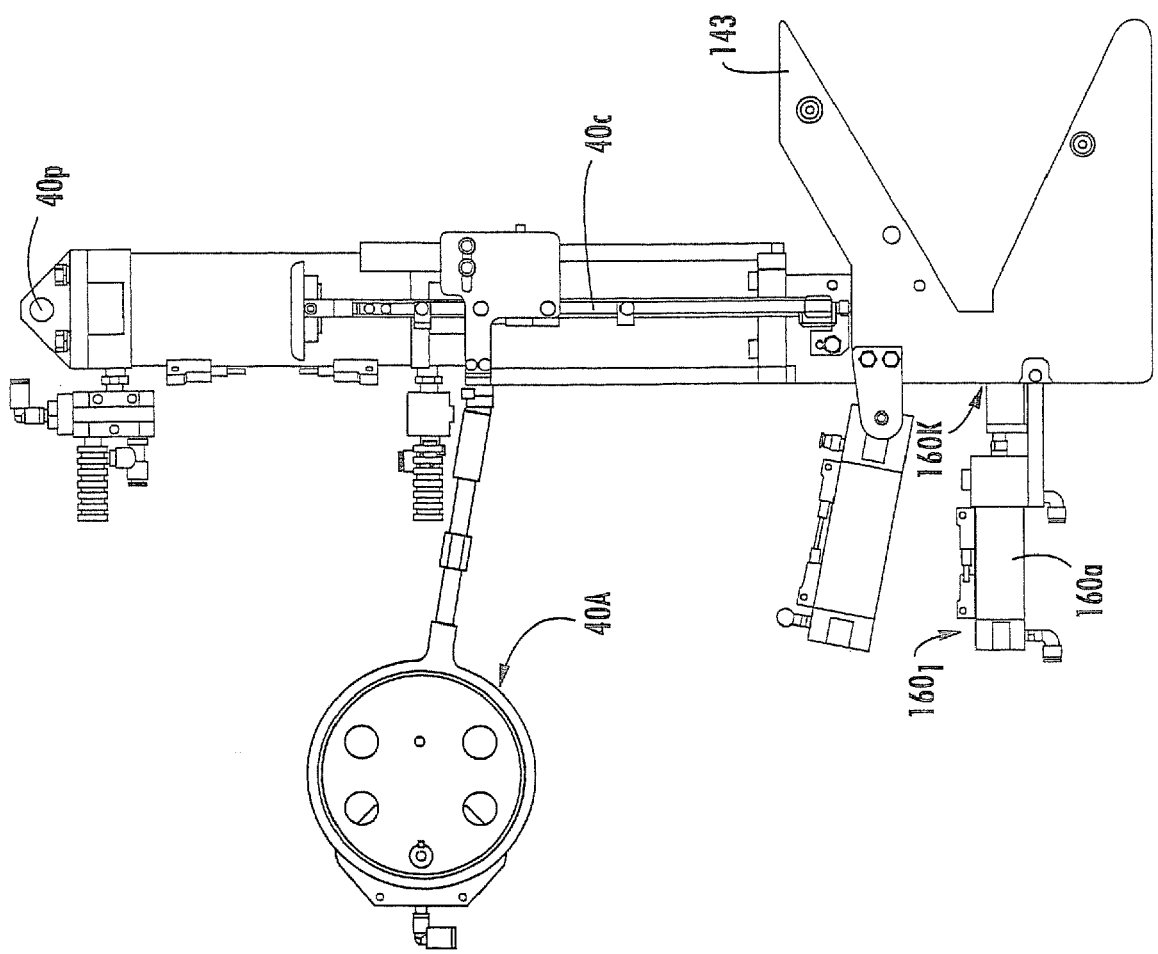
FIG. 32 is a left side view of the device shown in FIG. 31.
Figure 33:
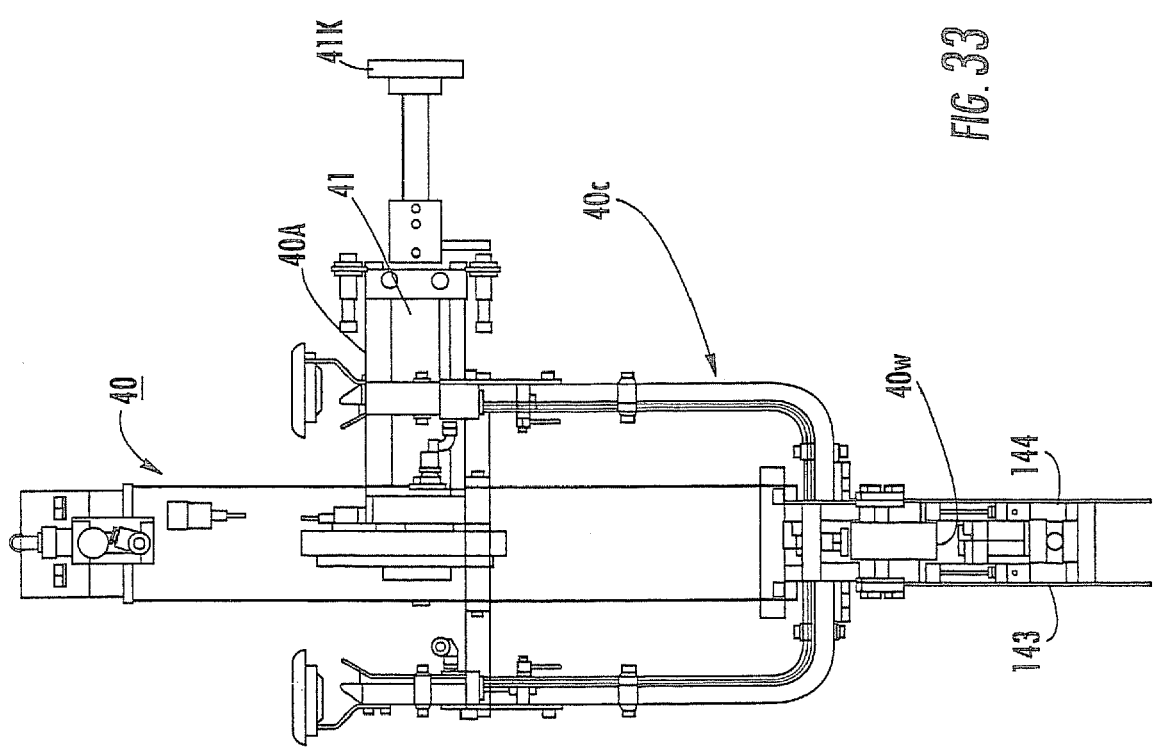
FIG. 33 is a front view of the device shown in FIG. 31.
Figure 34:
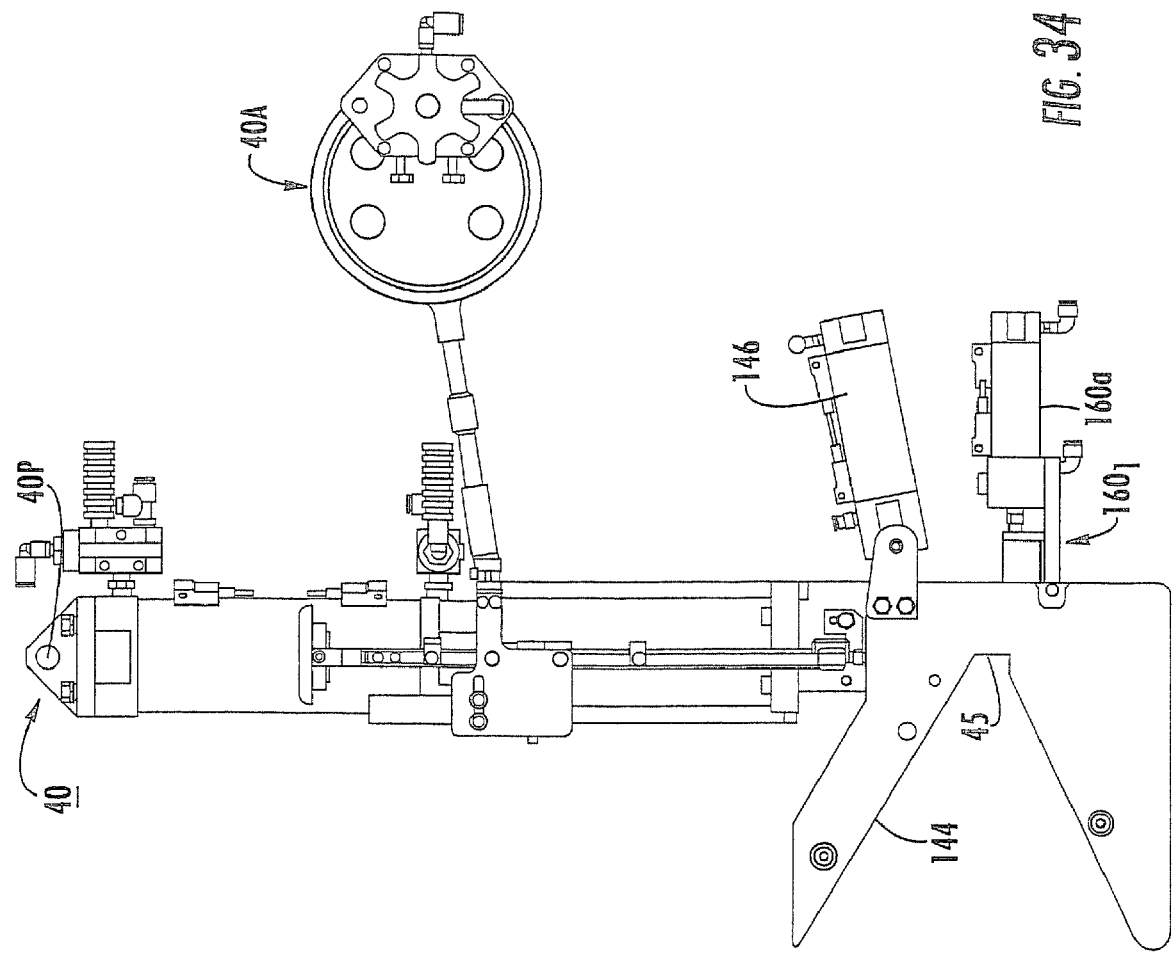
FIG. 34 is a right side view of the device shown in FIG. 31.
Figure 35:
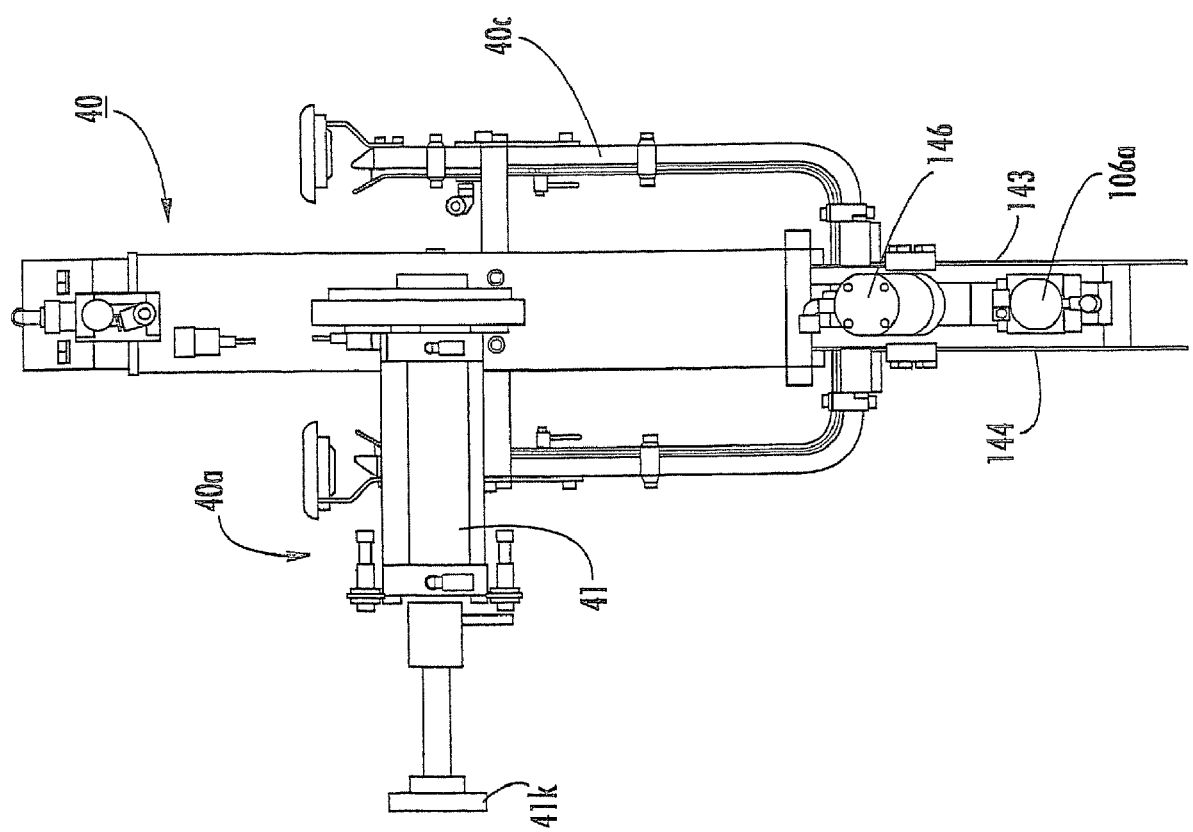
FIG. 35 is a rear view of the device shown in FIG. 31.

In certain embodiments, the first set of gathering plates 143, 144 are mounted to the clipper 40 (i.e., clipper gathering plates) and move in concert therewith. The clipper 40 can be pivotally mounted 40*p* (FIGS. 27, 32) to the apparatus 10 to be retractable and controllably move in and out of operative position. As the clipper 40 is rotated into position, the clipper gathering plates 143, 144 automatically start the gathering operation. The opposing plates 141, 142 may be configured to laterally linearly translate into and out of operative position (using actuator 147). Referring to FIGS. 23, 27 and 28, the opposing plates 141, 142 may have a different profile than those of the clipper-mounted plates 143, 144. As shown, the lower portion thereof may be curvilinear and extend inwardly a shorter distance than the fingers $143f_1$, $143f_2$, $144f_1$, $144f_2$ of the opposing plates 143, 144. Actuator 146 can be used to deploy a gate member (165, FIG. 36) as will be discussed further below.

As shown by the arrow illustrating travel direction in FIG. 27, the opposing plates 141, 142 can be actuated to move toward the axial centerline (shown as the "a" centerline which extends into and out of the paper). In certain embodiments, each gathering plate 141-144 can be mounted so that in operative position they are horizontally and vertically aligned with the corresponding centerlines of the product chute cavity 30*c*. FIG. 27 also illustrates the clipper 40 in a retracted position (pivotally moved out of the operative position).

FIG. 28 illustrates the clipper 40 in operative position with the clipper gathering plates 143, 144 extended and residing proximate the opposing gathering plates 141, 142 with the extended configuration of each gathering late leaving a gap space 140*g* where the converged covering material 100C extends through. The clipper 40 can then deliver the clip or clips to the converged material at the clip window 40*w* (FIG. 31) located intermediate the clipper gathering plates 143, 144.

Figure 24:
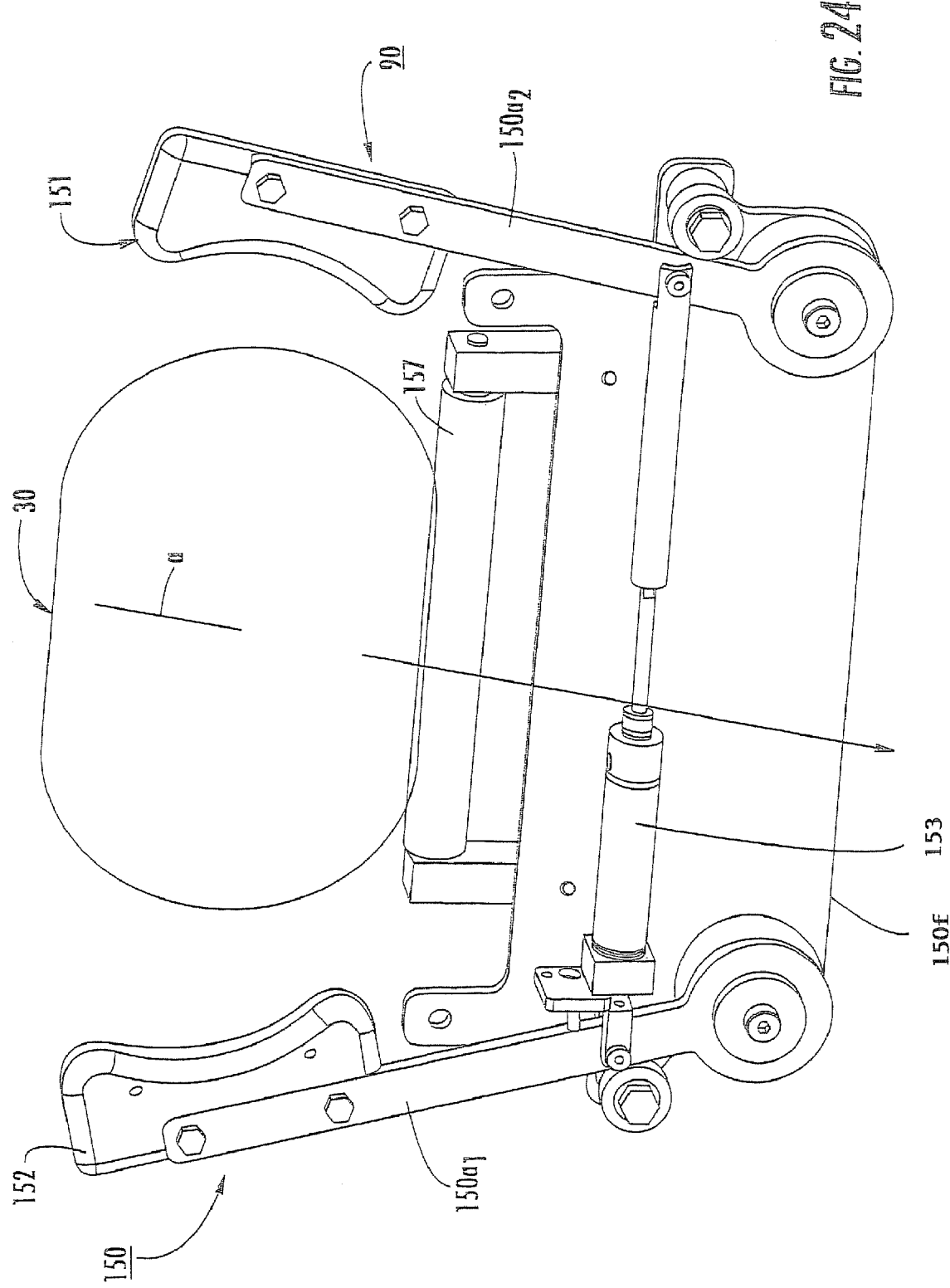
FIG. 24 is a side perspective view of a brake assembly according to embodiments of the present invention.
Figure 25:
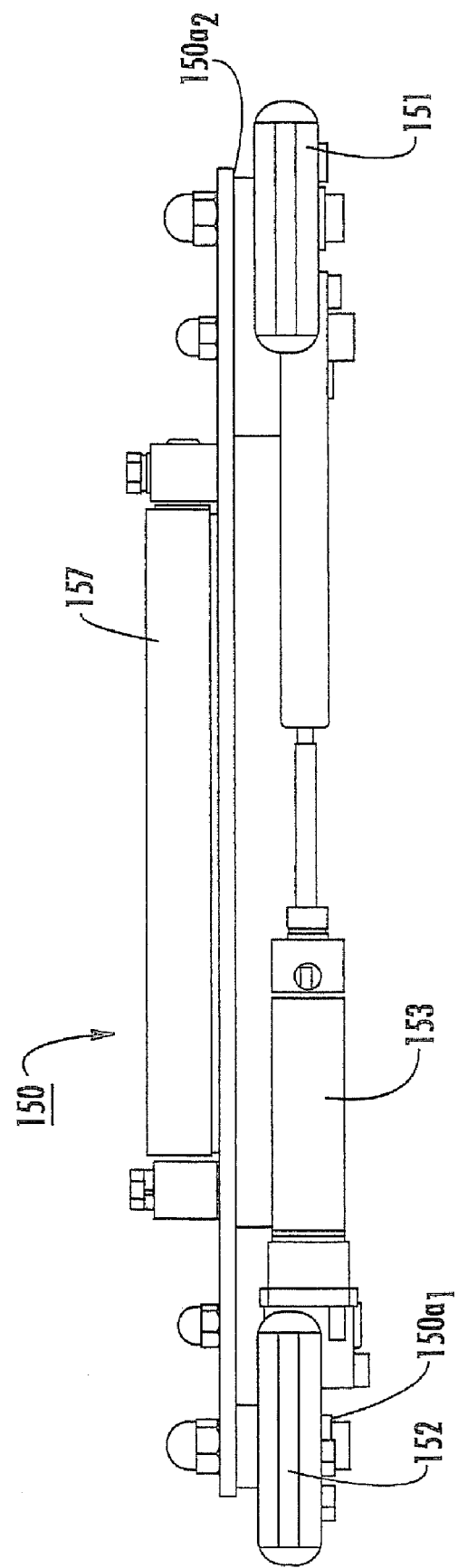
FIG. 25 is a top view of the brake assembly shown in FIG. 24.
Figure 26:
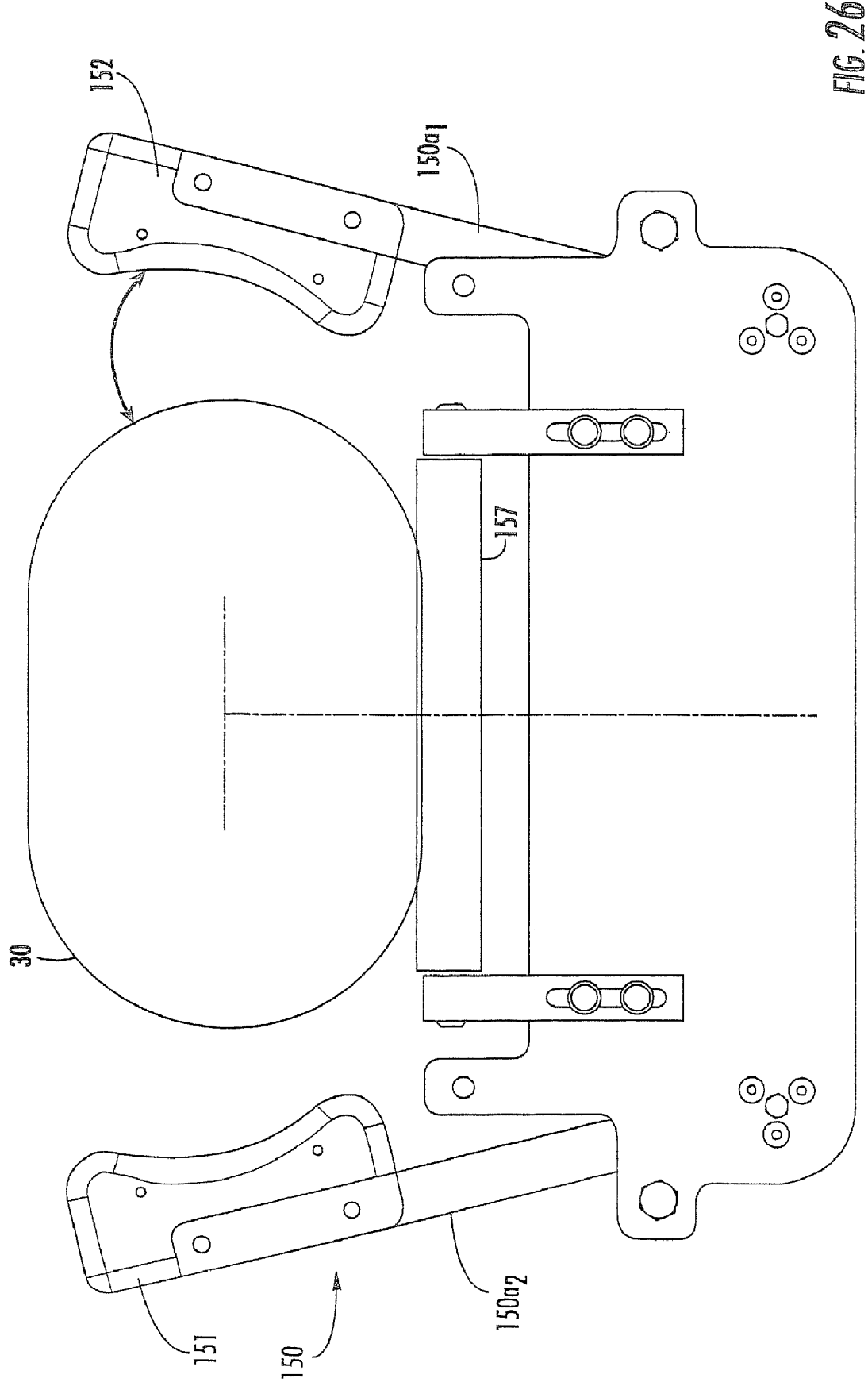
FIG. 26 is a right side view of the brake assembly shown in FIG. 24.

FIGS. 24-26 illustrate an example of a brake assembly 150 for resisting the downstream pull of the covering material by pressing a portion of the sleeve of covering material against the downstream portion of the chute 30. In operation, the brake assembly resists the dispensing of covering material off the product chute 30 as the covering material is being pulled off the chute in response to a product captured in the covering material upon discharge from the product chute 30. As shown, the braking assembly 150 can include a pair of spaced apart arms 150*a*$_1$, 150*a*$_2$ that may move substantially in concert. The arms each include at least one gripping member 152, 153, respectively. The gripping members 152, 153 are configured to apply pressure against opposing sides of the exterior surface of the chute 30 (the arms may alternatively or additionally be configured to move against opposing top and bottom portions of the chute). The arms 150*a*$_1$, 150*a*$_2$ can be mounted to a common frame member 150*f*. A cylinder 153 can extend between the arms 150*a*$_1$, 150*a*$_2$ to cause the arms to controllably pivot toward and away from each other. A spring or other biasing component (which may be internal to the cylinder) may be used to maintain the arms in a normally open position (not contacting the product chute 30). Fluid can be applied to actuate the cylinder 153.

Thus, for example, when power is removed from the apparatus 10 (such as upon removal of the chute 30), no power air will be needed to force the arms apart. In contrast, application of air (or other fluid) to the cylinder 153 will retract the arms toward each other so that the gripping members 151, 152 contact the covering material and rest against the chute 30. FIG. 27 illustrates the gripping members 151, 152 in position adjacent the sidewalls of the chute 30. The brake assembly 150 can inhibit an excessive quantity of covering material from being pulled off the chute 30 during product insertion into the covering. The brake assembly 150 may be particularly suitable for use with netting covering materials. In addition, the product covering can be held (stretched axially) to be relatively tight and substantially centered about the encased product. The tightness or tension of the covering material may be adjusted by varying the force that the gripper members 151, 152 apply to the chute 30. Where a pneumatic cylinder 153 is used, the force/tension adjustment can be carried out by adjusting the air pressure delivered to the cylinder 153. A pressure regulator for this operation may be disposed on the HMI 55 (FIG. 8).

As also shown in FIGS. 24-26, a covering material (i.e., netting) support roller 157 may be positioned adjacent a bottom portion of the product chute 30 to help guide/direct the covering material off the chute 30. Other guides may also be used such as rings that reside over the outside of the material on the chute 30 and/or the inside of the chute 30 under the material (not shown).

Figure 29:
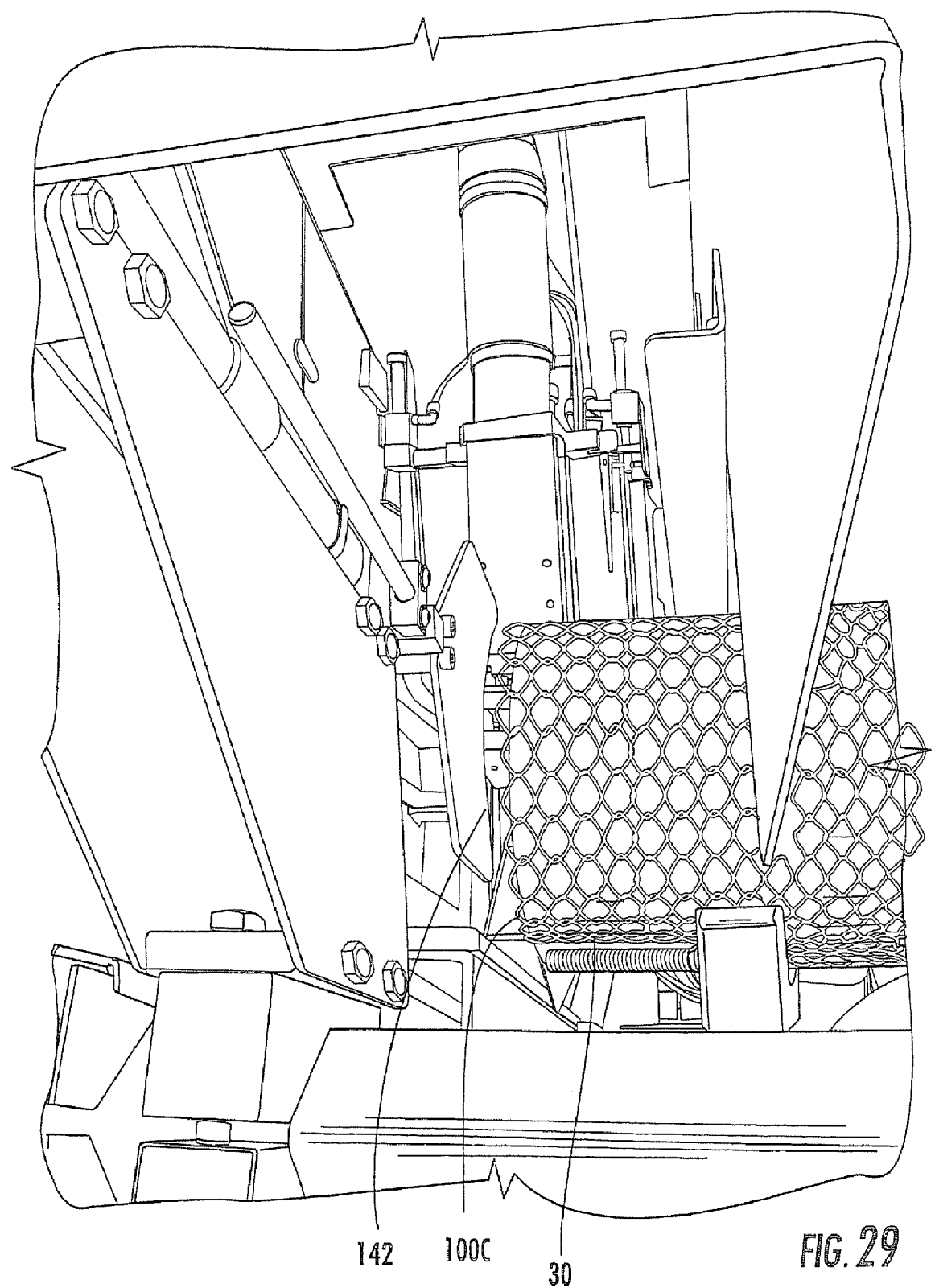
FIG. 29 is a front view of a portion of the device shown in FIG. 1, illustrating the product chute with netting thereon and a covering (netting) gathering plate(s) positioned proximate the discharge end of the chute according to embodiments of the present invention.
Figure 30:
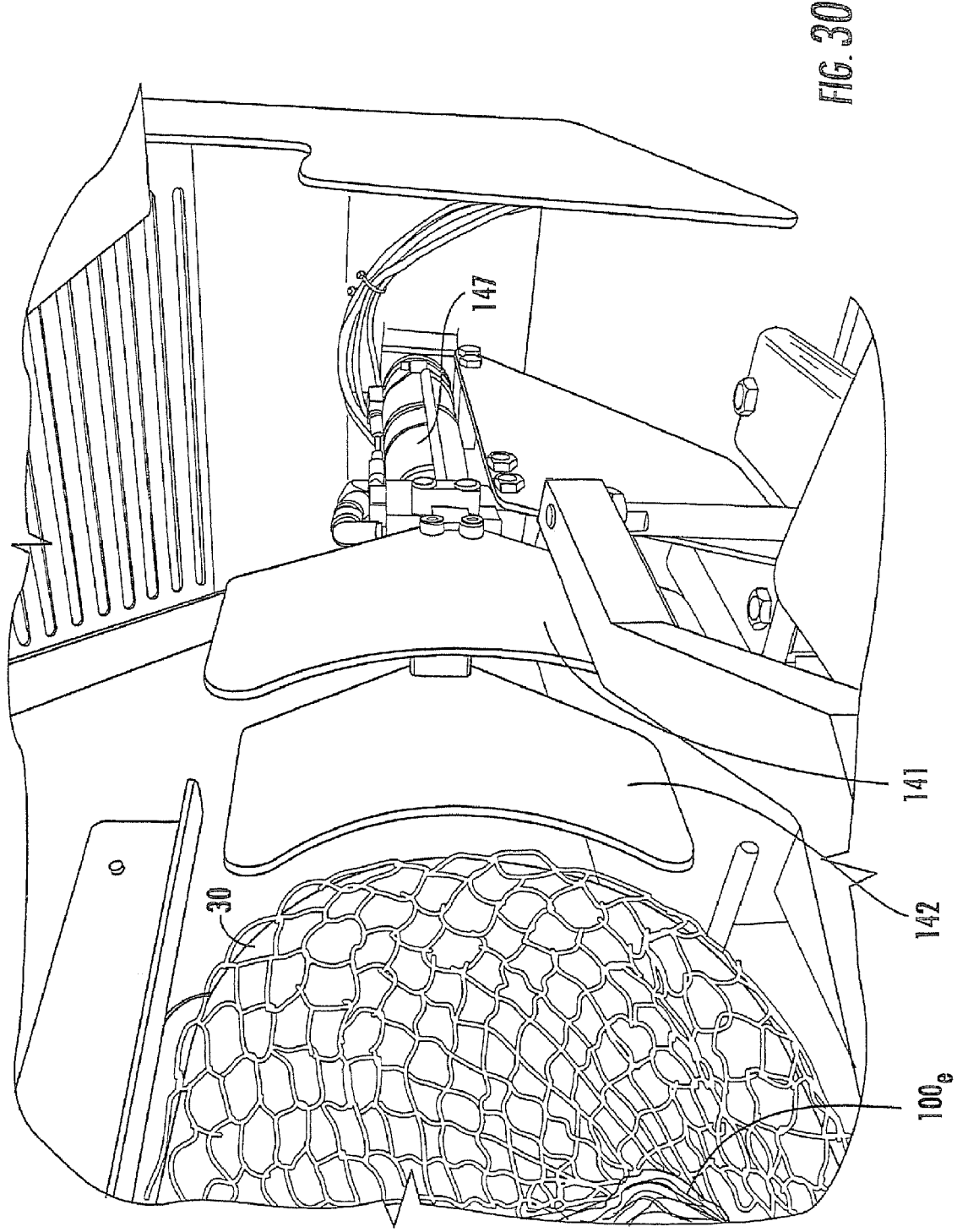
FIG. 30 is an opposing side view of the gathering plates shown in FIG. 29 which shows them positioned proximate the discharge end of the product chute according to embodiments of the present invention.

FIG. 29 illustrates a netting covering material 100*c* positioned over the chute 30 with a gathering plate 142 positioned proximate to and downstream of the product chute 30. FIG. 30 illustrates gathering plates 141, 142 and the actuation cylinder 147. FIG. 30 also illustrates that the covering material 100*c* proximate the discharge end of the chute 30 has a closed end portion 100*e* ready to receive the next product as it exits the chute 30 to thereby pull the netting material about itself as the product moves forward to enclose the product therein.

FIGS. 31-35 illustrate an exemplary clipper 40 according to embodiments of the present invention. The clipper 40 may be particularly suitable for clipping netting but may be used for other materials as well. As shown, gathering plates 143 and 144 are mounted to the lower portion of the clipper 40 with the clip window 40*w* therebetween. The clipper 40 includes a pivot attachment aperture 40*p* that is sized and configured to receive a shaft therethrough, which can be supported by the apparatus 10 (such as by two trunnion type arms as shown in FIG. 1) to pivotally mount the clipper to the apparatus frame. The clipper 40 can also include a rotary actuator cam and yoke assembly 40A that, in operation, cooperate to move the clipper 40 in and out of operative position about the travel path of the product. The rotary actuator cam and yoke assembly 40A may include an actuator 41, a cam 42 and yoke 43. The clipper body can be attached to the actuator 41 via an eccentrically configured cam and yoke 42, 43. The actuator 41 can be a 180-degree pneumatic actuator. The distance from the center of the cam and rotary actuator centerline can be about one-half that of the distance corresponding to the movement distance of the clipper 40 from home position to the operative clipping position. Fine adjustment travel can be carried out using an adjustable linkage with left and right hand threads. A manual rotation knob 41*b* can also be used to move the clipper 40 back and forth.

Figure 31:
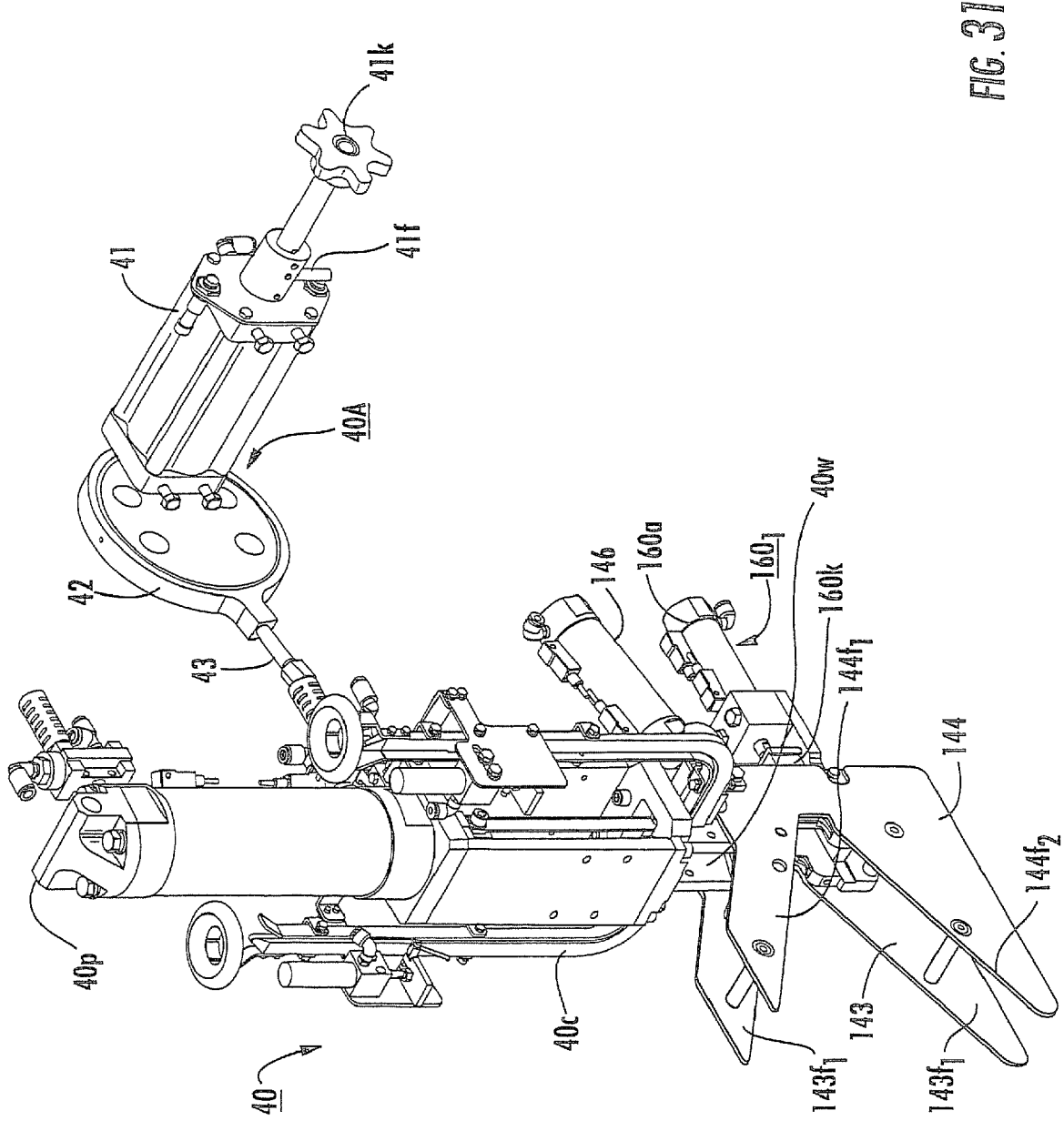
FIG. 31 is a front perspective view of a retractable (pivotable) clipper assembly with gathering plates thereon according to embodiments of the present invention.

As shown in FIG. 31, a position flag 41*f* can be provided on a coupler for a proximity sensor(s) mounted to the rotary actuator assembly 40A.

FIGS. 31-35 and 36-41 also illustrate the clipper 40 with a modular interchangeable first cutting cartridge 160₁. FIGS. 42-45 illustrate a second modular cutting cartridge 160₂. Each cartridge 160₁, 160₂ has a respective retractable cutting implement 160$k_i$, 160$k_2$ and an associated actuator 160a. In operation, after a clip(s) is applied to the gathered covering material 100C, the cutting implement 160$k_1$, 160$k_2$ can be automatically extended to sever the material. The first cartridge 160₁ is configured to cut through the gathered covering material. The second cartridge 160₂ is configured to apply a different type of cutting technique than that of the first cartridge 160₁. For example, the second cartridge 160₂ can be configured to apply heat to slice through the gathered covering material using a "hot-knife". Other types of cutting or severing techniques may also be used such as laser, pressurized fluid (water, air and the like) or other suitable means.

Each cartridge 160₁, 160₂ includes a platform 160p that is configured to slidably insert in a receiving channel or groove 160g on the clipper 40. The desired modular cutting cartridge 160₁, 160₂ can be selected and using a quick disconnect feature, interchanged and used as appropriate for the type of covering material in the apparatus 10.

Figure 37:
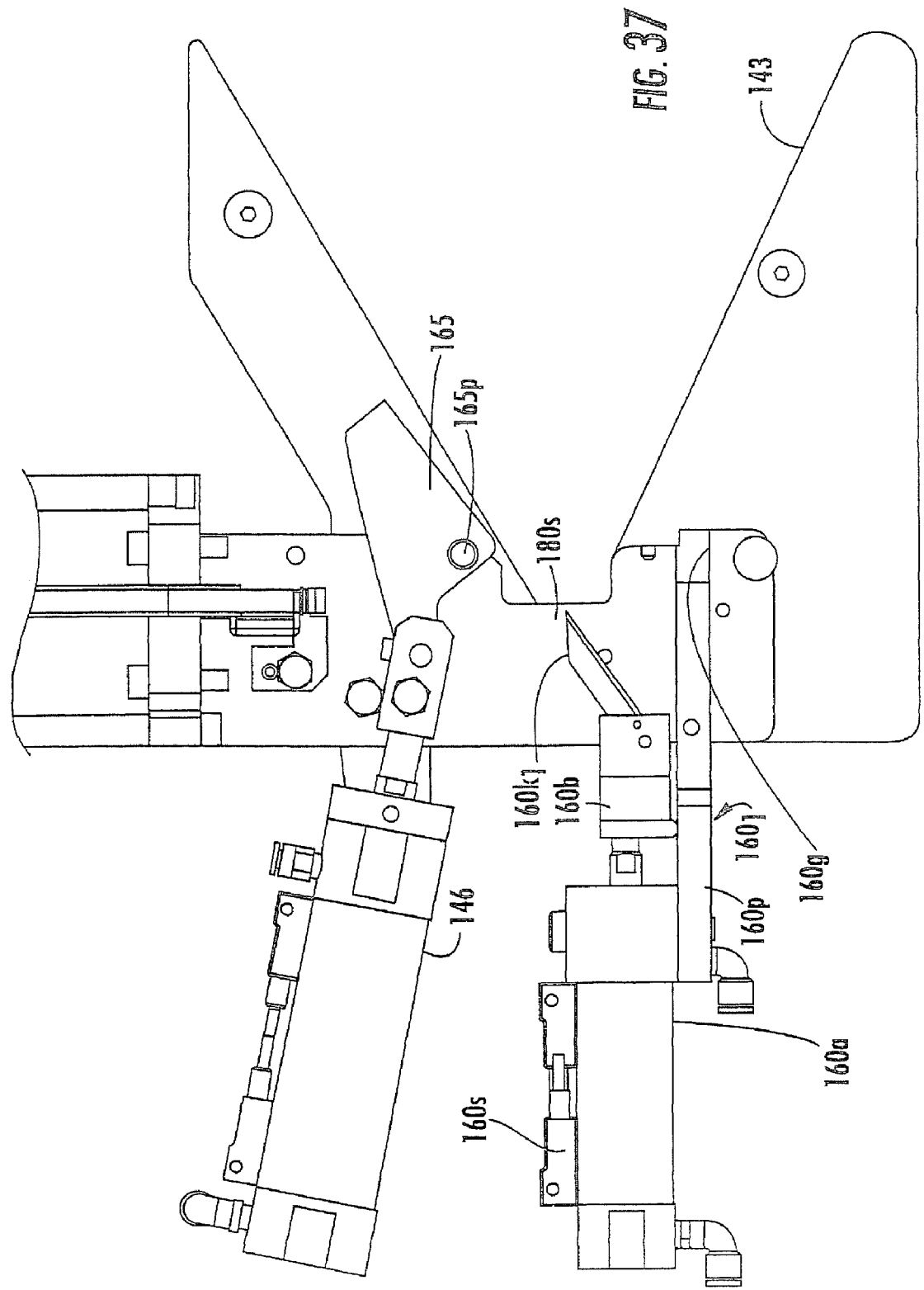
FIG. 37 is an enlarged left side view of the device shown in FIG. 31 similar to that shown in FIG. 36 but illustrated with the left die support removed for clarity.
Figure 40:
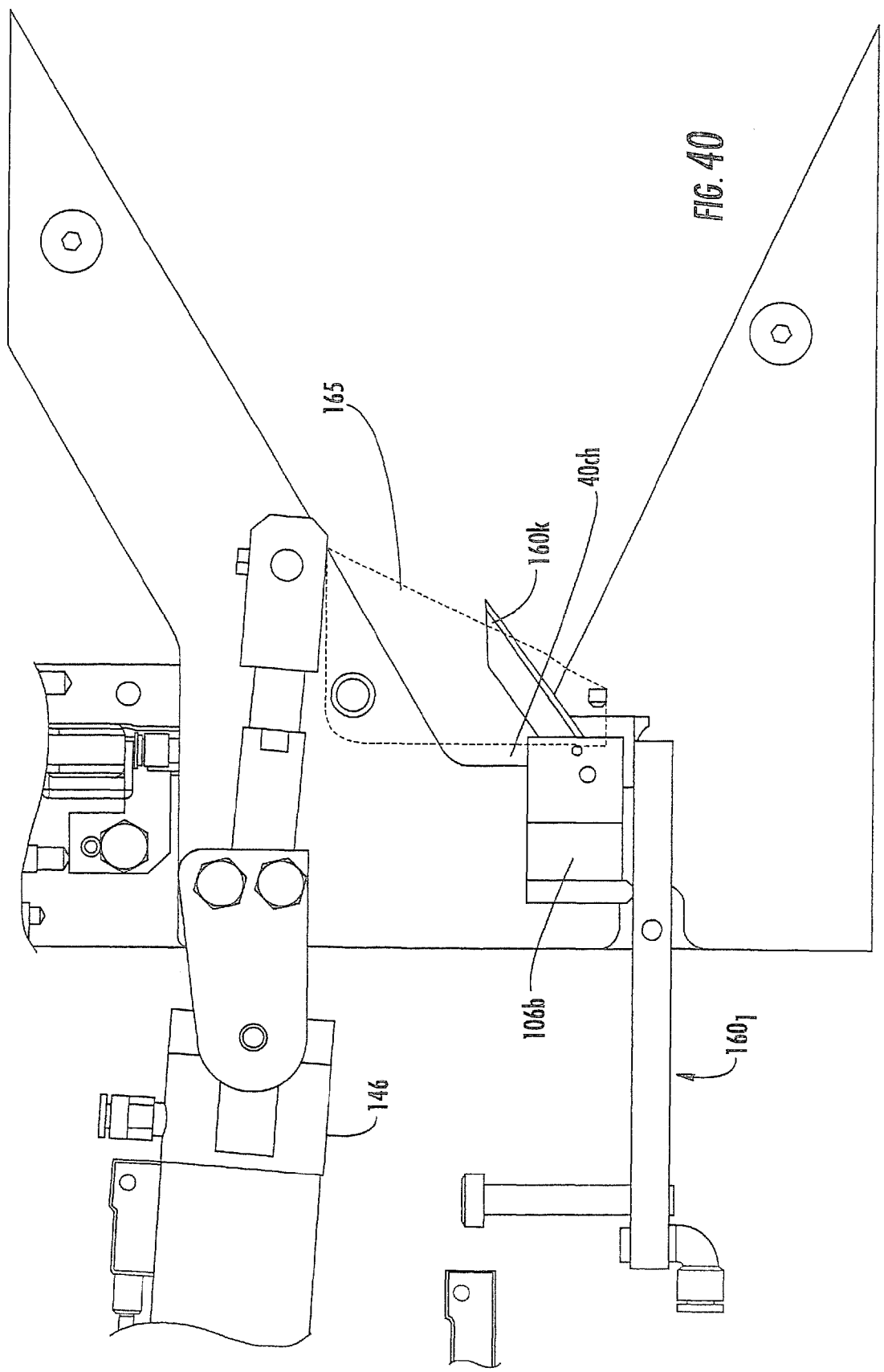
FIG. 40 illustrates the cartridge with the cutting tool extended so that the knife can penetrate the covering material according to embodiments of the present invention.

FIG. 37 illustrates that the first cartridge 160₁ may include a stabilizer block 160b attached to the forward portion of the rod intermediate the actuator 160a and the knife 160$k_1$ to help keep the knife 160$k_1$ from rotating upon retraction or extension. FIG. 40 illustrates the first cartridge 160$_i$ cutting implement 160$k_1$ (i.e., knife) in the extended or actuated position.

Figure 42:
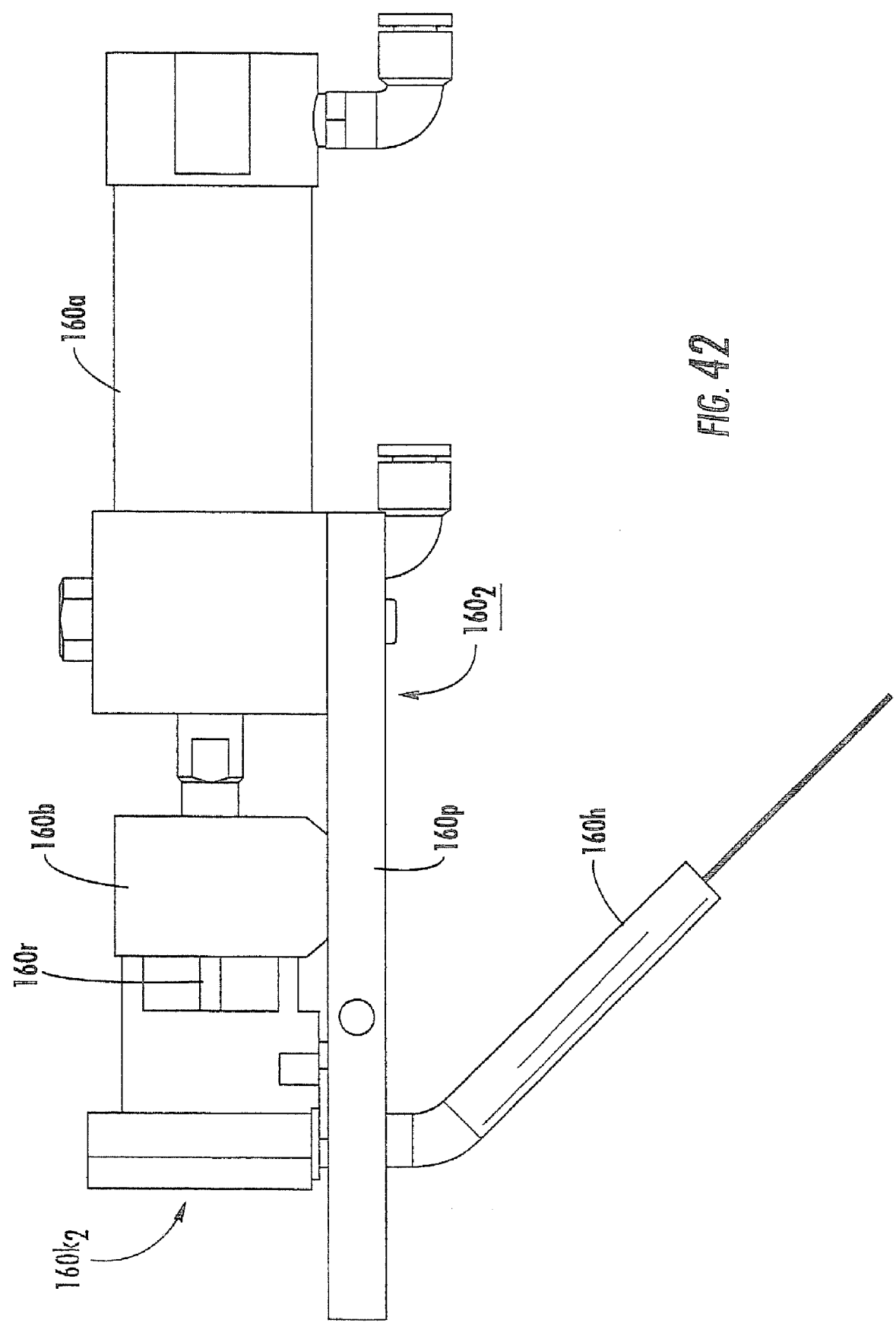
FIG. 42 is a right side view of an interchangeable modular second cutting cartridge providing a hot-knife cutting option according to embodiments of the present invention.
Figure 43:
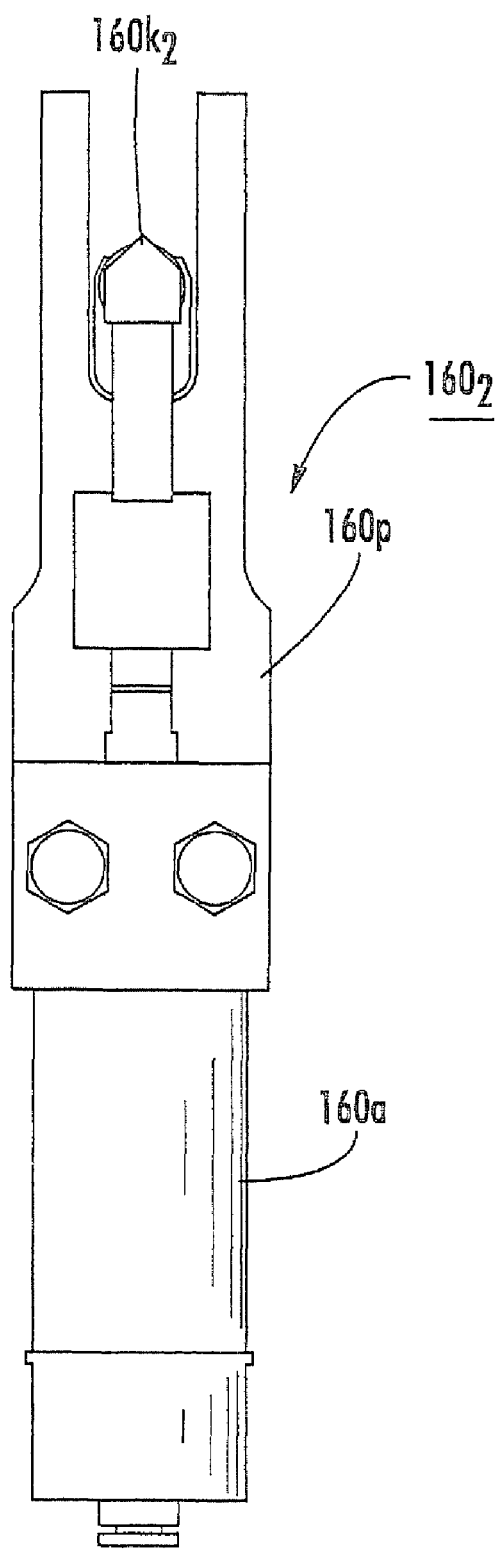
FIG. 43 is a top view of the hot-knife cutting cartridge shown in FIG. 42.
Figure 44:
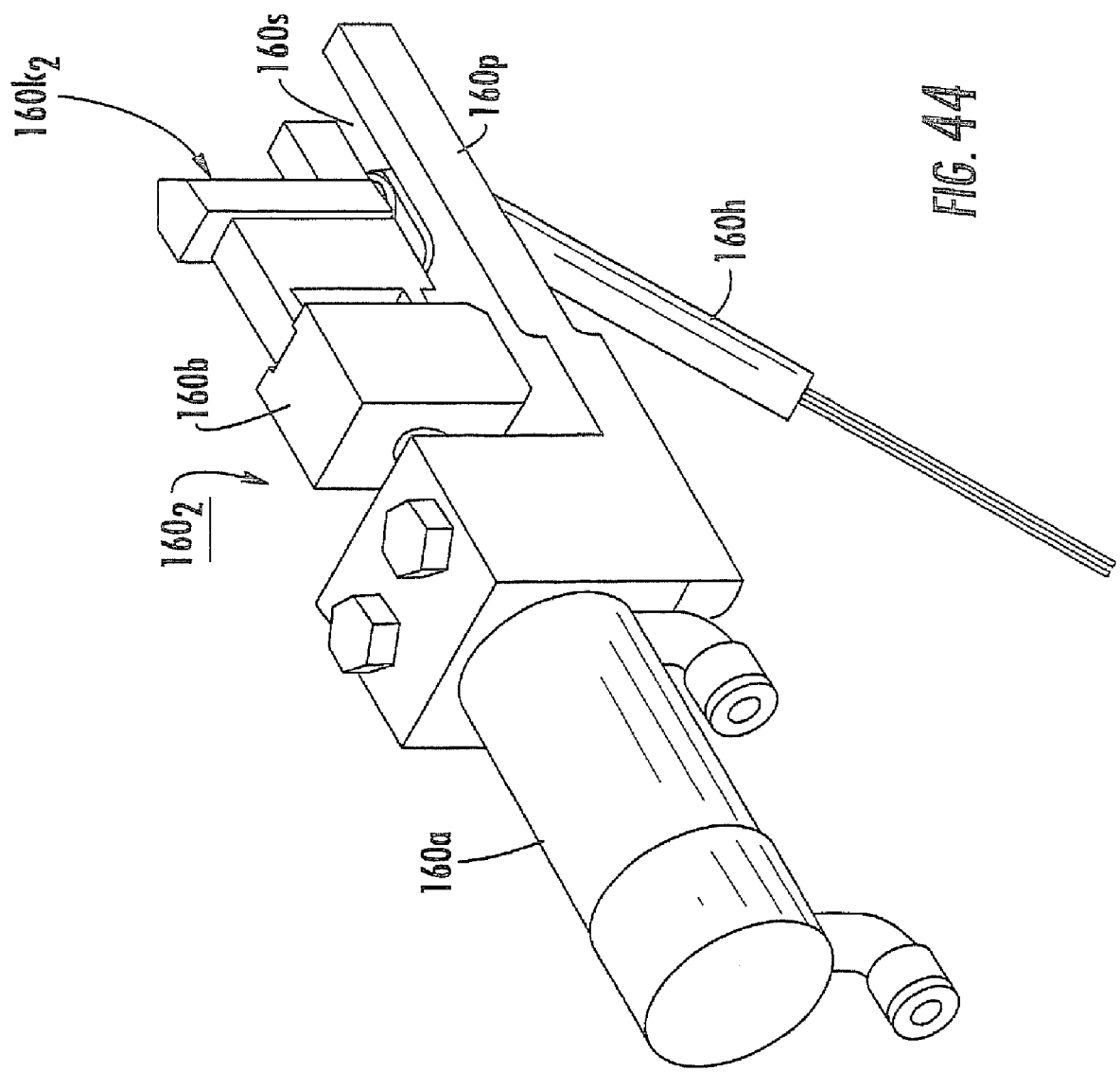
FIG. 44 is a side perspective view of the cartridge shown in FIG. 42.
Figure 45:
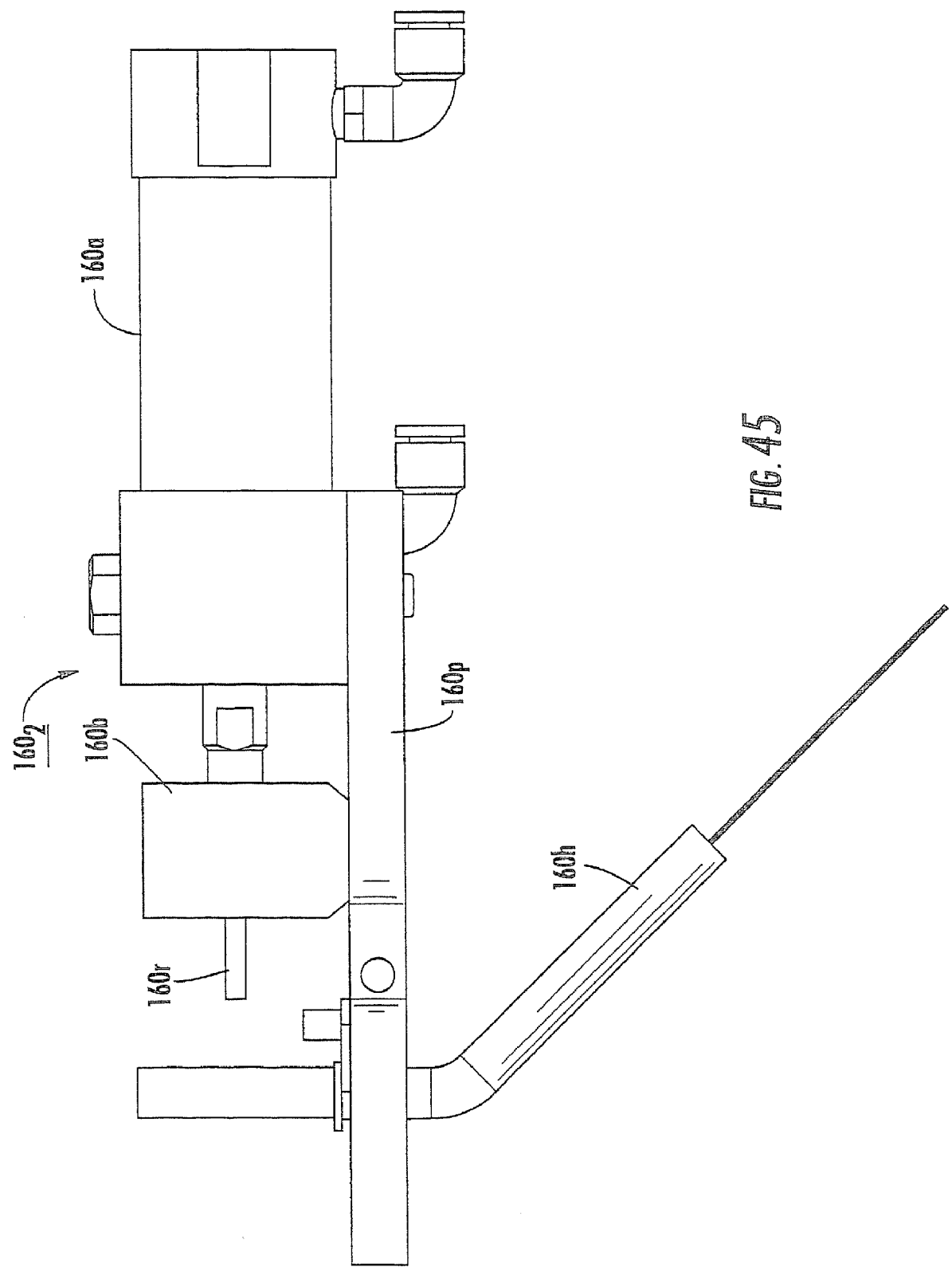
FIG. 45 is a right side view of the cutting cartridge shown in FIG. 42, but illustrated with the anvil removed for clarity according to embodiments of the present invention.

FIGS. 42-45 illustrate the second cutting cartridge 160₂ having a hot-knife configuration. Examples of suitable hot-knife devices are described in U.S. Pat. Nos. 4,683,700 and 5,161,347, the contents of which are hereby incorporated by reference as if recited in full herein. As shown in FIG. 42, the second cartridge 160₂ includes a platform 160p, a heat source 160h (such as a cartridge heater) and a cutting anvil 160$k_2$. The cutting anvil 160$k_2$ is heated by the heat source 160h and, in operation, automatically extended and retracted using the PLC and/or apparatus controller. FIG. 45 illustrates the heat source mounted to the cartridge 160₂ without the anvil 160$k_2$ for clarity of operation. As for the first cartridge 160₁, the second cartridge 160₂ may include a stabilizer (anti-rotation) block 160b attached to the actuator rod 160r intermediate the anvil 160$k_2$ and the actuator 160a. In operation, upon actuation, the cylinder 160a extends the cutting anvil 160$k_2$ until the anvil contacts the covering material (i.e., netting). The material severs as a result of contact with the heated anvil 160$k_2$. In certain embodiments using covering materials having certain types of fibers, the covering material fibers may melt and thermodynamically seal any loose ends thereby capturing particles that may otherwise become loose.

FIG. 44 illustrates that the platform 160p may include an open segment 160s that allows the cartridge heater 160h to advance with the cutting anvil 160$k_2$. In other embodiments, the heat source 160h may be static and/or the anvil 160$k_2$ advance and retract independently thereof (not shown).

Figure 36:
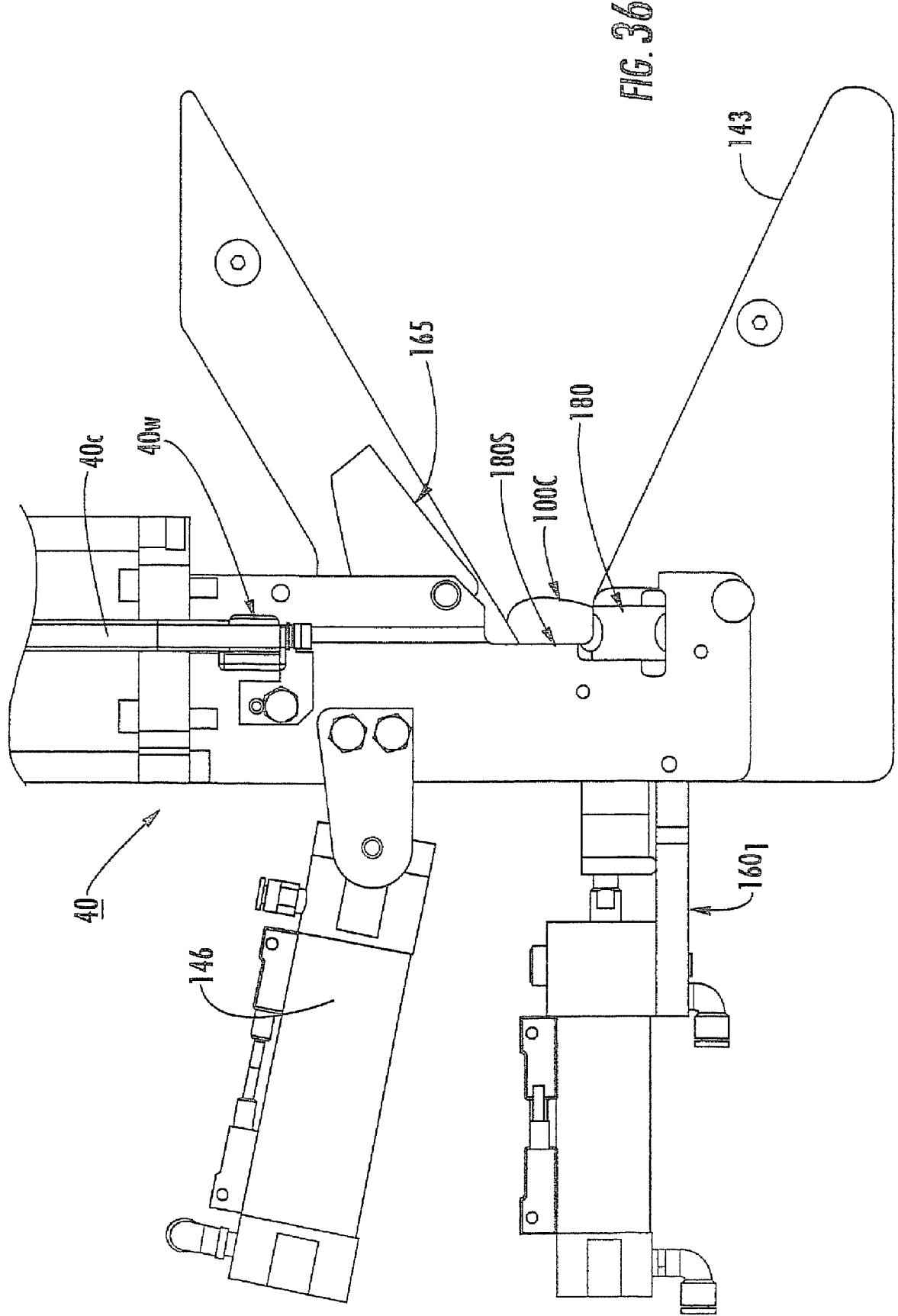
FIG. 36 is an enlarged left side view of the device shown in FIG. 31 according to embodiments of the present invention.
Figure 41:
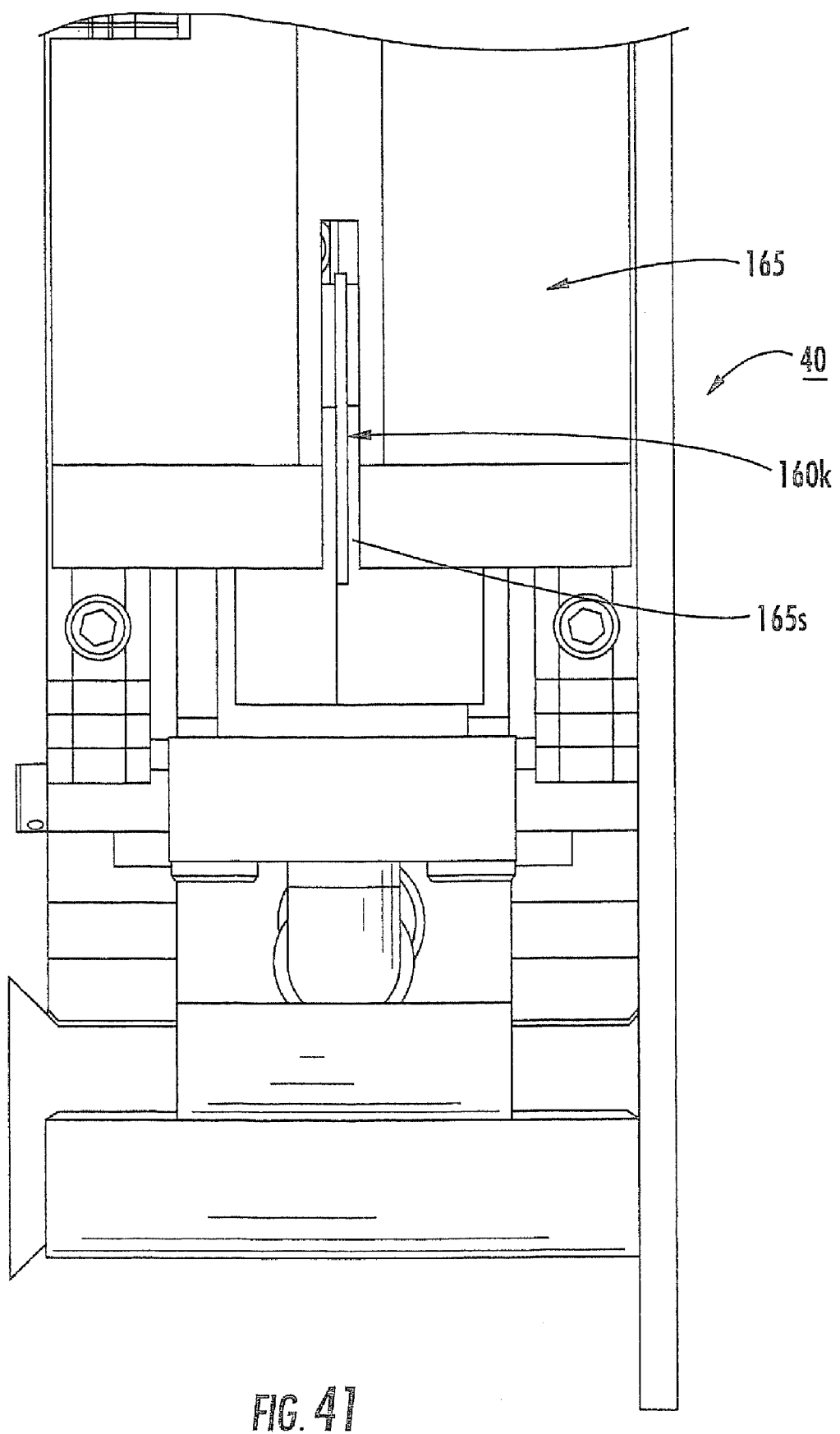
FIG. 41 is an enlarged partial front view of the clipper mechanism shown in FIG. 31, similar to that shown in FIG. 33, but illustrating the knife in operative position according to embodiments of the present invention.

FIGS. 36-41 also illustrate that the clipper 40 may include a gate member 165 that has an open (FIGS. 36, 37) and closed (FIGS. 38-40) configuration. The gate member 165 can be pivotally attached to the clipper. As shown in FIG. 41, the gate member 165 can include a relief slot 165s for the knife 160$k_1$ (or 160$k_2$) to pass through during the severing operation. FIG. 36 illustrates that the clipper 40 can include a clip-forming die 180 held by a die support 180s (shown with the left gathering plate removed to illustrate the spatial relationship of the gathering plate and die according to certain embodiments of the invention). In operation, as shown in FIG. 36, the covering material 100C is gathered against the die support 180s with the gate 165 open and the cutting implement 160$k_1$ (or 160$k_2$) retracted. The product to be clipped is typically held off the die 180 to inhibit the legs of the clip from puncturing the product as the legs of the clip warp around the end portion of the covering material encasing the product.

Figure 38:
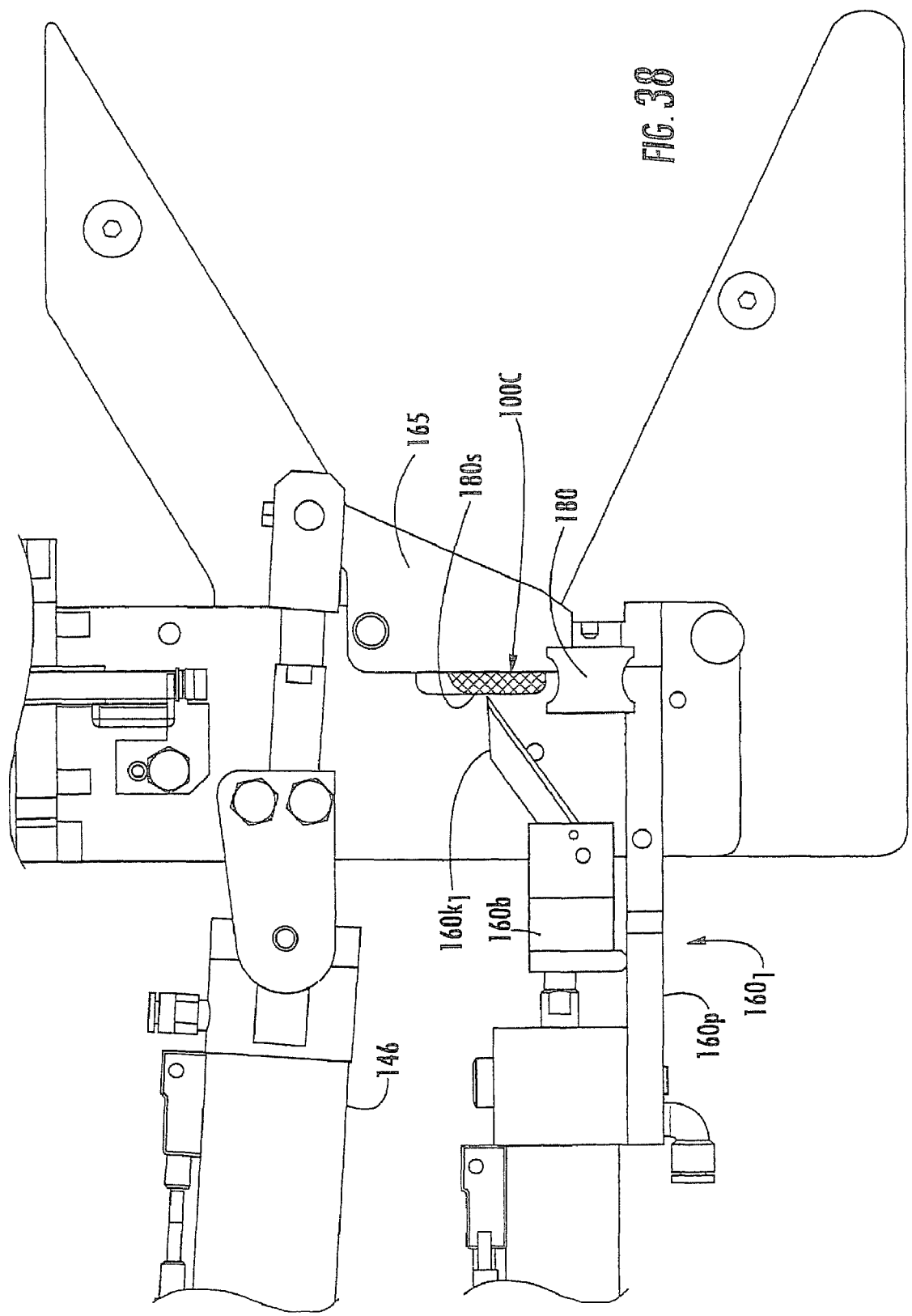
FIG. 38 is an enlarged left side view of the device shown in FIG. 31, similar to FIG. 36, but illustrating the gate closed with covering material gathered prior to application of a clip according to embodiments of the present invention.
Figure 39:
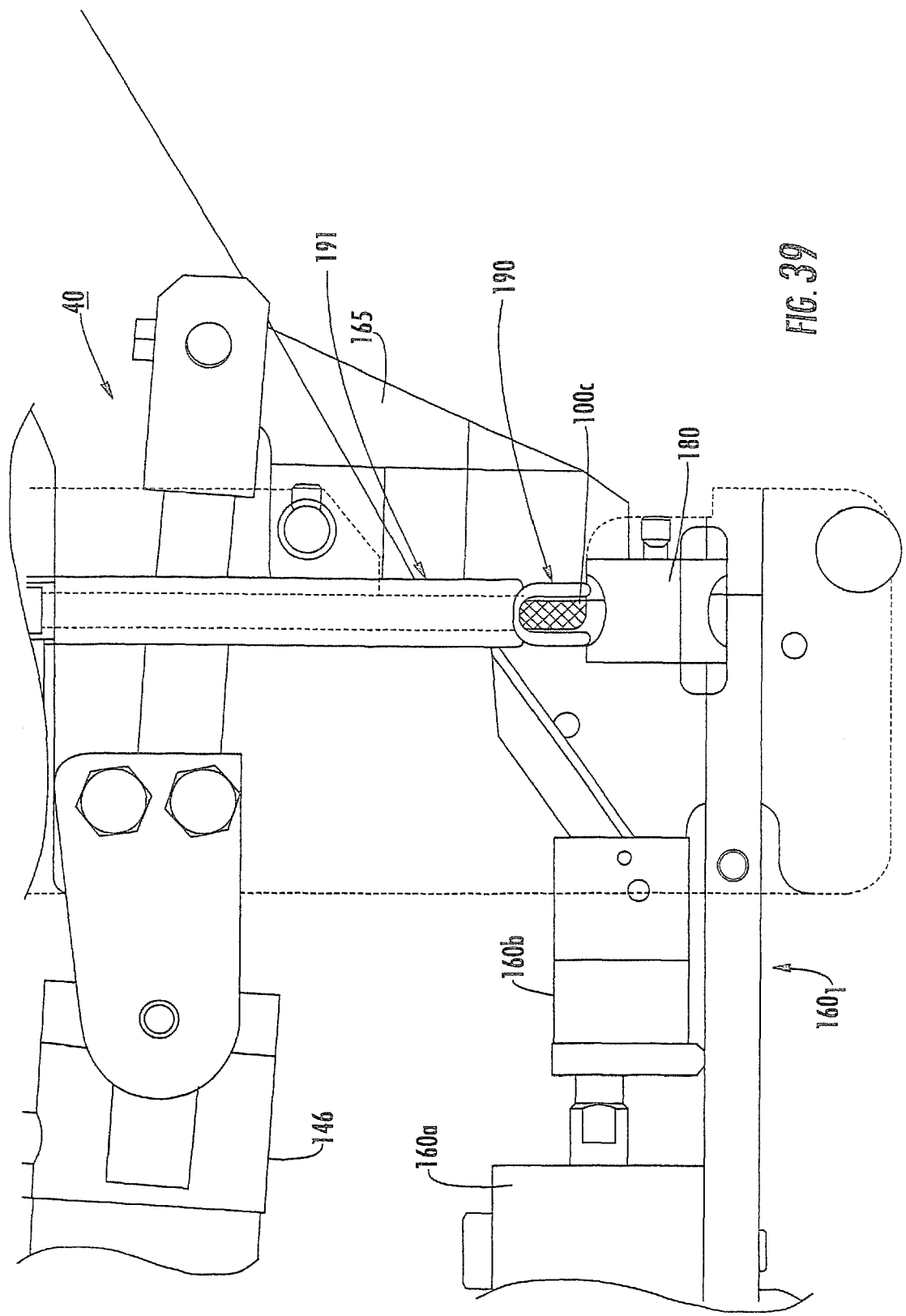
FIG. 39 is an enlarged left side view of the device shown in FIG. 31, similar to that shown in FIG. 38, but also illustrating a clip punch attaching a clip to gathered covering material (netting) according to embodiments of the present invention.

FIG. 37 is shown with the left die removed (in a dual clipper embodiment) to illustrate the spatial relationship of the die 180 and the cutting implement 160$k_1$ (or 160$k_2$). In operation, the gate member 165 can automatically deploy via actuator 146 to close and help gather the covering material prior to firing of the punch and/or clip application and can form the outboard side of a clipping channel (40ch, FIG. 40). FIG. 38 illustrates the gate member 165 closed and pushing the gathered material tightly against the die support 180s above the die 180. FIG. 39 illustrates the gate 165 rotated down and closed and a clip punch 191 partially fired positioned above a clip 190 during the clipping process. The gate member 165, shown translucent, can form the outboard side of the clip channel as noted above. Once the punch 191 reaches the end of its stroke, the ends of the clip(s) 190 is wrapped together upon contact with the die 180 gathering the material even tighter together. The cutting cartridge 160₁ (or 160₂) will automatically extend the cutting implement 160k, (or 160$k_2$) once the punch cylinder reaches the end of its stroke. In the cutting operation shown, the knife 160$k_1$ will slice through the covering material 100C as it advances, as shown, for example in FIG. 40.

Generally stated, referring to FIG. 31, the clipper 40 defines a closure/clip delivery path using a clip rail 40c in communication with the clip window 40w in a clip channel 40ch for receipt of a U-shaped metal clip. The clip is advanced in the closure path or channel by means of a punch so that the clip will engage a die 180 (FIG. 39) positioned in a manner permitting the clip to be formed about gathered material that encases the product in the material at a closure zone in the product travel path. Although not illustrated, pressurized air or other means of pressing or moving the clip to close about the tubular package may also be used. As shown, the guide rail 40c can have a curvilinear configuration with a vertical run which is curved at its lower end so that it gradually merges into a horizontal run to direct clips mounted thereon into the window 40w. The clips are typically arranged in a stack with adjacent clips abutting each other so that the legs of each clip fit around the guide rail with a crown of each clip fitting over the guide rail. The multiple clips may be connected to one another by means of a thin elastomeric film, tape or adhesive (typically along the crown) so that the clips together may slide down the guide rail and around the bend therein between the vertical and horizontal runs of the guide rail. Typically, clips are provided in a coil or on a reel for feeding onto the guide rail. Although illustrated herein as a generally vertical and downwardly directed clip feed, other feed orientations may also be employed.

Summarized, when a product or target object enters the product transfer zone 60 (FIG. 1), its presence can be automatically determined and the apparatus controller can then activate an automated cycle. The automated cycle can include: stopping the infeed conveyor from advancing and actuating the product pusher assembly cylinder 21. The product pusher head 20h attached to the product pusher cylinder 21 and guide rods 22, 23 advance to engage the target product, which is pushed through the product chute 30 encased in covering material (i.e., netting) upon exit from the product chute 30. Upon exiting the product chute 30, the encased product is pushed onto the product table 76. When the product pusher assembly 20 reaches the end of its forward stroke, its position is detected by a sensor such as a Hall-effect switch, and the product holding member 75 is actuated. Then, the product pusher assembly 20 is retracted into the product chute before the covering material is gathered and clipped. The product pusher cylinder 21 does not have to be fully retracted prior to initiation of the automated gathering and clipping operations. Once the product pusher head 20*h* clears the discharge end of the product chute 30, an intermediate sensor, such as another Hall-effect switch, typically placed on the product pusher cylinder 21, senses the partial retraction thereof. When the sensor is activated, the apparatus 10 can automatically (i.e., typically via the PLC) proceed to initiate the gathering and clipping operations.

Thus, substantially concurrently to the retraction of the pusher head 20*h*, the clipper 40 automatically pivots into position thereby advancing the clipper gathering plates 143, 144, and the netting gathering plates 141, 142 are extended. The gathering plates 141-144 converge to the product centerline to converge the covering material into a rope-like configuration. Then two closure clips can be applied thereto. The downstream clip ends the first product and the upstream clip defines the first end portion of the next product. The cutting cartridge is actuated and the covering material is severed between the two clips. Once the severing is complete, the cutting cartridge is retracted and the apparatus 10 can automatically start a reset cycle by opening the clipper gate 165, returning the clipper 40 to its home position, and the netting gathering plates 141, 142 to their home position. The product-holding member 75 can be moved and the product released to travel downstream. When the clipper 40 and gathering plates 141, 142 are substantially in their home position, the apparatus 10 can begin the cycle again. When the product pusher assembly 20 reaches its retracted configuration, the infeed conveyor 50*f* can be started again so that when the reset is complete, another product is in position for entry into the product chute 30. In each case if a product is not detected in the transfer zone 60 in a predetermined time, the apparatus 10 can shut off and wait for a start signal to reactivate the process/apparatus, such as via a pushbutton at the HMI station.

The operation and sequence of events can be controlled by a programmable logic controller. Certain operations may be selected by an operator input using a Human Machine Interface to communicate with the controller as is well known to those of skill in the art.

Figure 47:
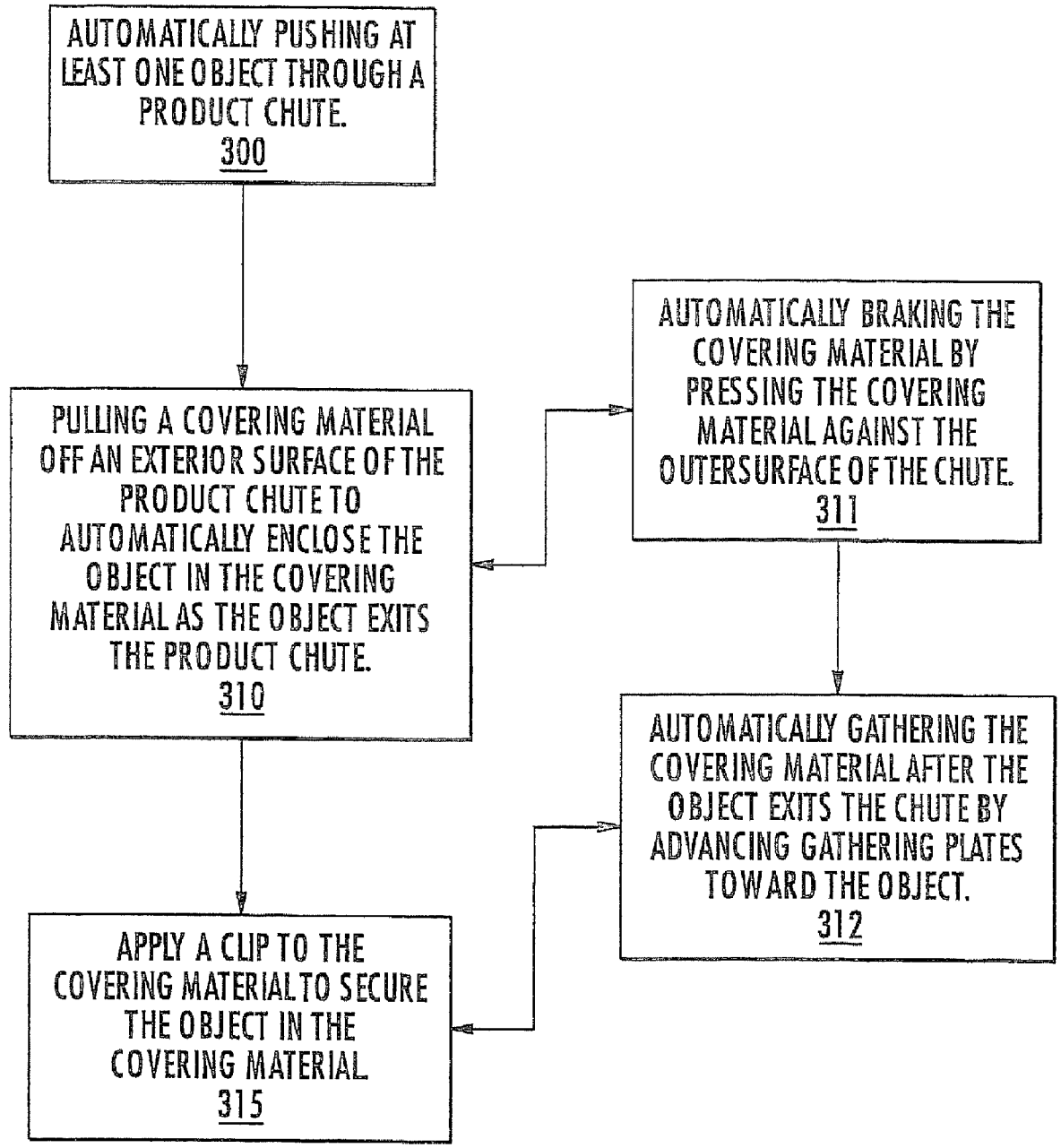
FIG. 47 is a flow chart of operations that can be carried out according to embodiments of the present invention.

FIG. 47 illustrates exemplary operations that may be carried out according to embodiments of the present invention. As shown, at least one target object can be pushed through a product chute automatically (block 300). The initiation of the automatic pushing operation can be based on a sensed presence of the target object in a product transfer zone. A covering material can be pulled downstream off the exterior surface of the product chute (which includes pulling from a covering material mounting device mounted over the product chute) to automatically enclose the object in the covering material as the product exits the product chute (block 310). A clip(s) can be applied to the covering material to secure the object in the covering material (block 315). The covering material can be automatically selectively slowed or inhibited from further release by applying a braking force thereto pressing the covering material against the outer surface of the product chute (block 311). In addition, a gathering of the covering material may be automatically carried out after the object exits the chute by advancing gathering plates toward the object (block 312).

Figure 48:
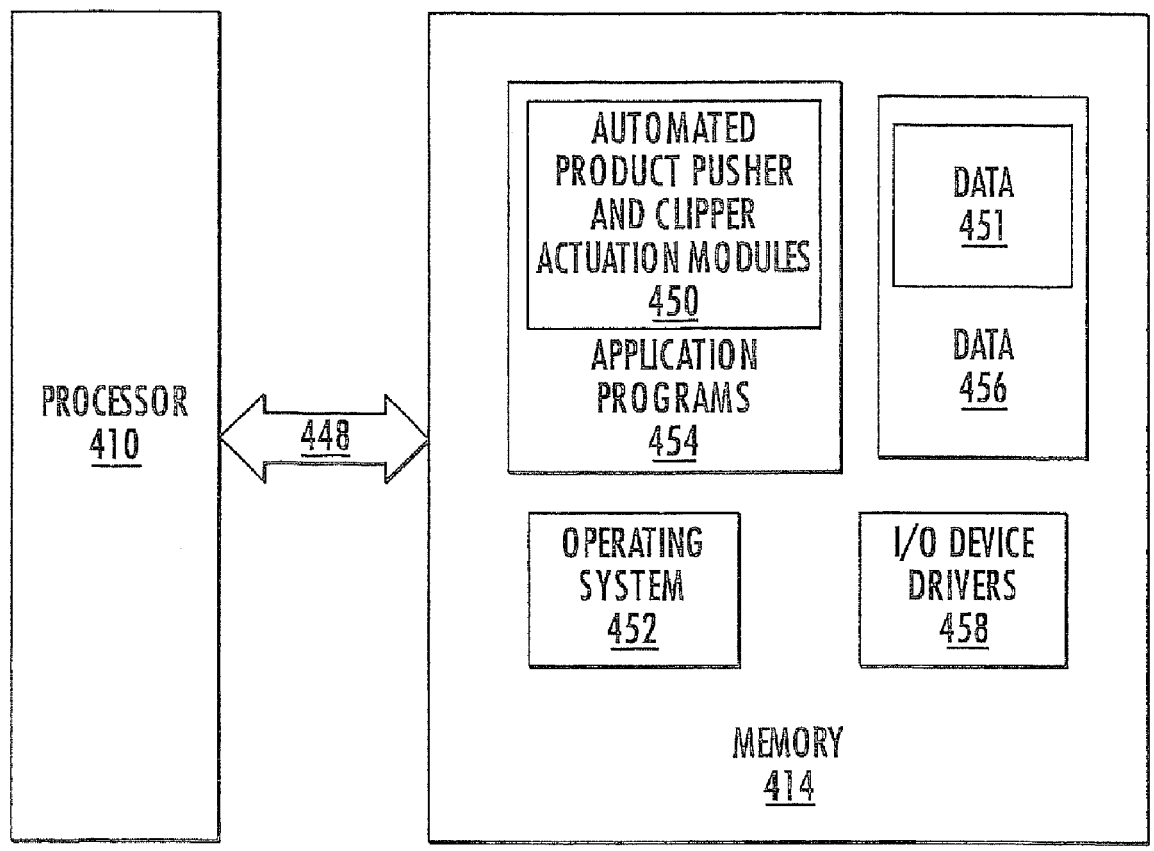
FIG. 48 is a block diagram of a data processing system/computer program according to embodiments of the present invention.

FIG. 48 is a block diagram of exemplary embodiments of data processing systems that illustrates systems, methods, and computer program products in accordance with embodiments of the present invention. The data processing systems may be incorporated in a programmable logic controller and/or be in communication therewith. The processor 410 communicates with the memory 414 via an address/data bus 448. The processor 410 can be any commercially available or custom microprocessor. The memory 414 is representative of the overall hierarchy of memory devices containing the software and data used to implement the functionality of the data processing system. The memory 414 can include, but is not limited to, the following types of devices: cache, ROM, PROM, EPROM, EEPROM, flash memory, SRAM, and DRAM.

As shown in FIG. 48, the memory 414 may include several categories of software and data used in the data processing system: the operating system 452; the application programs 454; the input/output (I/O) device drivers 458; the Automated Product Pusher and Clipper Actuation Modules 450; and the data 456.

The data 456 may include a look-up chart of different products, pushing rates, covering material lengths, proximity sensor feedback, safety interlock circuits and the like 451 corresponding to particular or target products for one or more producers, which may allow an operator to select certain operational parameters at the start of each shift and/or production run and the like.

As will be appreciated by those of skill in the art, the operating system 452 may be any operating system suitable for use with a data processing system, such as OS/2, AIX, DOS, OS/390 or System390 from International Business Machines Corporation, Armonk, N.Y., Windows CE, Windows NT, Windows95, Windows98 or Windows2000 from Microsoft Corporation, Redmond, Wash., Unix or Linux or FreeBSD, Palm OS from Palm, Inc., Mac OS from Apple Computer, LabView, or proprietary operating systems. The I/O device drivers 458 typically include software routines accessed through the operating system 452 by the application programs 454 to communicate with devices such as I/O data port(s), data storage 456 and certain memory 414 components. The application programs 454 are illustrative of the programs that implement the various features of the data processing system and preferably include at least one application, which supports operations according to embodiments of the present invention. Finally, the data 456 represents the static and dynamic data used by the application programs 454, the operating system 452, the I/O device drivers 458, and other software programs that may reside in the memory 414.

While the present invention is illustrated, for example, with reference to the Automated Product Pusher and Clipper Actuation Modules 450 being an application program in FIG. 48, as will be appreciated by those of skill in the art, other configurations may also be utilized while still benefiting from the teachings of the present invention. For example, the Modules 450 may also be incorporated into the operating system 452, the I/O device drivers 458 or other such logical division of the data processing system. Thus, the present invention should not be construed as limited to the configuration of FIG. 48, which is intended to encompass any configuration capable of carrying out the operations described herein.

The I/O data port can be used to transfer information between the data processing system, the product pusher, and the closure attachment mechanism or another computer system or a network (e.g., the Internet) or to other devices controlled by the processor. These components may be conventional components such as those used in many conventional data processing systems which may be configured in accordance with the present invention to operate as described herein.

For example, certain embodiments of the present invention are directed to a computer program product for operating an automated clipped (netting) packaging apparatus. The automated packaging apparatus can include an automated product pusher mechanism that advances and retracts from a product chute and an automated clipping apparatus that applies at least one closure clip to netting thereat. The computer program product can include: (a) computer readable program code that automatically controllably actuates a pusher actuation cylinder to push a product pusher in a downstream direction; and (b) computer readable program code that automatically controllably actuates a clipper mechanism to position a clipping apparatus in a clipping position in response to product pushed by the product pusher out of the product chute and covered in netting.

In particular embodiments, the computer program product can also include one or more of: (a) computer readable program code that automatically controllably actuates netting gathering plate actuation cylinders to laterally translate the plates toward the clipper mechanism; (b) computer readable program code that automatically controllably actuates a package holding member to raise the holding member above a product support floor to maintain a product held in netting in alignment with the clipper mechanism; (c) computer readable program code that monitors a proximity sensor positioned to detect when a product is in position to be packaged and then automatically controllably actuates the pusher cylinder in response thereto; (d) computer readable program code that prevents actuation of the pusher cylinder when the product chute is not in proper position; (e) computer readable program code that actuates a cutting tool actuation cylinder to controllably advance the cutting tool and automatically sever netting intermediate two clips thereon; (f) computer readable program code that supplies heat to the cutting tool; (g) computer readable program code that automatically actuates clip pushers in the clipper mechanism when netting is gathered and in position for clipping at the clipping window; (h) computer readable program code that controls the actuation of a braking mechanism to advance the braking mechanism to contact the product chute and selectively apply pressure to netting thereat; (i) computer readable program code that automatically controllably actuates the pusher actuation cylinder to pull a product pusher in an upstream direction out of the product chute; and (j) computer readable program code that automatically controllably actuates the clipper mechanism to remove the clipping apparatus from the clipping position.

While the present invention is illustrated, for example, with reference to particular divisions of programs, functions and memories, the present invention should not be construed as limited to such logical divisions. Thus, the present invention should not be construed as limited to the configuration of FIG. 48 but is intended to encompass any configuration capable of carrying out the operations described herein.

The flowcharts and block diagrams of certain of the figures herein illustrate the architecture, functionality, and operation of possible implementations of selective implementation of single and dual clip closure means according to the present invention. In this regard, each block in the flow charts or block diagrams represents a module, segment, or portion of code, which comprises one or more executable instructions for implementing the specified logical function(s). It should also be noted that in some alternative implementations, the functions noted in the blocks may occur out of the order noted in the figures. For example, two blocks shown in succession may in fact be executed substantially concurrently or the blocks may sometimes be executed in the reverse order, depending upon the functionality involved.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses, where used, are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A pivotable clipper assembly for attaching at least one closure clip to a product held in netting, comprising:
   a pivotable clipper mechanism having a clipper body configured to deliver clips to a clip window and attach the clips to netting;
   a first cutting cartridge mounted to the pivotable clipper mechanism, the first cutting cartridge comprising:
      a knife;
      an actuation cylinder with a rod in communication with the knife that advances and retracts the knife; and
      an anti-rotation block attached to a rear of the knife intermediate the knife and rod to inhibit the knife and rod from rotating, wherein, in operation, the first cutting cartridge pivots with the clipper mechanism; and
   a proximity sensor mounted to the cartridge to provide data to control the timing of the actuation of the cylinder to automatically controllably advance the knife to sever the netting,
   wherein the clipper mechanism comprises a groove formed therein, the first cartridge comprising a cartridge platform configured to slide into the groove in the clipper mechanism to thereby releasably mount to the clipper mechanism.

2. A clipper assembly according to claim 1, further comprising a second cutting cartridge assembly releaseably mountable to the clipper mechanism, wherein only one of the first and second cutting cartridges is in a use position on the clipper mechanism at any one time, the second cartridge having a cartridge platform configured and sized to slide into the groove in the clipper mechanism, the second cutting cartridge comprising a hot knife element and a heat source in communication therewith, the second hot knife element connected to a corresponding actuation cylinder to controllably advance and retract the hot knife, wherein the second cutting cartridge pivots with the clipper mechanism.

3. A clipper assembly according to claim 2, further comprising a pair of clipper gathering plates attached to the clipper mechanism so that the clipper gathering plates retract with the clipper mechanism, wherein, in operation, the clipper gathering plates gather netting upstream of a product held therein prior to attachment of clips to the gathered netting by the clipper mechanism and then corresponding to which of the first or second cutting cartridges is mounted to the clipping mechanism, the respective cutting cartridge severs the netting intermediate the two clips.

4. A clipper assembly according to claim 3, wherein the clipping mechanism comprises:
- a curvilinear clip rail attached to the clipper body, the clip rail having opposing top and bottom end portions and defining a generally downwardly extending clip feed direction;
- a clip entry window in communication with the bottom end portion of the clip rail and a clip closure delivery path in communication with a punch mechanism that is adapted to wrap a clip from the clip rail about a target work piece; and
- first and second clip pushers configured to selectively engage with clips held on the clip rail to force the clips in the feed direction,
- wherein the clipper gathering plates are positioned on opposing sides of the clip window and extend a distance below the clip rail and generally outwardly therefrom.

5. A clipper assembly according to claim 2, wherein the second cutting cartridge platform comprises an open vertically extending slot on a forward portion thereof.

* * * * *